(12) United States Patent
Han et al.

(10) Patent No.: US 9,287,949 B2
(45) Date of Patent: *Mar. 15, 2016

(54) METHOD AND APPARATUS FOR CONTROLLING RETRANSMISSION ON UPLINK IN A WIRELESS COMMUNICATION SYSTEM SUPPORTING MIMO

(71) Applicant: Samsung Electronics Co., Ltd., Gyeonggi-do (KR)

(72) Inventors: Jin-Kyu Han, Seoul (KR); Youn-Sun Kim, Gyeonggi-do (KR); Myung-Hoon Yeon, Gyeonggi-do (KR); Han-Il Yu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,579

(22) Filed: Dec. 15, 2014

(65) Prior Publication Data

US 2015/0098432 A1     Apr. 9, 2015

Related U.S. Application Data

(63) Continuation of application No. 13/074,564, filed on Mar. 29, 2011, now Pat. No. 8,953,522.

(30) Foreign Application Priority Data

Mar. 29, 2010  (KR) .................. 10-2010-0028207
Apr. 19, 2010  (KR) .................. 10-2010-0036134

(51) Int. Cl.
*H04W 4/00* (2009.01)
*H04B 7/04* (2006.01)
(Continued)

(52) U.S. Cl.
CPC ............ *H04B 7/0473* (2013.01); *H04B 7/0426* (2013.01); *H04B 7/0617* (2013.01);
(Continued)

(58) Field of Classification Search
CPC ...................... H04L 25/0391; H04L 25/03923
USPC ...................... 370/328, 338, 310.2
See application file for complete search history.

(56) References Cited

U.S. PATENT DOCUMENTS

| 8,811,506 B2 | 8/2014 | Taoka et al. |
| 2007/0121528 A1 | 5/2007 | Sakata et al. |

(Continued)

FOREIGN PATENT DOCUMENTS

| CN | 101682382 | 3/2010 |
| EP | 1 959 585 | 8/2008 |

(Continued)

OTHER PUBLICATIONS

LTE; Evolved Universal Terrestrial Radio Access (E-UTRA); Physical Channels and Modulation (3GPP TS 36.211 Version 9.0.0 Release 9).

(Continued)

*Primary Examiner* — Dang Ton
*Assistant Examiner* — Pamit Kaur
(74) *Attorney, Agent, or Firm* — The Farrell Law Firm, P.C.

(57) ABSTRACT

Methods and apparatuses are provided for controlling retransmission by a User Equipment (UE) in a communication system. A negative acknowledgement (NACK) is received, from a Node B, for at least one transport block among a plurality of transport blocks transmitted by the UE. A precoding matrix and a number of layers for retransmission are determined. The at least one transport block is retransmitted using the determined precoding matrix and the determined number of layers. The precoding matrix is predefined and the number of layers is equal to a number of layers corresponding to the at least one transport block, if the UE does not receive a physical downlink control channel (PDCCH) intended for the UE and a number of the at least one transport block is not equal to a number of the plurality of transport blocks.

20 Claims, 25 Drawing Sheets

(51) Int. Cl.
*H04B 7/06* (2006.01)
*H04L 1/00* (2006.01)
*H04L 1/16* (2006.01)
*H04L 25/03* (2006.01)
*H04L 1/18* (2006.01)

(52) U.S. Cl.
CPC ............ *H04L1/0031* (2013.01); *H04L 1/1607* (2013.01); *H04L 1/1671* (2013.01); *H04L 25/0391* (2013.01); *H04L 25/03929* (2013.01); *H04L 1/1812* (2013.01); *H04L 25/03923* (2013.01); *H04L 25/03942* (2013.01)

(56) References Cited

U.S. PATENT DOCUMENTS

| | | |
|---|---|---|
| 2008/0192856 A1 | 8/2008 | Jongren et al. |
| 2009/0034461 A1 | 2/2009 | Pelletier et al. |
| 2009/0175369 A1 | 7/2009 | Atarashi et al. |
| 2009/0227278 A1 | 9/2009 | Cho et al. |
| 2009/0232109 A1 | 9/2009 | Nandagopalan et al. |
| 2009/0249151 A1 | 10/2009 | Zhou et al. |
| 2009/0304109 A1 | 12/2009 | Kotecha |
| 2009/0307558 A1 | 12/2009 | Lee et al. |
| 2010/0131813 A1 | 5/2010 | Kim et al. |
| 2010/0183085 A1 | 7/2010 | Taoka et al. |
| 2010/0309808 A1 | 12/2010 | Miki et al. |
| 2011/0176585 A1 | 7/2011 | Seo et al. |
| 2012/0063438 A1 | 3/2012 | Kang et al. |
| 2013/0235825 A1 | 9/2013 | Walton at al. |
| 2015/0074482 A1 | 3/2015 | Hoshino et al. |

FOREIGN PATENT DOCUMENTS

| | | |
|---|---|---|
| EP | 2 141 852 | 1/2010 |
| JP | 2007-116637 | 5/2007 |
| JP | 2007-214824 | 8/2007 |
| JP | 2009-164976 | 7/2009 |
| JP | 2009-219116 | 9/2009 |
| JP | 2010-500790 | 1/2010 |
| JP | 5584353 | 9/2014 |
| RU | 2 330 381 | 7/2008 |
| WO | WO 2006/118433 | 11/2006 |
| WO | WO 2007/052941 | 5/2007 |
| WO | WO 2008/100093 | 8/2008 |
| WO | WO 2008/156067 | 12/2008 |
| WO | WO 2009/088167 | 7/2009 |
| WO | WO 2009/110759 | 9/2009 |
| WO | WO 2009/113301 | 9/2009 |
| WO | WO 2009/123522 | 10/2009 |

OTHER PUBLICATIONS

XP014045995, Jan. 1, 2010.
Samsung, "HARQ Handling in UL MIMO", R1-102209, 3GPP TSG RAN WG1 #60bis, Apr. 12-16, 2010, 11 pages.
Japanese Office Action dated Aug. 3, 2015 issued in counterpart application No. 2014-147063, 10 pages.

METHOD AND APPARATUS FOR CONTROLLING RETRANSMISSION ON UPLINK IN A WIRELESS COMMUNICATION SYSTEM SUPPORTING MIMO

PRIORITY

This application is a Continuation application of U.S. patent application Ser. No. 13/074,564, filed in the United States Patent and Trademark Office on Mar. 29, 2011, which claims priority under 35 U.S.C. §119(a) to Korean Patent Applications filed in the Korean Intellectual Property Office on Mar. 29, 2010 and Apr. 19, 2010 and assigned Serial Nos. 10-2010-0028207 and 10-2010-0036134, respectively, the entire disclosures of which are incorporated herein by reference.

BACKGROUND OF THE INVENTION

1. Field of the Invention

The present invention relates generally to a method and apparatus for retransmission on an UpLink (UL) in a wireless communication system, and more particularly, to a method and apparatus for controlling retransmission on a UL in a wireless communication system supporting multi-antenna transmission technology, such as Multiple Input Multiple Output (MIMO).

2. Description of the Related Art

Wireless communication systems have evolved into broadband wireless communication systems providing not only voice-oriented services but also high-speed, high-quality packet data services, including communication standards such as, for example, 3GPP High Speed Packet Access (HSPA), Long Term Evolution (LTE), 3GPP2 High Rate Packet Data (HRPD), Ultra Mobile Broadband (UMB), and IEEE 802.16e.

Recently, in order to improve transmission efficiency, wireless communication systems use technologies such as Adaptive Modulation and Coding (AMC) and channel-sensitive scheduling. By using AMC, a Node B (also known as a base station) may adjust the amount of data transmitted by the Node B or a User Equipment (UE), also known as a mobile station, according to channel states. For example, if the channel state is poor, the amount of transmission data is reduced to a desired level to match a reception error rate, and if the channel state is good, the amount of transmission data is increased to effectively transmit as much information as possible, while matching the reception error rate to the desired level. By using a channel-sensitive scheduling resource management method, a Node B may selectively service users with a good channel state among a plurality of users, which contributes to an increase in system capacity, as compared to an existing method of allocating a channel to a single user and servicing the user. Specifically, the AMC and the channel-sensitive scheduling are methods of applying an appropriate Modulation and Coding Scheme (MCS) at the time determined to be most efficient, using the channel state information.

Many studies are being conducted to replace Code Division Multiple Access (CDMA), a multiple access scheme which has been used in the $2^{nd}$ Generation (2G) and $3^{rd}$ Generation (3G) mobile communication systems, with Orthogonal Frequency Division Multiple Access (OFDMA) in the next-generation communication system. Standards bodies such as 3GPP, 3GPP2, and IEEE are standardizing evolved systems using OFDMA or modified OFDMA. It is well known that a greater capacity increase can be expected in OFDMA, compared to in CDMA. One of several reasons leading to this capacity increase in OFDMA is the possibility of performing scheduling on the frequency domain (known as 'Frequency-Domain Scheduling'). Just as the capacity gain can be obtained by the channel-sensitive scheduling using the time-varying characteristics of channels, a higher capacity gain may be obtained using the frequency-varying characteristics of channels.

An LTE system, a typical example of the broadband wireless communication systems, adopts Orthogonal Frequency Division Multiplexing (OFDM) in a Downlink (DL) and Single Carrier Frequency Division Multiple Access (SC-FDMA) in a UL, both of which may perform the frequency-domain scheduling.

The AMC and channel-sensitive scheduling are techniques capable of improving the transmission efficiency when transmitters have acquired sufficient information about transmission channels. In the DL of the LTE system, for Frequency Division Duplex (FDD), since a Node B cannot estimate a state of a DL channel or a transmission channel depending on a UL channel or a reception channel, a UE is designed to report information about the DL channel to the Node B. In the case of Time Division Duplex (TDD), a Node B uses characteristics so that it can estimate a state of a DL channel depending on a UL channel, making it possible to omit the process of reporting the information about the DL channel from the UE to the Node B.

In the UL of the LTE system, a UE is designed to transmit a Sounding Reference Signal (SRS) and a Node B is designed to estimate a UL channel by receiving the SRS.

In the DL of the LTE system, MIMO or a multi-antenna transmission technique is supported. An LTE Node B may include 1, 2, or 4 transmission antennas. When including a plurality of transmission antennas, a Node B may obtain a beamforming gain and a spatial multiplexing gain by applying precoding.

Recently, many discussions have been held in 3GPP to support MIMO even in the UL of the LTE system. Similar to the DL MIMO, a UE may include 1, 2, or 4 transmission antennas, and when including a plurality of transmission antennas, a UE may obtain a beamforming gain and a spatial multiplexing gain by applying precoding.

A difference between the DL MIMO and the UL MIMO is provided below. In the DL MIMO, a Node B (or a transmitter) determines by itself the transmission property such as MCS scheme, MIMO scheme, and precoding. The Node B configures and transmits a Physical Downlink Shared CHannel (PDSCH) by reflecting the transmission property, and delivers the transmission property applied to the PDSCH to a UE using a Physical Downlink Control CHannel (PDCCH). However, in the UL MIMO, a Node B (or a receiver) determines the transmission property such as MCS scheme, MIMO scheme, and precoding, according to the channel characteristics of UEs. The Node B delivers the transmission property to a UE through a PDCCH, and upon receiving the PDCCH, the UE configures and transmits a Physical Uplink Shared CHannel (PUSCH) by reflecting the transmission property granted by the Node B. Specifically, in the LTE system, a Node B determines AMC, channel-sensitive scheduling, MIMO precoding, etc., and a UE receives a PDSCH transmitted based on the determination, or configures and transmits a PUSCH according to the determination.

If a Node B has correct information about a channel state, the Node B may determine an amount of transmission data, which is most appropriate for the channel state, using AMC. In actual communication environments, however, there is a significant difference between the channel state that the Node B is aware of, and the actual channel state, due to the estimation error, the feedback error, and the like. Therefore, despite the use of AMC, the transmitter and the receiver may not actually prevent errors from occurring. The majority of wireless communication systems, including the LTE system, employ Hybrid Automatic ReQuest (HARQ), in which, if a decoding failure occurs in an initial transmission, a physical layer immediately retransmits the failed data. HARQ refers to a scheme, in which, if a receiver has failed to correctly decode data, the receiver transmits a negative acknowledgement (NACK) information indicating the decoding failure to a transmitter, allowing the transmitter to retransmit the failed data in a physical layer. On the contrary, if the receiver has correctly decoded data, the receiver transmits ACK information indicating the decoding success to the transmitter, allowing the transmitter to transmit new data.

In a wireless communication system using the HARQ, because a receiver may improve its reception performance by combining a retransmitted signal with a previously received signal, the receiver stores in its memory the data which was received previously but failed to be decoded, just in case of retransmission.

In order to enable a transmitter to transmit other data for the time required when a response signal from a receiver, such as ACK and NACK, is delivered up to the transmitter, an HARQ process is defined. In accordance with the HARQ process, the receiver may determine whether to combine a previously received signal with a newly received signal using a HARQ Process Identification (HARQ PID). HARQ is classified into synchronous HARQ and asynchronous HARQ according to whether a transmitter provides the HARQ PID to a receiver as a control signal in the HARQ process. In the synchronous HARQ, a transmitter uses a serial number of a subframe carrying a PDCCH, instead of providing a HARQ PID to a receiver as a control signal. The subframe refers to a resource allocation unit in the time domain. However, in the asynchronous HARQ, a transmitter provides a HARQ PID to a receiver as a control signal. The LTE system employs asynchronous HARQ in the DL and synchronous HARQ in the UL.

FIG. 1 illustrates a synchronous HARQ operation in a UL.

Referring to FIG. 1, if a Node B grants a resource allocation for a UL transmission using a PDCCH in an n-th subframe of a DL in step 101, a HARQ PID is determined as resource allocation information by a subframe serial number 'n'. For example, if a HARQ PID corresponding to a subframe serial number 'n' is assumed to be '0', a HARQ PID corresponding to a subframe serial number 'n+1' may be defined as '1'. A PDCCH for a UL grant, transmitted in a subframe with a serial number 'n', includes a New Data Indicator (NDI). If an NDI has been toggled from its previous NDI value, the relevant UL grant is set to allocate a PUSCH for new data transmission. If an NDI has maintained its previous NDI value, the relevant UL grant is set to allocate a PUSCH for retransmission of the previously transmitted data.

If an NDI associated a UL grant is assumed to be toggled in step 101, a UE performs initial transmission on a PUSCH for new data transmission in a subframe #(n+4) in step 103. Whether the Node B has successfully decoded the PUSCH data transmitted by the UE in the subframe #(n+4) is determined using a Physical HARQ Indicator CHannel (PHICH) that the Node B transmits in a subframe #(n+8) in step 105. If it is determined that the PHICH has transmitted a NACK, the UE performs retransmission on the PUSCH in a subframe #(n+12) in step 107. In this way, in the synchronous HARQ, initial transmission and retransmission of the same Transport Block (TB) are performed in sync with serial numbers of subframes.

As described in FIG. 1, the Node B and the UE may normally perform a HARQ operation without introducing a separate HARQ PID, because an agreement was made in advance that the TB having undergone initial transmission in the subframe #(n+4) is retransmitted in the subframe #(n+12). In the example of FIG. 1, since a transmission interval of the same TB includes 8 subframes, the maximum number of HARQ processes capable of running at the same time may be limited to 8.

In the UL synchronous HARQ operation described in FIG. 1, retransmission may be granted using a PHICH capable of indicating only the ACK/NACK signal. If the Node B desires to change the transmission property of a PUSCH, such as a transmission resource and an MCS scheme, in retransmission, the Node B may grant transmission of a PDCCH indicating the change. This HARQ scheme, granting a change in the transmission property of the PUSCH, is called 'adaptive synchronous HARQ'.

FIG. 2 illustrates an adaptive synchronous HARQ operation in a UL.

Referring to FIG. 2, steps 101 to 105 in FIG. 2 are identical in operation to their corresponding steps in FIG. 1.

In step 105 in FIG. 2, a Node B informs a UE that it has failed to successfully decode the PUSCH transmitted in the subframe #(n+4) in step 103, by delivering a NACK using a PHICH in a subframe #(n+8). In order to change the transmission property during PUSCH retransmission, the Node B transmits a PDCCH including information for changing the transmission property of a PUSCH, together with the PHICH in step 106. The UE may receive the PDCCH including information for changing the transmission property of a PUSCH, because it attempts to receive and decode a PDCCH in every subframe. In step 108, the UE performs retransmission on a PUSCH in a subframe #(n+12) by applying the transmission property indicated by the PDCCH.

According to the above-described adaptive synchronous HARQ, the information for changing the transmission property of a PUSCH is transmitted over a PDCCH. Therefore, if a change in the transmission property of a PUSCH is required during retransmission, a Node B transmits a PDCCH together with a PHICH despite an increase in the amount of DL control information. When maintaining the previous transmission property of a PUSCH, the Node B transmits only the PHICH.

FIG. 3 illustrates an adaptive synchronous HARQ operation of a Node B in a UL.

Referring to FIG. 3, in step 131, a Node B performs UL scheduling to determine a UE to be granted transmission of a PUSCH, and a resource to be used for the PUSCH transmission. In step 133, the Node B transmits a PDCCH to inform the scheduled UE of grant information of the PUSCH. In step 135, the Node B demodulates and decodes the PUSCH, which has been received four subframes after a time when the PDCCH was transmitted in step 133. In step 137, the Node B determines whether the decoding of the PUSCH is successful. If successful, the Node B transmits an ACK to the UE in step 139, and then returns to step 131 to perform new scheduling. On the other hand, if the decoding is failed in step 137, the Node B transmits a NACK to the UE in step 141.

Thereafter, in accordance with an adaptive synchronous HARQ operation, the Node B determines in step 143 whether it desires to change the transmission property of the PUSCH to be different from that designated in step 133. If it is desired to change the transmission property, the Node B transmits a PDCCH including information indicating a new transmission property to be applied for retransmission of the PUSCH in step 145. After indicating retransmission of the PUSCH in steps 143 and 145, the Node B returns to step 135 to receive and decode the retransmitted PUSCH.

FIG. 4 illustrates an adaptive synchronous HARQ operation of a UE in a UL.

Referring to FIG. 4, a UE attempts to receive and decode a PDCCH for a UL grant in step 151, and determines in step 153 whether the decoding of the PDCCH is successful. If successful, the UE determines in step 155 whether an NDI indicating transmission/non-transmission of new data has been toggled. If the NDI has been toggled, meaning that the relevant grant indicates initial transmission of a new TB, then the UE transmits a PUSCH carrying a new TB by applying the transmission property indicated by the PDCCH in step 157. However, if the NDI has not been toggled in step 155, meaning that the relevant grant indicates retransmission with the transmission property changed because a Node B has failed to successfully decode the previous TB having the same HARQ PID, then the UE retransmits a PUSCH carrying the previous TB by applying the transmission property indicated by the PDCCH in step 159. If the UE has failed to successfully decode the PDCCH for a UL grant in step 153, the UE attempts to receive and decode a PHICH in step 161. In step 163, the UE determines if an ACK has been received over the PHICH. Upon receiving the ACK, the UE stops the transmission of the PUSCH in step 165. However, upon receiving a NACK from the PHICH, the UE retransmits a PUSCH carrying the previous TB by applying the transmission property indicated by the last received PDCCH in step 167.

Although the synchronous HARQ has been proposed to enable retransmission by a UE by transmitting only the PHICH without transmitting the PDCCH, when the PDCCH should be transmitted together with the PHICH to indicate the transmission property such as a precoding scheme of a UE, the above resource saving effects may not be expected in the synchronous HARQ. Specifically, while the PHICH carries only the ACK/NACK information, the PDCCH includes various control information for UL transmission in a UE. Therefore, to transmit the PDCCH, a Node B should consume more frequency resources and transmission power. If the PDCCH is to be transmitted to indicate the transmission property, such as a precoding scheme for MIMO transmission, during retransmission in a UL, the consumption of resources for control information increases, requiring a method for reducing a transmission load of control information for retransmission in a UL.

SUMMARY OF THE INVENTION

The present invention has been made to address at least the above problems and/or disadvantages and to provide at least the advantages described below. Accordingly, an aspect of the present invention is provides a method and apparatus for efficiently controlling retransmission on a UL in a wireless communication system supporting MIMO.

Another aspect of the present invention provides a retransmission control method and apparatus capable of reducing transmission of control information for retransmission on a UL in a wireless communication system supporting UL MIMO.

Further, another aspect of the present invention provides a retransmission control method and apparatus capable of reducing transmission of control information indicating the transmission property during retransmission in a wireless communication system supporting UL MIMO.

Yet another aspect of the present invention provides a method and apparatus for efficiently determining a precoding scheme during retransmission on a UL in a wireless communication system supporting UL MIMO.

Still another aspect of the present invention provides a method and apparatus for determining a precoding scheme during retransmission taking into account channel states of layers over which TBs, having undergone initial transmission, are transmitted in a UL, in a wireless communication system supporting UL MIMO.

According to one aspect of the present invention, a method is provided for controlling retransmission by a UE in a communication system. A NACK is received, from a Node B, for at least one transport block among a plurality of transport blocks transmitted by the UE. A precoding matrix and a number of layers for retransmission are determined. The at least one transport block is retransmitted using the determined precoding matrix and the determined number of layers. The precoding matrix is predefined and the number of layers is equal to a number of layers corresponding to the at least one transport block, if the UE does not receive a PDCCH intended for the UE and a number of the at least one transport block is not equal to a number of the plurality of transport blocks.

According to another aspect of the present invention, a UE is provided for controlling retransmission in a communication system. The UE includes a transceiver for transmitting and receiving data with a Node B. The UE also includes a controller for controlling operations of receiving a NACK for at least one transport block among a plurality of transport blocks transmitted by the UE, from the Node B, determining a precoding matrix and a number of layers for retransmission, and retransmitting the at least one transport block using the determined precoding matrix and the determined number of layers. The precoding matrix is predefined and the number of layers is equal to a number of layers corresponding to the at least one transport block, if the UE does not receive a PDCCH intended for the UE and a number of the at least one transport block is not equal to a number of the plurality of transport blocks.

According to an additional aspect of the present invention, a method is provided for controlling retransmission by a Node B in a communication system. A plurality of transport blocks transmitted by a UE is received. A NACK is transmitted for at least one transport block to the UE. A precoding matrix and a number of layers for retransmission are determined. The at least one transport block is received using the determined precoding matrix and the determined number of layers. The precoding matrix is predefined and the number of layers is equal to a number of layers corresponding to the at least one transport block, if the UE does not receive a PDCCH intended for the UE and a number of the at least one transport block is not equal to a number of the plurality of transport blocks According to a further aspect of the present invention, a Node B is provided for controlling retransmission in a communication system. The Node B includes a transceiver for transmitting and receiving data with a UE. The Node B also includes a controller for controlling operations of receiving a plurality of transport blocks transmitted by the UE, transmitting a NACK for at least one transport block to the UE, determining a precoding matrix and a number of layers for retransmission that the UE uses during retransmission of the at least one transport block in response to the NACK for the at least one transport block, and receiving the at least one transport block using the determined precoding matrix and the determined number of layers. The precoding matrix is predefined and the number of layers is equal to a number of layers corresponding to the at least one transport block, if the UE does not receive a PDCCH intended for the UE and a number of the at least one transport block is not equal to a number of the plurality of transport blocks.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF EMBODIMENTS OF THE PRESENT INVENTION

Figure 1:
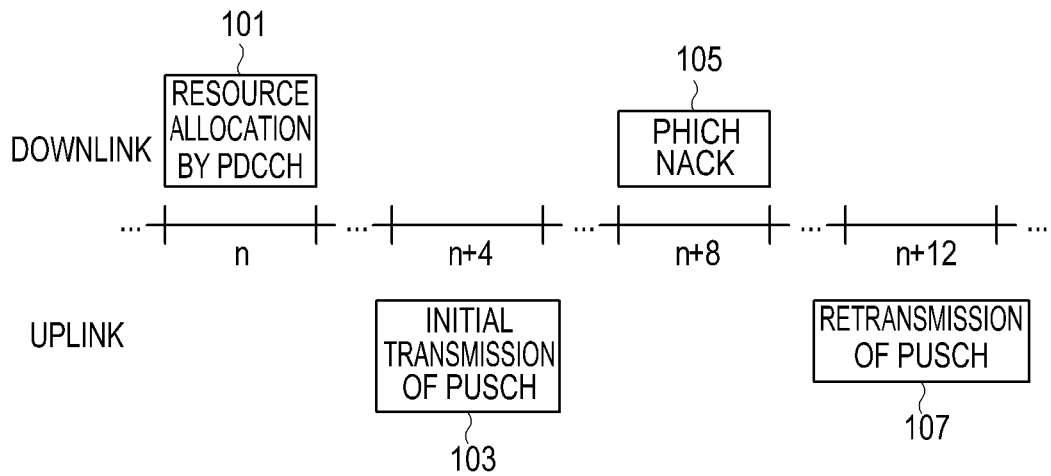
FIG. 1 is a diagram illustrating a synchronous HARQ operation in a UL.
Figure 2:
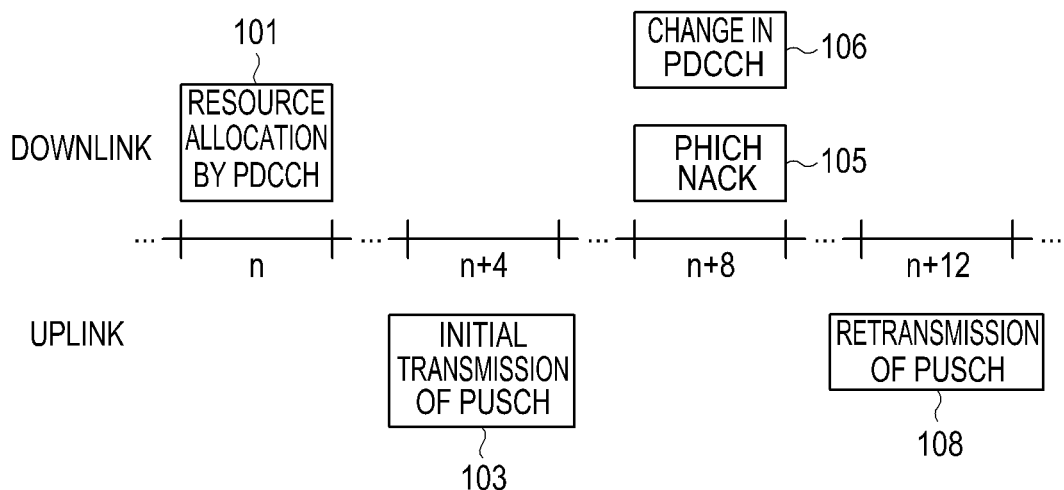
FIG. 2 is a diagram illustrating an adaptive synchronous HARQ operation in a UL.

Embodiments of the present invention are described in detail with reference to the accompanying drawings. The same or similar components may be designated by the same or similar reference numerals although they are illustrated in different drawings. In the following description, specific details such as detailed configurations and components are merely provided to assist the overall understanding of embodiments of the present invention. Therefore, it should be apparent to those skilled in the art that various changes and modifications of the embodiments described herein can be made without departing from the scope and spirit of the invention. In addition, detailed descriptions of constructions or processes known in the art may be omitted to avoid obscuring the subject matter of the present invention.

Although an LTE system will be considered in the following description of embodiments of the present invention, the present invention may be applied in the same way not only to the LTE system, but also to any wireless communication systems that support UL MIMO and provide, to UEs, information about the changed transmission property through a control channel if there is a need for a change in the transmission property used during retransmission, such as a precoding scheme.

A UL of the LTE system, to which embodiments of the present invention is applied, adopts SC-FDMA. In this regard, Uplink Control Information (UCI) including UL ACK/NACK information for HARQ in a DL and feedback information such as Channel Quality Indicator (CQI), Precoding Matrix Indicator (PMI), and Rank Indicator (RI), is transmitted on a Physical Uplink Control CHannel (PUCCH), and UL data is transmitted on a PUSCH.

In order to maintain the single-carrier property in the SC-FDMA, when the UCI and the UL data are to be transmitted simultaneously, the UCI is multiplexed with the data signal in the PUSCH without being transmitted on the PUCCH. If an aperiodic CQI is requested as a UL grant, UCI and data should be multiplexed because not only the data, but also the aperiodic CQI, PMI, and RI, should be included in the PUSCH before transmission.

Figure 5:
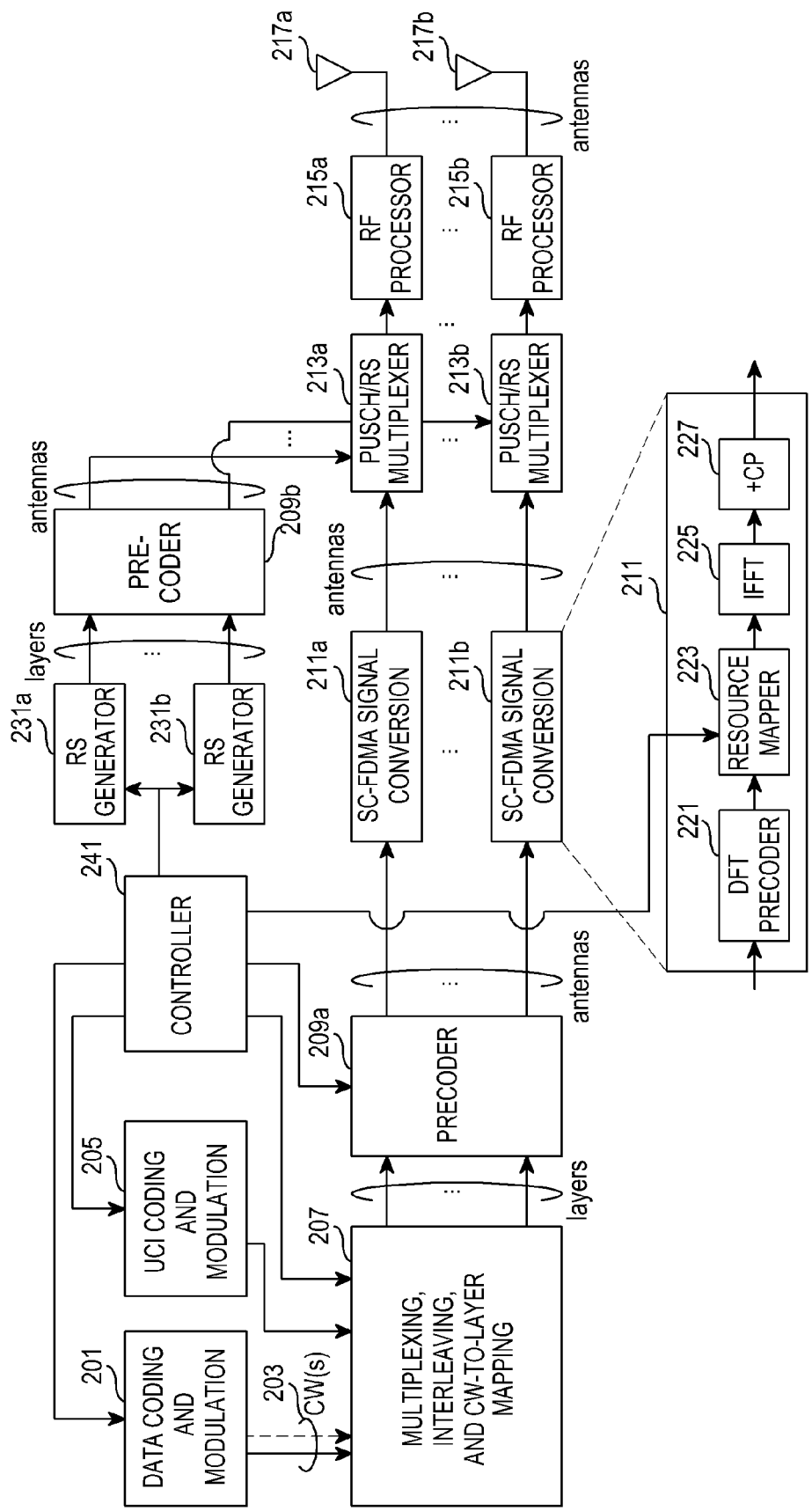
FIG. 5 is a block diagram illustrating a structure of a UE in a wireless communication system supporting UL MIMO, according to an embodiment of the present invention.

FIG. 5 illustrates a structure of a UE in a wireless communication system supporting UL MIMO according to an embodiment of the present invention, in which a transmitter structure of the UE is shown.

Referring to FIG. 5, a block 201 codes and modulates an input data signal, and a block 205 codes and modulates an input UCI signal. In a UE supporting UL MIMO, a maximum of two CodeWords (CWs) are created as represented by reference numeral 203. Generally, CWs correspond to TBs.

Assuming that CW0 is identical to TB1 and CW1 is identical to TB2, if a swap function is enabled, then a mapping relationship between the CWs and the TBs may be changed. After the change, the CW0 is mapped to the TB2, and the CW1 is mapped to the TB1. While the swap function is defined in DL MIMO of the LTE system, the swap function is optional in UL MIMO.

Among the lines represented by reference numeral 203, a solid line indicates that one CW is created, and a dotted line indicates that two CWs may be created. A data modulation signal made in the block 201 and a UCI modulation signal made in the block 205 undergo multiplexing and interleaving, and then are mapped to MIMO layers in block 207. An example of a method of mapping CWs to layers in the LTE system is shown below in Table 1.

TABLE 1

CW-to-Layer Mapping

| Number of Layers (rank) | Number of CWs | CW-to-Layer Mapping |
|---|---|---|
| 1 | 1 | CW 0 → layer 0:<br>$x^{(0)}(i) = d^{(0)}(i)$ |
| 2 | 2 | CW 0 → layer 0 & CW 1 → layer 1:<br>$x^{(0)}(i) = d^{(0)}(i)$<br>$x^{(1)}(i) = d^{(1)}(i)$ |
| 2 | 1 | CW 0 → layers {0, 1}:<br>$x^{(0)}(i) = d^{(0)}(2i)$<br>$x^{(1)}(i) = d^{(0)}(2i + 1)$<br>allowed only in retransmission |
| 3 | 2 | CW 0 → layer 0 & CW 1 → layers {1, 2}:<br>$x^{(0)}(i) = d^{(0)}(i)$<br>$x^{(1)}(i) = d^{(1)}(2i)$<br>$x^{(2)}(i) = d^{(1)}(2i + 1)$ |
| 4 | 2 | CW 0 → layers {0, 1} & CW 1 → layers {2, 3}:<br>$x^{(0)}(i) = d^{(0)}(i)$<br>$x^{(1)}(i) = d^{(0)}(2i)$<br>$x^{(2)}(i) = d^{(1)}(2i + 1)$ |

In Table 1, $d^{(k)}(i)$ represents an i-th modulation symbol in a CWk, and $x^{(l)}(i)$ represents an i-th symbol on an l-th layer. When one CW is mapped to two layers, even-numbered modulation symbols are mapped to a lower layer, while odd-numbered modulation symbols are mapped to an upper layer. More modulation symbols may be transmitted, contributing to an increase in the amount of transmission data and a reduction in coding rate, compared to when one CW is mapped to one layer.

As shown in Table 1, for a rank-1 transmission in which only one layer is made, only one CW is created, and for a rank-1 transmission in which two layers are made, two CWs are created. There is also a case where one CW is created in a rank-2 transmission, and this case is allowed only in retransmission. Generally, with respect to a relationship between ranks and layers in MIMO, the term 'layer' refers to a spatial resource capable of transmitting one modulation symbol stream, and the 'rank' refers to the number of layers formed in the MIMO system. A MIMO-based spatial multiplexing technique increases a data rate by making multiple layers for the same time-frequency resource and transmitting independent modulation symbol streams on the layers.

The layer-specific signals generated by the block 207 undergo transmission (Tx) precoding in a block 209a. Precoding is a process of forming beams of layers to increase reception quality of the layers. Precoding should be determined taking into account characteristics of transmission channels. With respect to UL MIMO, since a transmission channel is a UL channel, if a Node B measures the UL channel and informs a UE of a precoder employing an appropriate precoding scheme, the UE performs precoding according to the information. A precoder is represented in a matrix (i.e., precoding matrix), in which the number of rows is equal to the number of antennas and the number of columns is equal to the number of layers. Precoding may be expressed in general formula as shown in Equation (1) below.

$$y = \begin{bmatrix} y^{(0)}(i) \\ \vdots \\ y^{(N-1)}(i) \end{bmatrix} = Px = \begin{bmatrix} p_{11} & \cdots & p_{R1} \\ \vdots & \ddots & \vdots \\ p_{N1} & \cdots & p_{RN} \end{bmatrix} \begin{bmatrix} x^{(0)}(i) \\ \vdots \\ x^{(R-1)}(i) \end{bmatrix} \quad (1)$$

P represents a precoding matrix, x represents a transmission signal before undergoing precoding, y represents a transmission signal after undergoing precoding, and $x^{(n)}(i)$ represents an i-th symbol to be transmitted via an n-th transmission antenna. For reference, the term 'transmission antenna' as used herein refers to a logical antenna used for signal transmission, rather than a physical antenna. Mapping between logical antennas and physical antennas may be defined in many different ways.

Tables 2 and 3 below show examples of precoding matrices used for LTE UL MIMO in different scenarios where two and four transmission antennas are used, respectively.

TABLE 2

Example of Precoding Matrix for LTE UL MIMO (with 2 Tx Antennas)

| Rank-1 | Indices 0~3 | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |
|---|---|---|---|---|---|
| | Indices 4~5 | $\frac{1}{\sqrt{2}}\begin{bmatrix}1\\0\end{bmatrix}$ | $\frac{1}{\sqrt{2}}\begin{bmatrix}0\\1\end{bmatrix}$ | — | — |
| Rank-2 | Index 0 | $\frac{1}{\sqrt{2}}\begin{bmatrix}1 & 0\\0 & 1\end{bmatrix}$ | — | — | — |

TABLE 3

Example of Precoding Matrix for LTE UL MIMO (with 4 Tx Antennas)

| Rank-1 | Indices 0~3 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |

TABLE 3-continued

Example of Precoding Matrix for LTE UL MIMO (with 4 Tx Antennas)

| | | | | | |
|---|---|---|---|---|---|
| | Indices 4~7 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| | Indices 8~11 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ |
| | Indices 12~15 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| | Indices 15~19 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| | Indices 20~23 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |
| Rank-2 | Indices 0~3 | $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ |
| | Indices 4~7 | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ |
| | Indices 8~11 | $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ |
| | Indices 12~15 | $\frac{1}{2}\begin{bmatrix}1&0\\0&1\\0&1\\1&0\end{bmatrix}$ | $\frac{1}{2}\begin{bmatrix}1&0\\0&1\\0&-1\\1&0\end{bmatrix}$ | $\frac{1}{2}\begin{bmatrix}1&0\\0&1\\0&1\\-1&0\end{bmatrix}$ | $\frac{1}{2}\begin{bmatrix}1&0\\0&1\\0&-1\\-1&0\end{bmatrix}$ |
| Rank-3 | Indices 0~3 | $\frac{1}{2}\begin{bmatrix}1&0&0\\1&0&0\\0&1&0\\0&0&1\end{bmatrix}$ | $\frac{1}{2}\begin{bmatrix}1&0&0\\-1&0&0\\0&1&0\\0&0&1\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ |
| | Indices 4~7 | $\frac{1}{2}\begin{bmatrix}1&0&0\\0&1&0\\0&0&1\\1&0&0\end{bmatrix}$ | $\frac{1}{2}\begin{bmatrix}1&0&0\\0&1&0\\0&0&1\\-1&0&0\end{bmatrix}$ | $\frac{1}{2}\begin{bmatrix}0&1&0\\1&0&0\\1&0&0\\0&0&1\end{bmatrix}$ | $\frac{1}{2}\begin{bmatrix}0&1&0\\1&0&0\\-1&0&0\\0&0&1\end{bmatrix}$ |

TABLE 3-continued

Example of Precoding Matrix for LTE UL MIMO (with 4 Tx Antennas)

| | Indices 8~11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |
|---|---|---|---|---|---|
| Rank-4 | Index 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | — | — | — |

Referring again to FIG. 5, signals having passed through block 209a are signals to be transmitted via transmission antennas 217a, . . . , 217b. These signals are converted into SC-FDMA signals to be compatible with the LTE UL scheme by means of blocks 211 (211a, . . . , 211b). The block 211a is an SC-FDMA signal converter for a signal to be transmitted via the first transmission antenna 217a. The block 211b is an SC-FDMA signal converter for a signal to be transmitted via the last transmission antenna 217b. The SC-FDMA signal converter 211, as illustrated in FIG. 5, includes a Discrete Fourier Transform (DFT) unit 221, a resource mapper 223, an Inverse Fast Fourier Transform (IFFT) unit 225, and a Cyclic Prefix (CP) adder 227, which are well known in the art.

A Reference Signal (RS) is a signal provided for coherent demodulation. Independent RSs are generated in different layers, and blocks 231 (231a, . . . , 231b) are RS generators for their associated layers. The block 231a is an RS generator for the first layer, and the block 231b is an RS generator for the last layer. In a block 209b, the RSs of the different layers undergo the same precoding as that applied to a PUSCH in block 209a. Since the same precoding is applied to the RSs and the PUSCH, a Node B may receive the RSs and estimate a channel for demodulating the layer-specific signals. By applying precoding to the layer-specific RSs, RS signals to be transmitted via the transmission antennas 217a, . . . , 217b may be obtained.

SC-FDMA signals in a PUSCH, to be transmitted via the transmission antennas 217a, . . . , 217b, are multiplexed with the RSs to be transmitted via the transmission antennas 217a, . . . , 217b by means of blocks 213 (213a, . . . , 213b). The block 213a is a PUSCH/RS multiplexer for a signal to be transmitted via the first transmission antenna 217a, and the block 213b is a PUSCH/RS multiplexer for a signal to be transmitted via the last transmission antenna 217b. To maintain the single-carrier property, RSs are PUSCH undergo time-division multiplexing so as to be transmitted with different SC-FDMA symbols.

Baseband signals that the UE will transmit via the transmission antennas 217a, . . . , 217b are converted into Radio Frequency (RF) signals by means of RF processors 215 (215a, . . . , 215b), and then transmitted via the transmission antennas 217a, . . . , 217b. The blocks 215a and 215b are RF processors for signals to be transmitted via the first and last transmission antennas 217a and 217b, respectively. Reference numerals 217a and 217b represent the first and last transmission antennas, respectively.

A block 241 is a controller for controlling the overall control operation of the UE. The controller 241 determines a frequency resource for transmitting a PUSCH, an MCS level for data and UCI to be transmitted in a PUSCH, an amount of resources to be allocated to UCI among the PUSCH resources, a rank for MIMO transmission, a precoding scheme, and a parameter for generation of antenna-specific RS signals. The controller 241 controls the resource mapper 223, the data coding and modulation block 201, the UCI coding and modulation block 205, the block 207 for performing multiplexing, interleaving and CW-to-layer mapping on the data and UCI, the precoders 209a and 209b, and the RS generators 231.

During UL retransmission, the controller 241 determines the transmission property for PUSCH transmission according to the schemes determined in all embodiments including first to tenth embodiments of the present invention, and controls TBs subjected to retransmission to be retransmitted through the PUSCH. The transmission property includes a precoding scheme. Embodiments of the present invention are described in greater detailed below.

Figure 6:
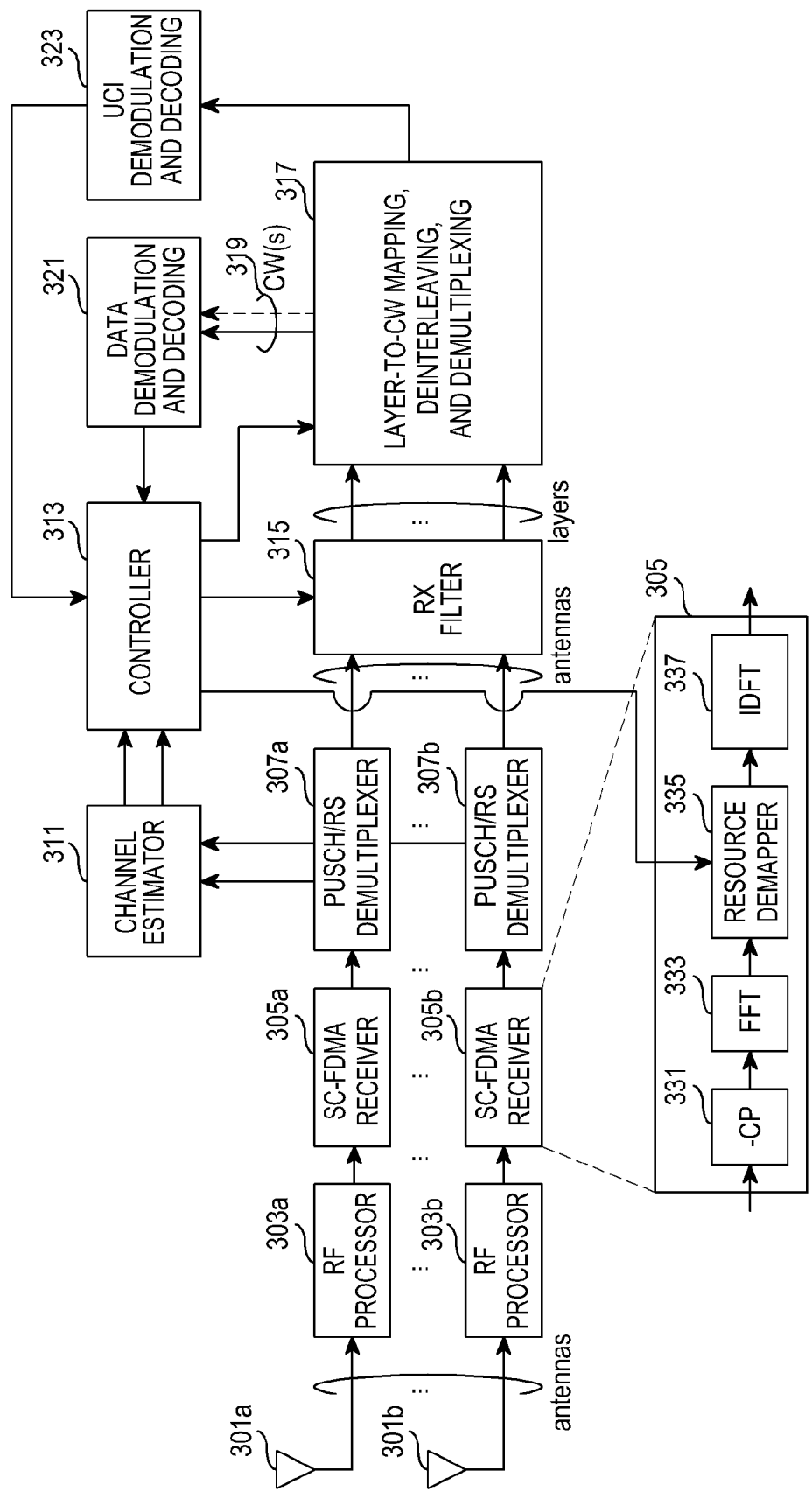
FIG. 6 is a block diagram illustrating a structure of a Node B in a wireless communication system supporting UL MIMO, according to an embodiment of the present invention.

FIG. 6 illustrates a structure of a Node B in a wireless communication system supporting UL MIMO, according to an embodiment of the present invention, in which a receiver structure of the Node B is shown.

Referring to FIG. 6, reference numeral 301a represents a first reception antenna of a Node B, and reference numeral 301b represents a last reception antenna of the Node B. Signals received via the multiple reception antennas 301a, . . . , 301b are converted into baseband signals by means of RF processors 303a, . . . , 303b, respectively. The block 303a is an RF processor for processing a signal received via the first reception antenna 301a, and the block 303b is an RF processor for processing a signal received via the last reception antenna 301b. The signals received via their associated reception antennas and converted into baseband signals are restored to modulation symbol streams in SC-FDMA receivers 305a, . . . , 305b. The block 305a is an SC-FDMA receiver for processing a signal received via the first reception antenna 301a, and the block 305b is an SC-FDMA receiver for processing a signal received via the last reception antenna 301b.

Each of the SC-FDMA receivers 305a, . . . , 305b, as illustrated in FIG. 6, includes a CP remover 331, a Fast Fourier Transform (FFT) unit 333, a resource demapper 335, and an Inverse Discrete Fourier Transform (IDFT) unit 337, and inversely performs the process of the SC-FDMA signal converters 211a, . . . , 211b in FIG. 5.

Signals having passed through the SC-FDMA receivers 305a, . . . , 305b are received signals of PUSCH and RSs from a specific UE. Because the PUSCH and RSs have undergone time-division multiplexing, they are separated into PUSCH received signals and RS received signals by demultiplexers 307a, . . . , 307b. The block 307a is a demultiplexer for processing a signal received via the first reception antenna 301a, and the block 307b is a demultiplexer for processing a signal received via the last reception antenna 301b. The RS received signals extracted through the demultiplexing process are delivered to a channel estimator 311. The PUSCH received signals extracted through the demultiplexing process are delivered to a MIMO reception filter 315.

The channel estimator 311 estimates a UL channel from the RS received signals, and delivers the channel estimate to a controller 313 so that the controller 313 may calculate appropriate reception filter coefficients. The reception filter coefficients determined by the controller 313 are delivered to the MIMO reception filter 315. The MIMO reception filter 315 inversely performs the operations of the precoders 209 in FIG. 5, and separates layer-specific signals of a PUSCH. Typically, the MIMO reception filter may include a Minimum Mean Square Error (MMSE) reception filter. Various other known reception filters may also be used.

The layer-specific received signals are converted into a CW-specific modulation signal stream 319 and a UCI modulation signal stream by a block 317, which inversely performs the operation of the block 207 in FIG. 5. Specifically, the block 317 performs a process of gathering layer-specific signals back on a CW basis, and a series of deinterleaving and data/UCI demultiplexing processes. This series of processes are handled according to the control information, which was transmitted from the Node B to a UE in advance, under control of the controller 313.

The CW-specific modulation signal stream 319 output from block 317 is demodulated and decoded into the original data by a block 321. The UCI modulation signal stream output from block 317 is demodulated and decoded into an original UCI signal by a block 323. After undergoing the data/UCI decoding process, the decoded data and UCI are delivered to the controller 313, in order to enable the Node B to perform UL/DL scheduling and AMC according to the success/failure in data reception, and the UCI information.

During UL retransmission, the controller 313 determines the transmission property for PUSCH transmission according to the schemes determined in all embodiments of the present invention, and controls the overall reception operation of TBs retransmitted through the PUSCH. The transmission property includes a precoding scheme. Embodiments of the present invention are described in greater detailed below.

Prior to a detailed description of the embodiments of the present invention, a general operation of transmitting and receiving a PHICH indicating ACK/NACK information and a PDCCH indicating the transmission property of a PUSCH in a Node B and UE during retransmission in UL MIMO will be described with reference to FIGS. 7 and 8. As an example of the transmission property, a precoding scheme will be considered herein.

Regarding the general information configuration of grant control information or Downlink Control Information (DCI) in a PDCCH, by which a Node B instructs a UE to transmit a PUSCH for UL MIMO, the DCI includes the following Information Element (IEs).

1) Identification flag for a DCI format 0 and a DCI format 1A: In the LTE system, as DCI is defined to have sizes of a DCI format 0 for a UL grant and a DCI format 1A for compact DL allocation, an IE by which it can be determined whether the DCI is for a format 0 or a format 1A is required. This flag is used for that purpose.

2) Frequency hopping flag: This flag is an IE indicating whether frequency hopping is applied for transmission of a PUSCH to obtain frequency diversity.

3) Resource allocation information: This resource allocation information IE is defined to indicate a frequency resource by which a PUSCH should be transmitted.

4) MCS level: This is an IE indicating an MCS level used for PUSCH transmission. Some codepoints in this IE are defined to designate a Redundancy Version (RV) in retransmission.

5) NDI: This is an IE indicating whether a relevant grant is for transmission of a new TB, or for retransmission of a TB. If there is a change in the previous value of an NDI, the IE is a grant for transmission of a new TB. If there is no change, the IE is a grant for retransmission.

6) Power control information: This is an IE indicating information about the transmission power used for PUSCH transmission.

7) RS parameter: An RS for PUSCH demodulation is defined as a Zadoff-Chu (ZC) sequence. The ZC sequence is characterized to become a new orthogonal ZC sequence if a cyclic shift is changed. An IE indicating a cyclic shift of an RS for PUSCH demodulation is defined in a UL grant, for multi-user UL MIMO. If RSs with different cyclic shifts are allocated to different users, a Node B may distinguish different user signals using the orthogonality among RSs.

8) Channel Quality Indicator (CQI) request: This is an IE for enabling transmission of an aperiodic CQI feedback with a PUSCH. This IE is defined with 1 bit. If its value is 1, not only the data, but also an aperiodic CQI, a PMI, and an RI are transmitted in a PUSCH. If its value is 0, only data is transmitted in a PUSCH.

In addition, the following IEs are defined in control information DCI of a grant, by which a Node B instructs a UE to transmit a PUSCH for UL MIMO.

1) PMI: This is an IE indicating a precoding scheme as the transmission property used for UL MIMO transmission.

2) MCS level for a second TB: A maximum of two TBs can be transmitted by UL MIMO. Therefore, an IE indicating an MCS level for the second TB is defined.

3) NDI for a second TB: For UL MIMO, independent NDIs may be defined for two TBs, or an NDI may be defined for one TB.

Although it is be assumed herein that independent NDIs are defined for individual TBs, embodiments of the present invention may be applied to the case where only one NDI is defined for one TB.

Figure 3:
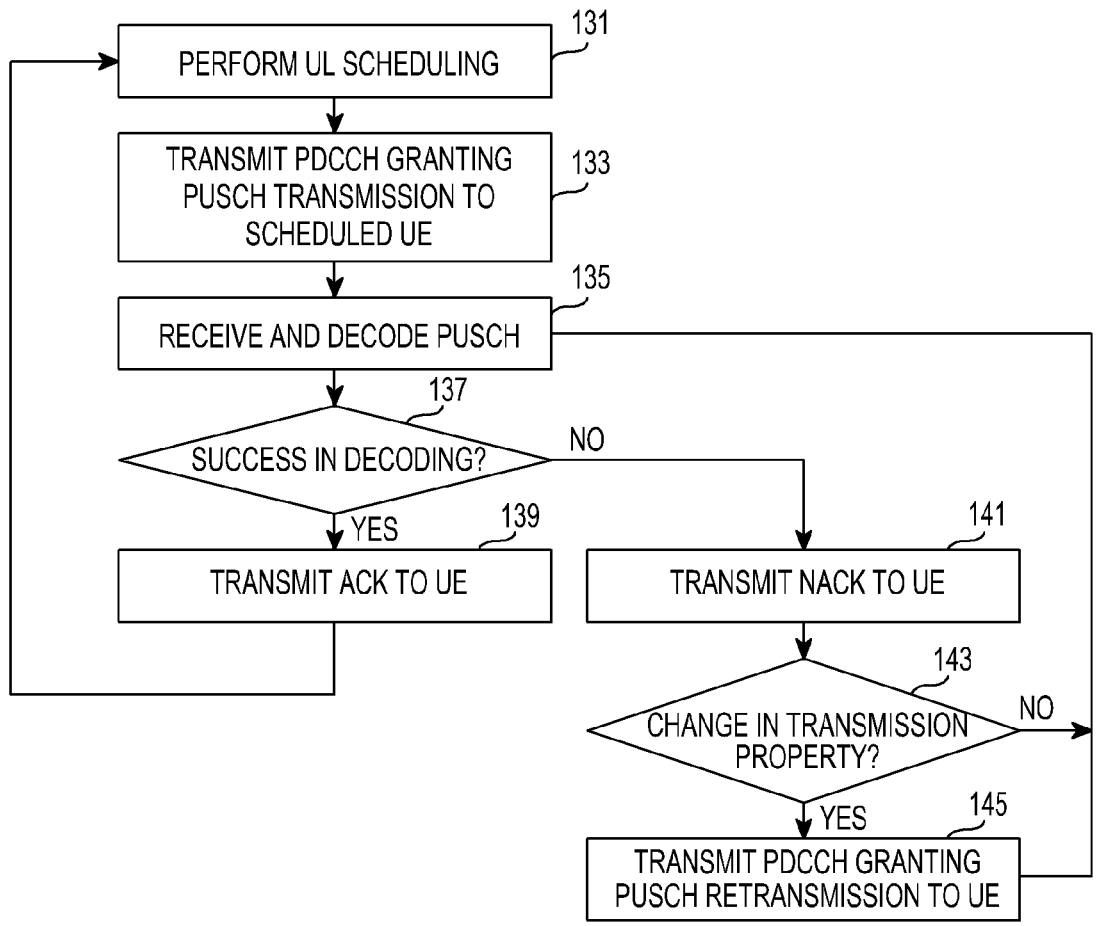
FIG. 3 is a flowchart illustrating an adaptive synchronous HARQ operation of a Node B in a UL.
Figure 7:
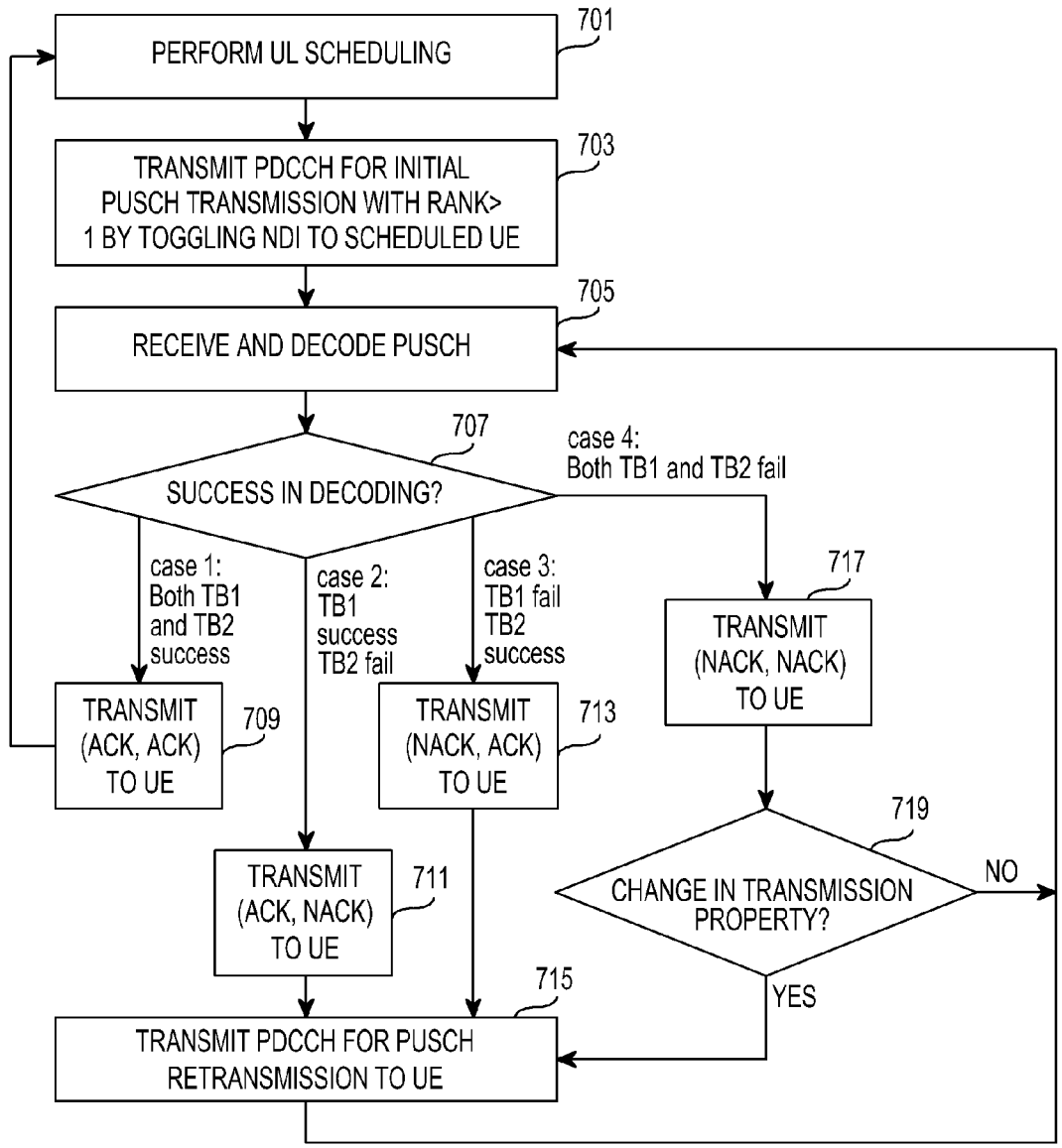
FIG. 7 is a flowchart illustrating a general operation of a Node B in a wireless communication system supporting UL MIMO.

FIG. 7 illustrates a general operation of a Node B in a wireless communication system supporting UL MIMO, in which it is assumed that two TBs are transmitted. A grant in a PUSCH carrying only one TB has been described with reference to FIG. 3.

Referring to FIG. 7, a Node B performs UL scheduling in step 701, to determine a UE the Node B will grant to transmit a PUSCH and also to determine a resource the UE will use for the PUSCH transmission. In step 703, the Node B transmits a PDCCH to the scheduled UE to provide grant information for initial transmission of a PUSCH. Since UL MIMO transmission is considered herein, the grant information indicates that a rank is greater than or equal to 2 (rank>1). Specifically, it is assumed that transmission of two TBs is granted. Since the grant is for initial transmission of a PUSCH, values of NDIs corresponding to the TBs are toggled. In step 705, the Node B demodulates and decodes the PUSCH that has been received four subframes after the time the PDCCH was transmitted in step 703. In step 707, the Node B determines if the decoding of the PUSCH is successful. Because two TBs were transmitted, there are four possible cases where success/failure in the decoding may be determined.

Case 1: Both of TB1 and TB2 have been successfully decoded. In this case, the Node B transmits (ACK, ACK) for TB1 and TB2 using a PHICH in step 709, and then returns to step 701.

Case 2: TB1 has been successfully decoded but TB2 has been failed to be successfully decoded. In this case, the Node B transmits (ACK, NACK) for TB1 and TB2 using a PHICH in step 711, and transmits a PDCCH for granting PUSCH retransmission, to the UE in step 715.

Case 3: TB2 has been successfully decoded but TB1 has been failed to be successfully decoded. In this case, the Node B transmits (NACK, ACK) for TB1 and TB2 using a PHICH in step 713, and transmits a PDCCH for granting PUSCH retransmission, to the UE in step 715.

Case 4: Both of TB1 and TB2 have failed to be successfully decoded. In this case, the Node B transmits (NACK, NACK) for TB1 and TB2 using a PHICH in step 717, and determines in step 719 whether to change the transmission property for the initial transmission that the Node B informed the UE in step 703, during retransmission of the PUSCH. When determining to change the transmission property, the Node B returns to step 705 after performing step 715. When determining not to change the transmission property for the initial transmission, the Node B returns to step 705 to receive and decode the PUSCH, supposing that the UE retransmits the PUSCH, maintaining the transmission property for the initial transmission. Step 715 corresponds to a process in which the Node B transmits a PDCCH to inform the UE of the transmission property to be used for transmission of the PUSCH. After returning to step 705, the Node B receives and decodes the PUSCH received from the UE, considering that the UE retransmits the PUSCH according to the transmission property indicated in step 715.

In the foregoing description of FIG. 7, in Case 1 or Case 4, the Node B may instruct retransmission of the PUSCH simply by transmitting a PHICH without transmitting a PDCCH. However, in Case 2 or 3 where only one of the two TBs has been successfully decoded, the Node B should transmit a PDCCH indicating the transmission property in order to instruct retransmission of the PUSCH. The reason for transmitting this PDCCH is set forth below.

As summarized in Table 1, the number of TBs to be transmitted is changed according to the rank value. For example, while transmitting two TBs in initial transmission, if a UE does not need to transmit them as one of the two TBs has been successfully decoded, the UE transmits one TB in retransmission. If the number of TBs to be transmitted is reduced, a rank value in retransmission is smaller than that in the initial transmission. However, as shown in Tables 2 and 3, different precoders are defined for different ranks. So, the precoders used in initial transmission may not be used in retransmission. For this reason, if the number of TBs transmitted in retransmission is reduced, a PDCCH should be transmitted to inform the changed precoder to be used by the UE, i.e., the changed transmission property.

Figure 8:
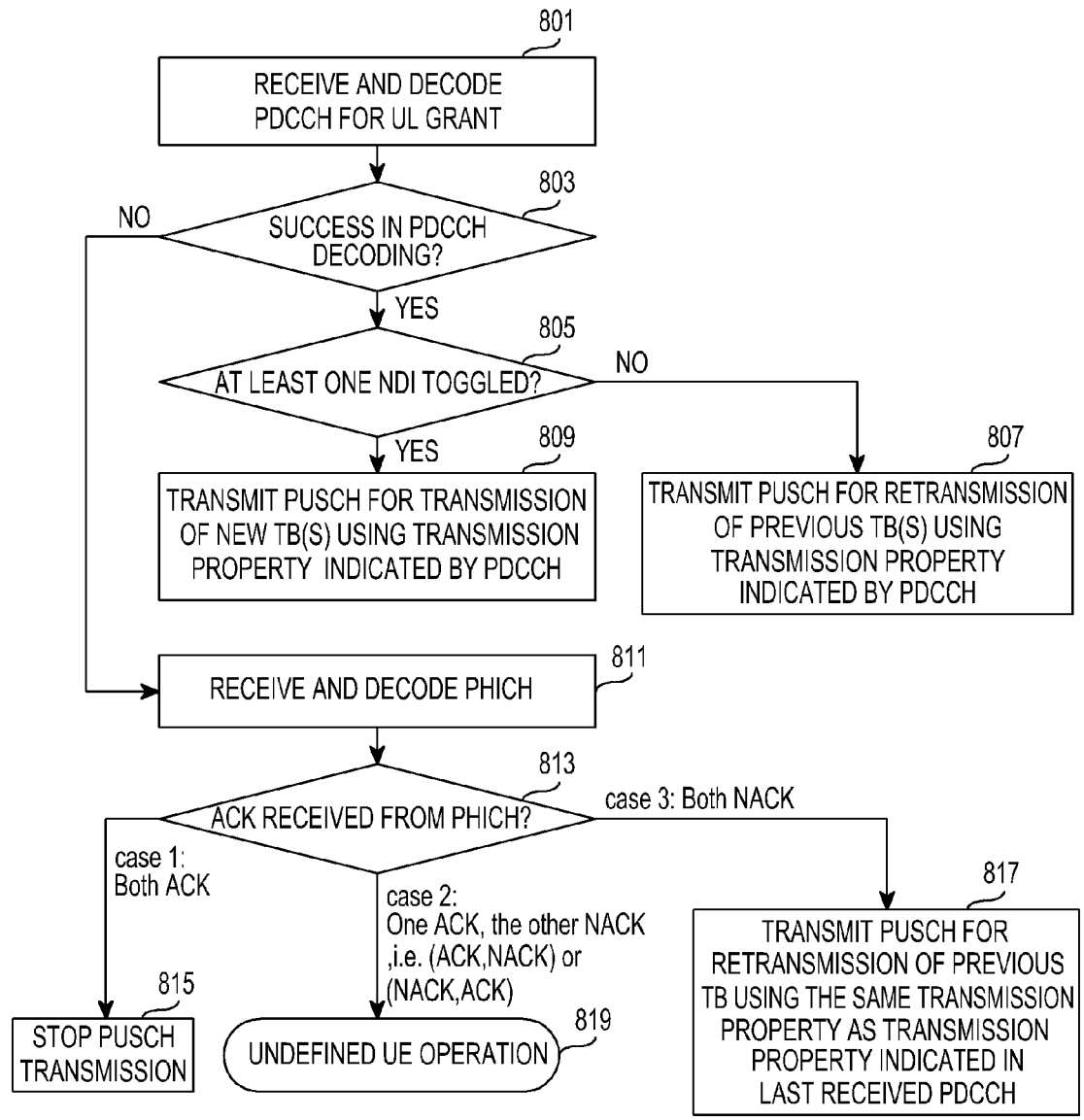
FIG. 8 is a flowchart illustrating a general operation of a UE in a wireless communication system supporting UL MIMO.

FIG. 8 illustrates a general operation of a UE in a wireless communication system supporting UL MIMO, in which the UE operation corresponds to the Node B operation in FIG. 7.

Referring to FIG. 8, a UE attempts to receive and decode a PDCCH for a UL grant in step 801, and determines in step 803 whether it has succeeded in decoding. If the UE has successfully decoded the PDCCH for a UL grant, the UE determines in step 805 whether an NDI has been toggled. Since UL MIMO transmission considered, it will be assumed herein that an initial grant indicates information about two TBs. Assuming that different NDIs are defined for different TBs, if both of the two NDIs have not been toggled from their previous values, corresponding to a UL grant indicating mere retransmission, then the UE retransmits the PUSCH by reflecting the new transmission property including a PMI in step 807. However, if any one of the two NDIs has been toggled, the UE proceeds to step 809, in which the TB corresponding to the toggled NDI should be newly transmitted, and the TB corresponding to the non-toggled NDI should be retransmitted. No matter whether each TB is subjected to retransmission or initial transmission, the transmission property including a PMI should follow the value indicated in the PDCCH. Even though only one NDI is defined regardless of the number of TBs, if the NDI has been toggled from its previous value, the UE performs step 809 to transmit a new TB. Otherwise, the UE performs step 807, for retransmission. In summary, in terms of precoding, upon receiving a PDCCH, a UE is allowed to transmit a PUSCH precoded by reflecting a PMI indicated in the PDCCH, regardless of whether the TB is for retransmission.

If the UE has failed to receive and decode a PDCCH in step 803, the UE attempts to receive and decode a PHICH in step 811. If ACK/NACK information for each TB is present in the PHICH, the UE may respond differently to the following three cases.

Case 1: ACKs are received for both of the two TBs. In this case, the UE does not need to transmit a PUSCH in step 815.

Case 2: An ACK is received for one TB, and a NACK is received for the other TB. In this case, the UE should inevitably change the rank value, because of a reduction in the number of TBs to be retransmitted. However, since a Node B has not separately provided a PMI (since the UE has failed to receive a PDCCH), the UE may not determine a precoding scheme to be used for PUSCH transmission. Therefore, the UE may not define its PUSCH transmission operation in step 819.

Case 3: NACKs are received for both of the two TBs, and the two TBs need to be retransmitted. In this case, because the UE has no change in rank and the Node B has not separately provided a PMI, the UE is allowed to retransmit the PUSCH by reflecting the transmission property including the PMI indicated in the last received UL grant, in step 817. In this case, however, the UE changes an RV in retransmission according to the rule of Incremental Redundancy (IR) synchronous HARQ. In a PUSCH retransmitted by the PHICH, an RV automatically increases without a separate instruction. As is well known in the art, an HARQ retransmission scheme is classified into Chase Combining (CC) and Incremental Redundancy (IR) schemes. CC is a scheme of transmitting the same signals both in retransmission and initial transmission so that a receiver may combine the signals in a symbol level. IR is a scheme of transmitting signals with different RVs in retransmission and initial transmission so that a receiver may combine the signals in a decoding process. IR is popularly used as a HARQ retransmission scheme despite its high reception complexity compared to CC, because it may additionally obtain a decoding gain. In synchronous HARQ, an RV is implicitly determined because a separate PDCCH for changing an RV is not transmitted in retransmission. For example, in the LTE system, a total of four RVs are defined (RV=0, 1, 2, 3), and if synchronous HARQ is applied, RVs are applied in order of {0,2,3,1} according to their transmission order.

In this general wireless communication system supporting UL MIMO, if some of multiple received TBs have been failed to be successfully decoded (e.g., only one of two TBs has been successfully decoded), a Node B should transmit a PDCCH indicating the transmission property in order to instruct a UE to retransmit the PUSCH. Otherwise, the UE may not determine the precoding scheme to be used for PUSCH transmission.

However, as described above, the transmission of a PDCCH may increase resource consumption for control information. Therefore, to reduce the transmission load regarding control information for retransmission in a UL, embodiments of the present invention provide a method for controlling UL HARQ only with a PHICH and determining a precoding scheme to be used in retransmission by a UE without transmission of a PDCCH in the LTE system supporting UL MIMO.

Structures of a UE's transmission device and a Node B's reception device, to which the method of determining a precoding scheme to be used in retransmission according to embodiments of the present invention are applied, are as shown in FIGS. 5 and 6, respectively. The UE's controller 241 and the Node B's controller 313 in FIGS. 5 and 6 determine a precoding scheme to be used in retransmission according to the procedures of FIGS. 10 and 9, respectively.

Figure 9:
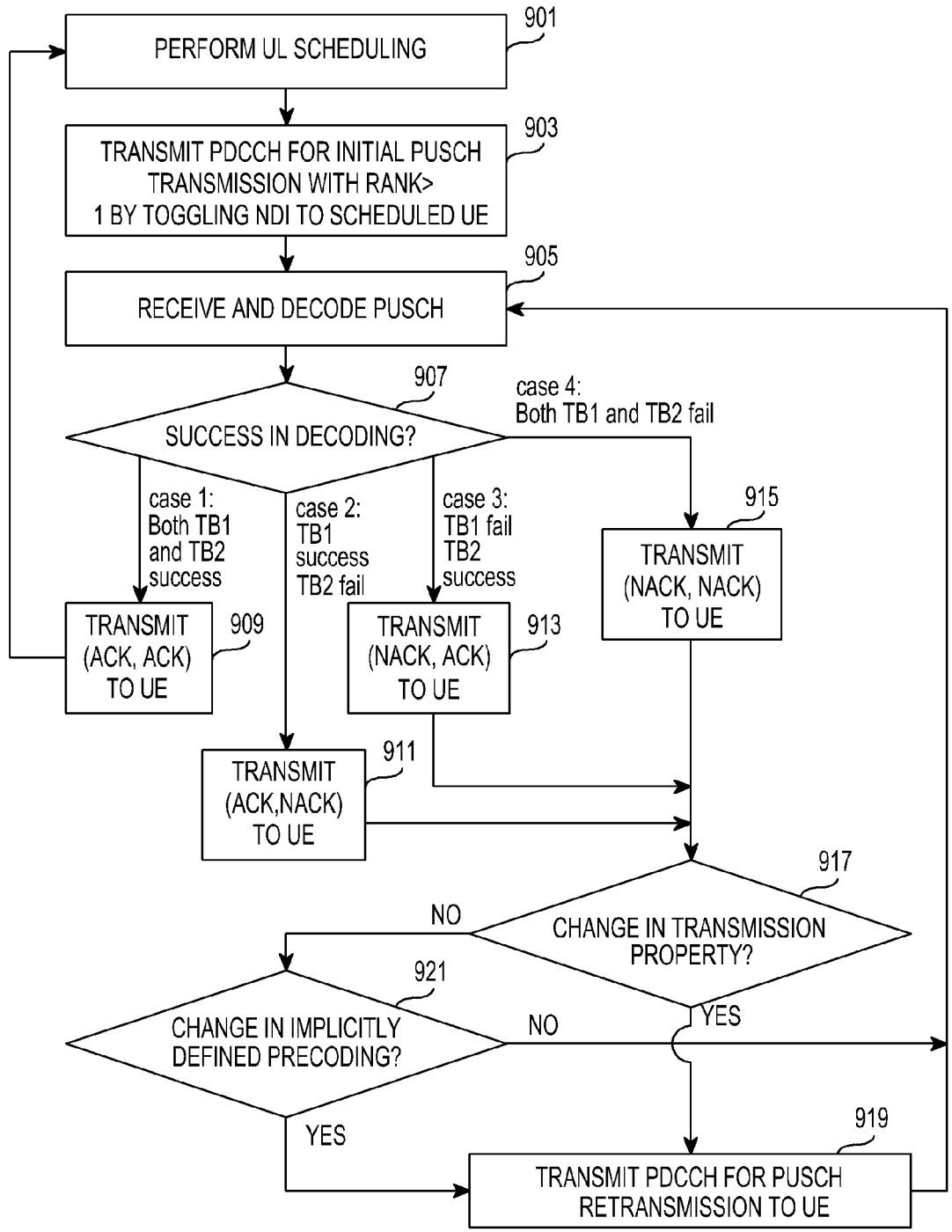
FIG. 9 is a flowchart illustrating a procedure for determining a precoding scheme in a Node B supporting UL MIMO, according to an embodiment of the present invention.

FIG. 9 illustrates a procedure for determining a precoding scheme in a Node B supporting UL MIMO, according to an embodiment of the present invention. The procedure of FIG. 9 partially overlaps the conventional procedure of FIG. 7. Therefore, the following description will be focused on the difference between the procedure of FIG. 9 and the conventional procedure of FIG. 7.

Referring FIG. 9, steps 901 to 907 in which a Node B performs UL scheduling to grant initial transmission of a PUSCH, receives/decodes the PUSCH transmitted by a UE, and determines the success/failure in decoding, are identical in operation to steps 701 to 707 in FIG. 7.

In step 907, the Node B determines if the decoding of the PUSCH is successful. Assuming that a UE has transmitted two TBs, there are four possible cases where the success/failure in decoding may be determined. In Case 1 where both of the two TBs have been successfully decoded, and Case 4 where both of the two TBs have been failed to be successfully decoded, the Node B proceeds to steps 909 and 915, respectively, and operates as in FIG. 7. However, in Cases 2 and 3 where one TB has been successfully decoded but the other TB has failed to be successfully decoded, the Node B proceeds to steps 911 and 913, respectively, and then performs step 917. In the conventional procedure of FIG. 7, step 917 (or 719) is performed only in Case 4 where both of the two TBs have failed to be successfully decoded. However, in the present invention, step 917 is performed even in Cases 2 and 3 where one of the two TBs has failed to be successfully decoded. In step 917, the Node B determines whether to change the transmission property for the initial transmission that the Node B informed the UE in step 903, in retransmission of the PUSCH. When determining to change the transmission property, the Node B performs step 919. Otherwise, the Node B performs step 921.

Embodiments of the present invention provide methods for implicitly determining which precoding it will use in the retransmission situation. In step 921, the Node B determines whether it will maintain the implicitly defined precoding, or indicate another precoding. When determining to maintain the implicitly defined precoding, the Node B returns to step 905 to receive and decode a PUSCH to which the implicitly defined precoding is applied, because there is no reason to transmit a PDCCH.

However, when determining to indicate a specific precoding scheme, instead of using the implicitly determined precoding, the Node B performs step 919 to specifically indicate the transmission property needed for PUSCH transmission through a PDCCH. The method of using the implicitly determined precoding is a method of determining precoding to be used during retransmission without transmission of the PDCCH, and will be described in greater detail in the following embodiments.

If the Node B indicates the resource-saving effects that when using the implicitly defined precoding, the Node B is not required to transmit a PDCCH, and also indicates specific precoding in step 921, the Node B determines whether to transmit a PDCCH by comparing the resource-saving effects with the advantages of AMC by which precoding most appropriate for the UL channel state can be applied. In this way, the present invention may enable the Node B to freely operate resources.

Figure 10:
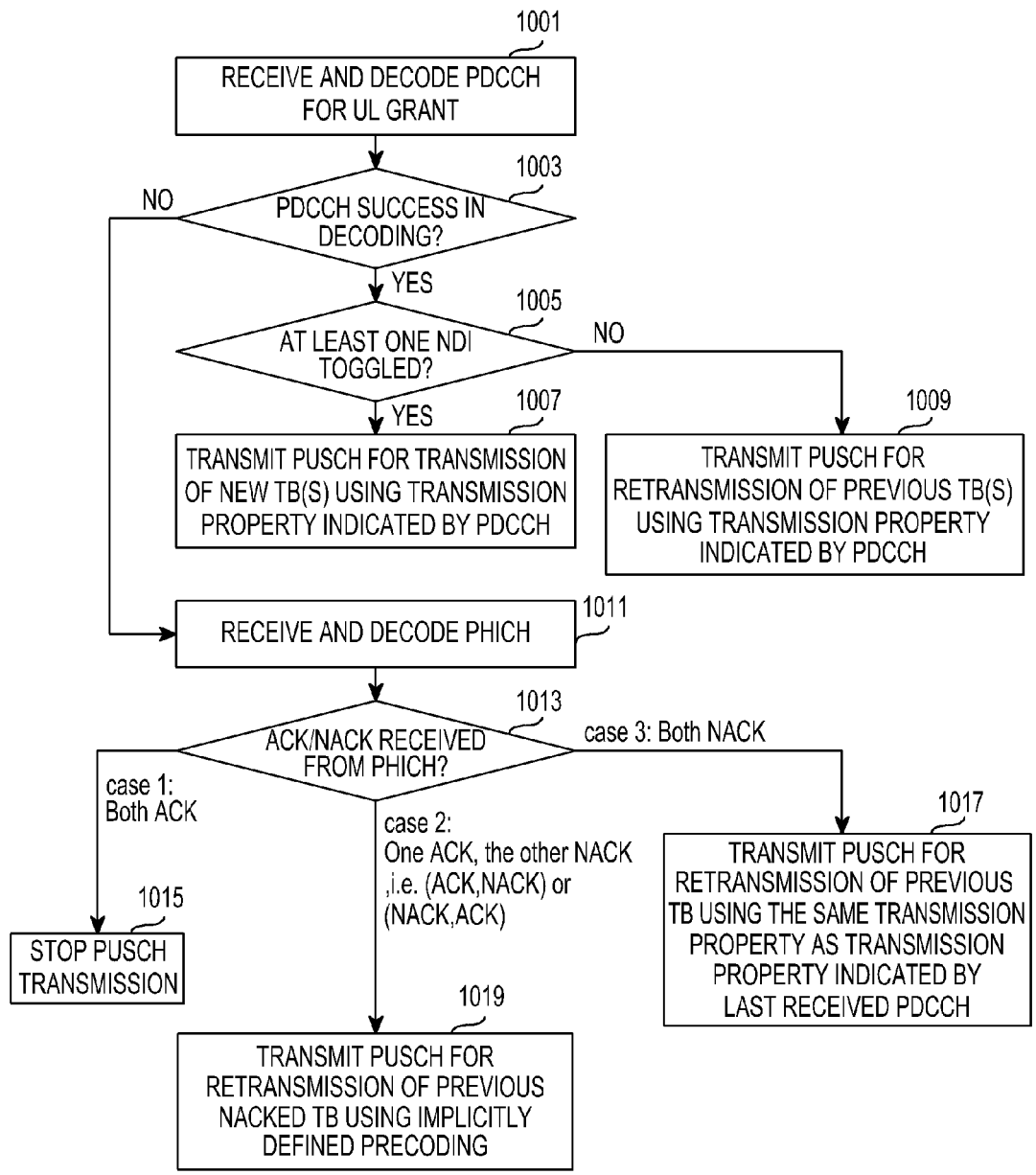
FIG. 10 is a flowchart illustrating a procedure for determining a precoding scheme in a UE supporting UL MIMO, according to an embodiment of the present invention.

FIG. 10 illustrates a procedure for determining a precoding scheme in a UE supporting UL MIMO, according to an embodiment of the present invention.

The procedure of FIG. 10 partially overlaps the conventional procedure of FIG. 8. Therefore, the following description will be focused on the difference between the procedure of FIG. 10 and the conventional procedure of FIG. 8.

In the conventional procedure of FIG. 8, if an ACK is received for one TB and a NACK is received for the other TB from a PHICH, an operation of the UE may not be defined (step 819 in FIG. 8). In this case, however, embodiments of the present invention perform step 1019 in FIG. 10. Steps 1001 to 1017 in FIG. 10 are identical in operation to steps 801 to 817 in FIG. 8. In steps 1001 to 1017, the UE attempts to receive and decode a PDCCH for a UL grant, determines if NDIs have been toggled, if the decoding of the PDCCH is successful, transmits a PUSCH precoded by reflecting a PMI indicated in the PDCCH, receives a PHICH if the decoding of the PDCCH is failed (or no PDCCH is transmitted), transmits a PUSCH if ACK/NACK information about TBs, included in the PHICH, indicates that ACKs are received for both of the two TBs, and retransmits the PUSCH by reflecting the transmission property indicated in the last received UL grant, if NACKs are received for both of the two TBs.

In step 1019, in retransmitting the PUSCH, the UE maintains all the transmission properties except for the precoding and the RV at values of the last received UL grant, determines the RV according to the conventional rule, and uses the implicitly determined precoding scheme. Regarding the method of implicitly determining the precoding to be used in retransmission according to the present invention, the related agreement is made between a Node B and a UE in advance. Therefore, if the UE receives an ACK for one TB and a NACK for the other TB, the UE may perform PUSCH retransmission by UL MIMO by merely receiving a PHICH in step 1019.

The method of implicitly determining the precoding to be used in retransmission will be described in detail below in the following embodiments. In accordance with the precoding determining method proposed in the following embodiments, the Node B performs step 921 in FIG. 9, and the UE performs step 1019 in FIG. 10.

Figure 11:
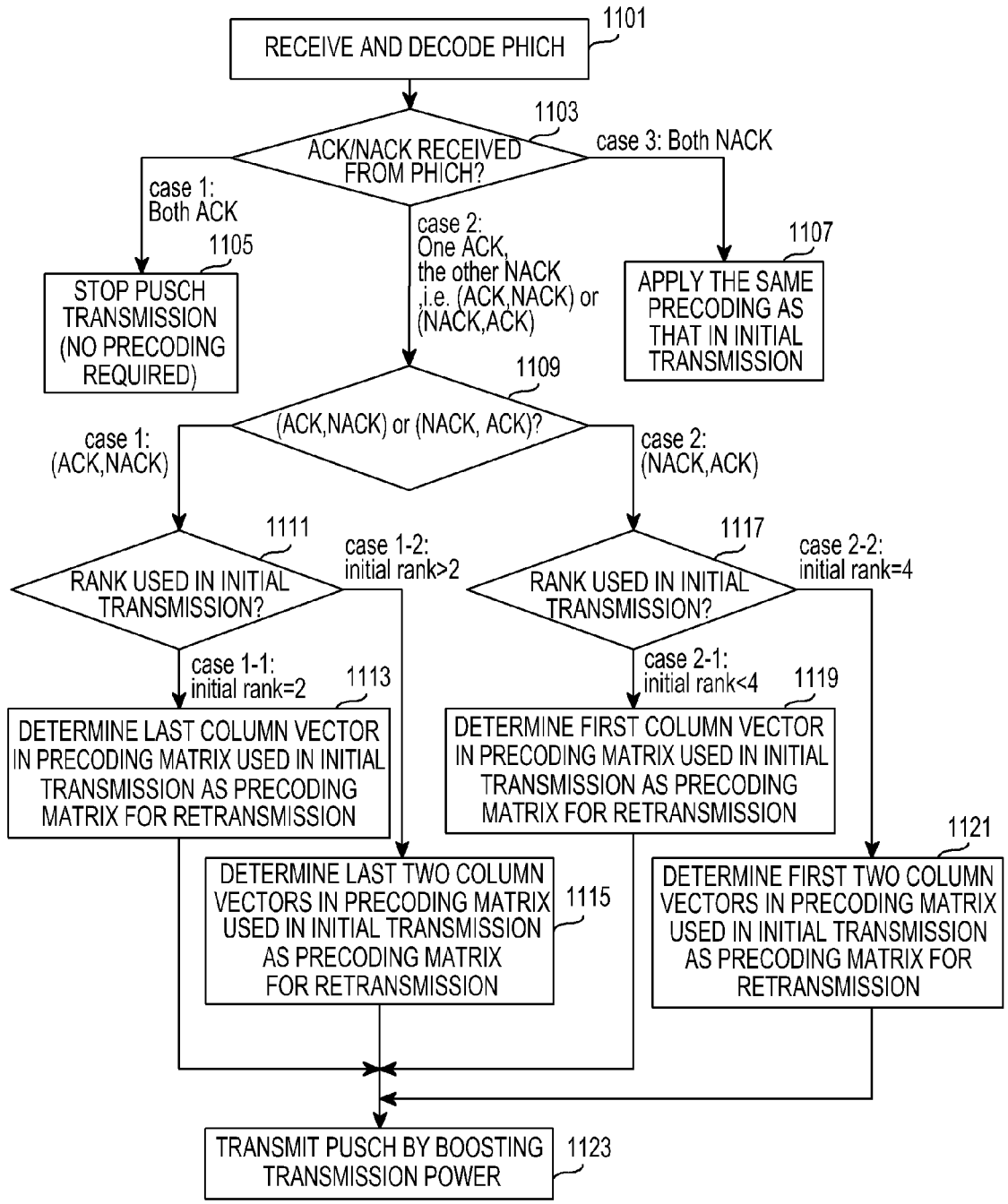
FIG. 11 is a flowchart illustrating a precoding determining method performed in a UE during retransmission, according to a first embodiment of the present invention.

FIG. 11 illustrates a precoding determining method performed in a UE during retransmission, according to a first embodiment of the present invention.

Referring to FIG. 11, a UE receives and decodes a PHICH in step 1101, and determines in step 1103 whether ACK/NACK information carried by the PHICH is an ACK. The determination results are classified into three different cases. In Case 1, where ACKs are received for both of two TBs, the UE stops retransmission of a PUSCH and does not require precoding information in step 1105. In Case 2, where an ACK is received for one TB but a NACK is received for the other TB, the UE specifically determines for which TB it has received an ACK in step 1109. In Case 3, where NACKs are received for both of the two TBs, the UE determines to reuse the precoding indicated in an initial grant in retransmission in step 1107.

In step 1109, if an ACK is received for one TB but a NACK is received for the other TB, the UE determines for which TB it has received an ACK. In Case 1 where (ACK, NACK) is identified, it is assumed that an ACK is identified for TB1 and a NACK is identified for TB2. In this case, the UE performs step 1111 and its succeeding steps. In Case 2 where (NACK, ACK) is identified, it is assumed that a NACK is identified for TB1 and an ACK is identified for TB2. In this case, the UE performs step 1117 and its succeeding steps.

Step 1111 corresponds to a process of determining which rank was used in initial transmission of a PUSCH. An initial rank is always greater than or equal to 2, because it is assumed herein that in initial transmission, two TBs are transmitted by UL MIMO. In Case 1-1 where it is determined in step 1111 that an initial rank is 2, the UE performs step 1113, and in Case 1-2 where an initial rank exceeds 2, the UE performs step 1115. In step 1113, the UE implicitly determines the last column vector in the precoding matrix used in initial transmission as a precoding matrix for retransmission (or a retransmission precoding matrix) without receiving a PDCCH. As shown in Table 1, if two TBs are transmitted, TB1 uses the first one or two column vectors in the precoding matrix, while TB2 uses the last one or two column vectors in the precoding matrix. An operation following step 1111 is performed in the (ACK, NACK) situation, and since TB2 should be retransmitted, the last column vector(s) are used for retransmission. Step 1113 is performed in Case 1-1 where an initial rank is 2, and if a rank is 2, each TB occupies one layer in initial transmission. Therefore, because TB2 should occupy one layer even in retransmission, only the last column vector is taken and determined as a retransmission precoding matrix. In step 1115, the last two column vectors in the precoding matrix used in initial transmission are determined as a retransmission precoding matrix. Step 1115 is performed when an initial rank is 3 or 4, and in this case, TB2 occupies two layers in initial transmission as in Table 1. Therefore, the last two column vectors are taken and determined as a precoding matrix so that TB2 may occupy two layers even in retransmission.

In Case 2 where it is determined in step 1109 that ACK/NACK information carried by the PHICH is identified as (NACK, ACK), the UE determines which rank was used in initial transmission of a PUSCH in step 1117. An initial rank is always greater than or equal to 2, because it is assumed herein that in initial transmission, two TBs are transmitted by UL MIMO. In Case 2-1 where it is determined in step 1117 that an initial rank is less than 4, the UE performs step 1119, and in Case 2-2 where an initial rank is 4, the UE performs step 1121. Step 1119 is for determining the first column vector in the precoding matrix used in initial transmission as a retransmission precoding matrix. An operation following step 1119 is performed in the (NACK, ACK) situation, and since TB1 should be retransmitted, the first column vector(s) in the precoding matrix are used for retransmission. Step 1119 is performed when an initial rank is 2 or 3, and if a rank is 2 or 3, TB1 occupies one layer in initial transmission. Therefore, since TB1 should occupy one layer even in retransmission, only the first column vector is taken and determined as a retransmission precoding matrix. Step 1121 is for determining the first two column vectors in the precoding matrix used in initial transmission as a retransmission precoding matrix. Step 1121 is performed when an initial rank is 4, and in this case, TB1 occupies two layers in initial transmission as in Table 1. Therefore, the first two column vectors are taken and determined as a retransmission precoding matrix so that TB1 may occupy two layers even in retransmission.

In summary, the precoding matrix used in initial transmission is reused intact in retransmission, but no signal is transmitted over the layer for transmitting the successfully received TB. Therefore, in the first embodiment of the present invention, the method of determining a retransmission precoding matrix may be called a method of blanking a layer for the successfully received TB.

A specific example of the first embodiment of the present invention is described below. It is assumed that in initial transmission, a matrix $P_0$ shown in Equation (2) below is used as a precoding matrix.

$$P_0 = \frac{1}{2}\begin{bmatrix} 1 & 0 & 0 \\ -1 & 0 & 0 \\ 0 & 1 & 0 \\ 0 & 0 & 1 \end{bmatrix} \quad (2)$$

In initial transmission, TB1 is precoded using a matrix $P_1$ in Equation (3) below, while TB2 is precoded using a matrix $P_2$ in Equation (3).

$$P_1 = \frac{1}{2}\begin{bmatrix} 1 \\ -1 \\ 0 \\ 0 \end{bmatrix}, P_2 = \frac{1}{2}\begin{bmatrix} 0 & 0 \\ 0 & 0 \\ 1 & 0 \\ 0 & 1 \end{bmatrix} \quad (3)$$

Upon receiving (NACK, ACK) from a PHICH, the UE uses the matrix $P_1$ as a retransmission precoding matrix since it should retransmit TB1. Upon receiving (ACK, NACK), the UE uses the matrix $P_2$ as a retransmission precoding matrix since it should retransmit TB2.

After implicitly determining the precoding matrix to be used in retransmission, the UE boosts its transmission power by XdB for PUSCH transmission in step 1123. Specifically, the UE performs implicit power boosting. A level by which the transmission power is boosted is variable depending on the precoding matrix to be used. According to the first embodiment of the present invention, in retransmission, not all transmission antennas of the UE can be used for retransmission. Therefore, the number of antennas used may decrease in retransmission. Actually, the UE cannot use more transmission antennas even though it may utilize more transmission power if using more transmission antennas. To solve this problem, during retransmission, transmission power may be implicitly boosted as much as the ratio of the number of antennas used in retransmission to the number of antennas used in initial transmission. For example, if the number of antennas used in initial transmission is 4 and the number of antennas used in retransmission is 2, the ratio is 4/2=2, making it possible to boost the transmission power by 3 dB (X=3). Although the method of performing implicit power boosting during PUSCH transmission has been described as an example of the embodiment of the present invention, another method of not boosting transmission power of a PUSCH to reduce interference to other users even in the conditions in which the transmission power of the PUSCH can be boosted, may be defined as another example.

Figure 12:
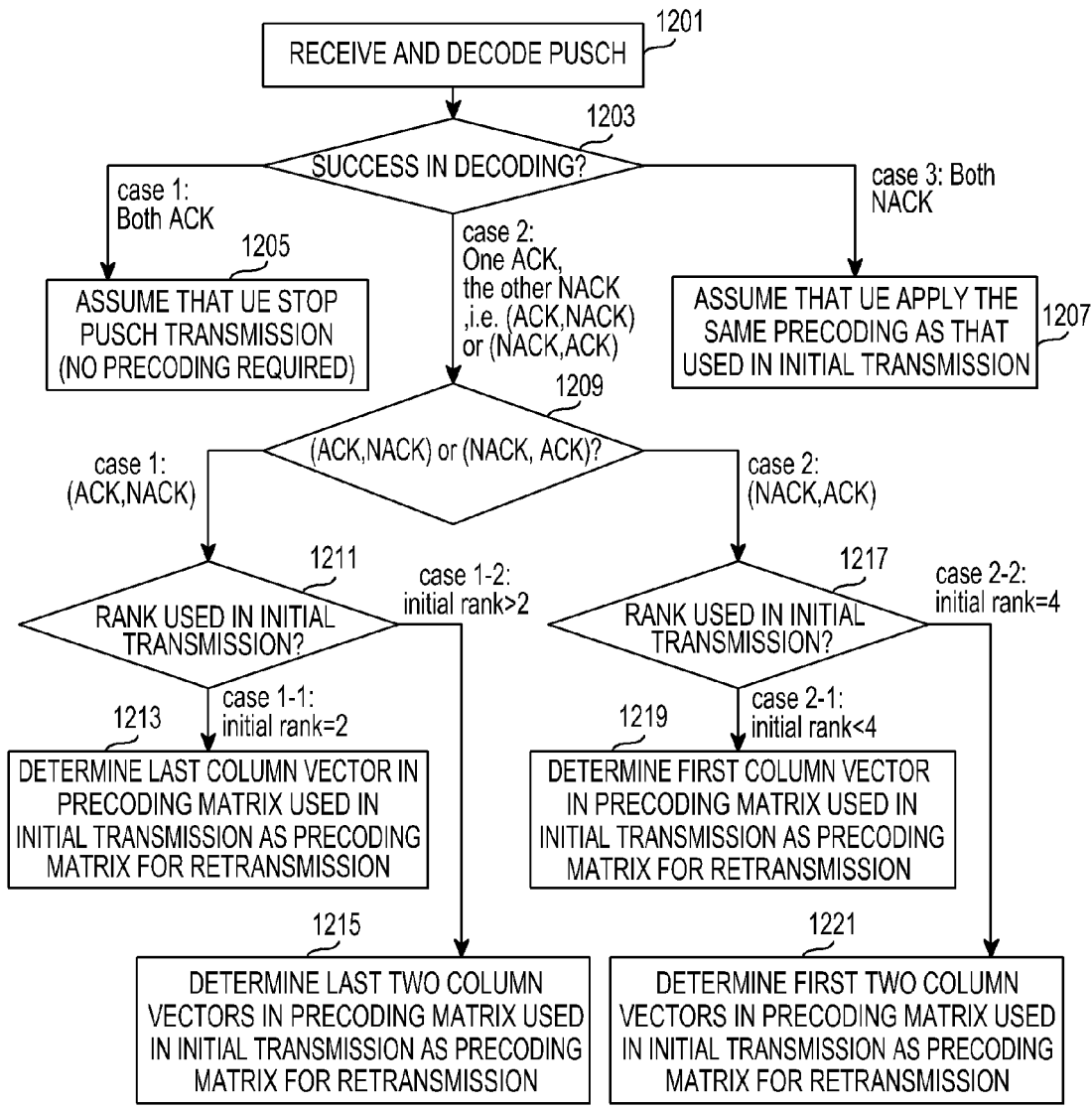
FIG. 12 is a flowchart illustrating a precoding determining method performed in a Node B during retransmission, according to the first embodiment of the present invention.

FIG. 12 illustrates a precoding determining method performed in a Node B during retransmission according to the first embodiment of the present invention, in which the procedure of FIG. 12 is assumed to be performed in step 921 in FIG. 9. It is to be noted that a method of determining (assuming) a precoding scheme used by a UE during retransmission by a Node B in steps 1205 to 1221 in FIG. 12 is identical to the method of determining (defining) a precoding scheme by a UE in steps 1105 to 1121 in FIG. 11.

Referring to FIG. 12, a Node B receives and decodes a PUSCH transmitted by a UE in step 1201, and determines in step 1203 whether the decoding of the PUSCH is successful by determining whether ACK/NACK information transmitted to the UE over a PHICH is an ACK or a NACK. The determination results are classified into three different cases. In Case 1, where (ACK, ACK) are transmitted in step 909 in FIG. 9 as both of two TBs have been successfully decoded, the Node B assumes that the UE will stop retransmission of the PUSCH, and does not need precoding information, in step 1205. In Case 2, where an ACK is transmitted for one TB but a NACK is transmitted for the other TB as in steps 911 and 913 in FIG. 9, the Node B specifically determines for which TB it has transmitted an ACK in step 1209. In Case 3, where (NACK, NACK) are transmitted for both TBs in step 915 in FIG. 9 as both of the two TBs have been failed to be successfully decoded, the Node B assumes in step 1207 that the UE will reuse the precoding indicated in an initial grant in retransmission.

In step 1209, the Node B determines for which TB it has transmitted an ACK, when it transmitted an ACK for one TB and a NACK for the other TB. In Case 1, where (ACK, NACK) is identified, it is assumed that an ACK is identified for TB1 and a NACK is identified for TB2. In this case, the Node B performs step 1211 and its succeeding steps. In Case 2, where (NACK, ACK) is identified, it is assumed that a NACK is identified for TB1 and an ACK is identified for TB2. In this case, the Node B performs 1217 and its succeeding steps.

Step 1211 corresponds to a process of determining which rank was used in initial transmission of a PUSCH in Case 1. An initial rank is always greater than or equal to 2, because it is assumed herein that in initial transmission, two TBs are transmitted by UL MIMO. In Case 1-1 where it is determined in step 1211 that an initial rank is 2, the Node B performs step 1213, and in Case 1-2 where an initial rank exceeds 2, the Node B performs step 1215. In step 1213, the Node B implicitly determines (assumes) the last column vector in the precoding matrix used in initial transmission as a retransmission precoding matrix used by the UE. In step 1215, the Node B implicitly determines the last two column vectors in the precoding matrix used in initial transmission as a retransmission precoding matrix used by the UE.

On the other hand, in Case 2, the Node B determines which rank was used in initial transmission of a PUSCH, in step 1217. An initial rank is always greater than or equal to 2, because it is assumed herein that in initial transmission, two TBs are transmitted by UL MIMO. In Case 2-1 where it is determined in step 1217 that an initial rank is less than 4, the Node B performs step 1219, and in Case 2-2 where an initial rank is 4, the Node B performs step 1221. In step 1219, the Node B implicitly determines the first column vector in the precoding matrix used in initial transmission as a retransmission precoding matrix. In step 1221, the Node B implicitly determines the first two column vectors in the precoding matrix used in initial transmission as a retransmission precoding matrix.

The precoding matrixes for retransmission are determined as in steps 1213, 1215, 1219, and 1221 for reasons described in detail with reference to FIG. 11.

As described in connection with FIGS. 11 and 12, as a UE and a Node B implicitly determine in the same way the precoding scheme to be used during retransmission if ACK/NACK information for, for example, two TBs is identified as (ACK, NACK) or (NACK, ACK), they are not required to transmit/receive a PDCCH indicating a precoding scheme during retransmission, thereby making it possible to reduce the transmission load caused by frequent transmission and reception of a PDCCH.

The basic concept of a second embodiment of the present invention is that a precoding matrix to be used in retransmission is determined in advance. To this end, in the second embodiment of the present invention, the concept of a default codebook is newly defined and one of the precoding matrixes defined in the default codebook is selected and used for retransmission. One or more precoding matrixes may be defined in the default codebook. If only one precoding matrix is defined in the default codebook, only the precoding matrix can be used in retransmission. Otherwise, if multiple precoding matrixes are defined in the default codebook, a precoding matrix is selected and used from among the multiple precoding matrixes according to a predetermined rule in retransmission. Regarding a rule of selecting a precoding matrix in retransmission, the following methods are available.

i. Selecting a precoding matrix according to an RV value: In the LTE system, since a total of four RVs are defined, a default codebook using this rule may include four precoding matrixes. In the LTE system, UL HARQ is set to transmit a different RV in every retransmission, thereby obtaining the effect of applying a different precoding matrix in every retransmission. This rule is to obtain the possible maximum spatial diversity gain in retransmission considering that AMC is not appropriately operating, if a TB has not been successfully decoded in initial transmission.

ii. Selecting a precoding matrix according to a system frame number or a subframe number: In the LTE system, system frame numbers and subframe numbers are defined to number resources in the time domain. In the LTE system, a system frame, which is a 10-ms resource, includes 10 subframes. The subframe is a 1-ms resource, and a subframe number is initialized in every system frame. For example, assume that Q precoding matrixes are defined in a default codebook. If a system frame number of the time resource at which retransmission occurs is represented by $n_{SFN}$, and a subframe number is represented by n, then k is calculated in accordance with Equation (4) below, and a k-th matrix in the default codebook is used as a precoding matrix. Here, 'mod (A, B)' represents a remainder obtained by dividing A by B. If only the system frame number is used as an input factor for determining a precoding matrix, '$k=\mathrm{mod}(n_{SFN}, Q)$' is used to determine a precoding matrix. If only the subframe number is used as an input factor for determining a precoding matrix, '$k=\mathrm{mod}(n, Q)$' is used to determine a precoding matrix. This rule is also for obtaining a spatial diversity gain in retransmission.

$$k=\mathrm{mod}(10 \times n_{SFN}+n, Q) \quad (4)$$

Figure 13:
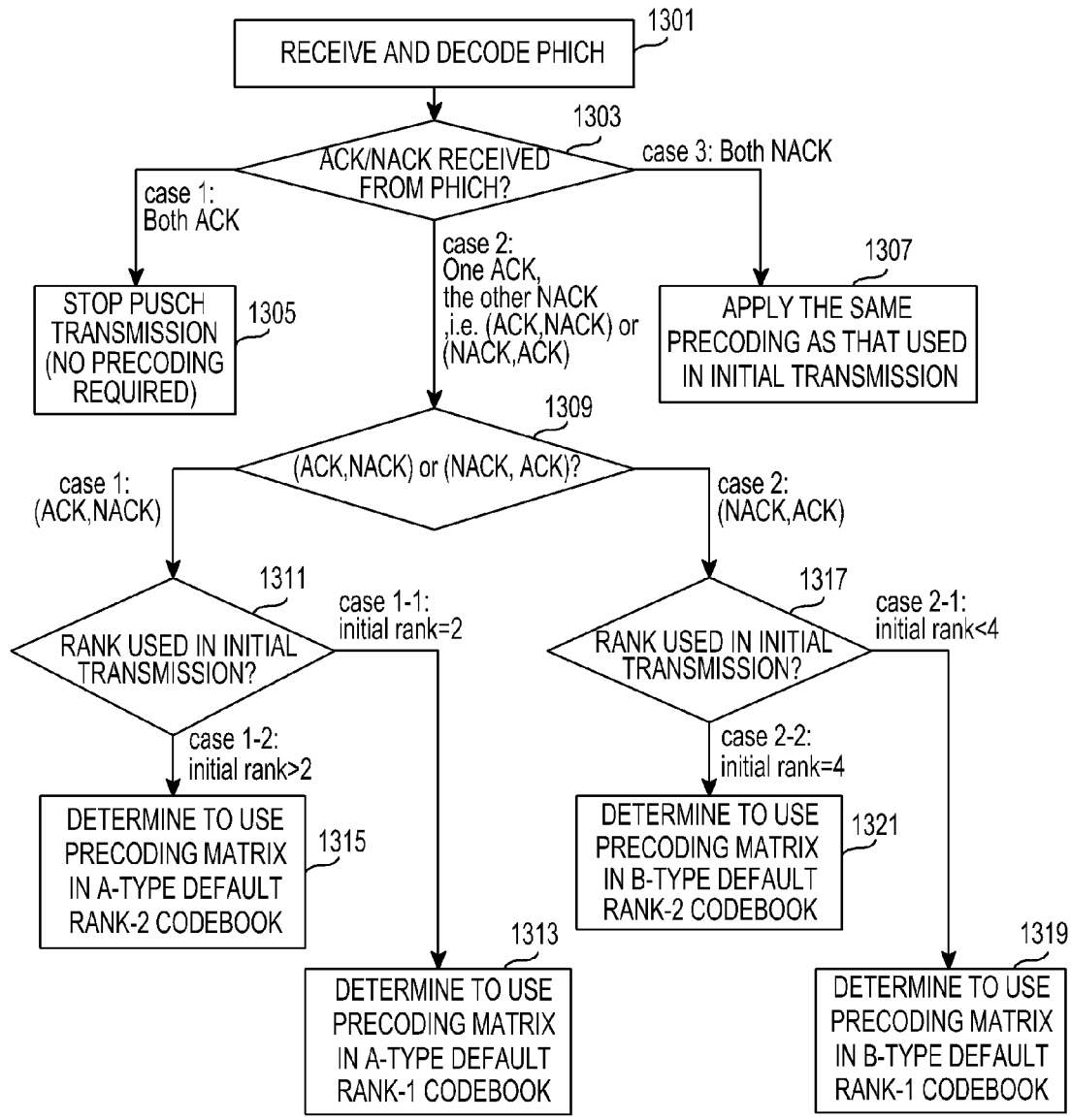
FIG. 13 is a flowchart illustrating a precoding determining method performed in a UE during retransmission, according to a second embodiment of the present invention.

FIG. 13 illustrates a precoding determining method performed in a UE during retransmission, according to the second embodiment of the present invention, in which steps 1301 to 1317 are identical in operation to steps 1101 to 1117 in FIG. 11.

Referring to FIG. 13, in Case 1-1, where it is determined in step 1311 that a UE has received (ACK, NACK) from a PHICH and an initial rank was 2, the UE determines to use a precoding matrix in an A-type default rank-1 codebook in step 1313. In Case 1-2, where it is determined in step 1311 that the UE has received (ACK, NACK) from a PHICH and an initial rank was exceeding 2, the UE determines to use a precoding matrix in an A-type default rank-2 codebook in step 1315. An A-type default codebook is for retransmitting a second TB. A method of selecting a precoding matrix in a default codebook follows any one of the rule (i) of selecting a precoding matrix according to the RV value, and the rule (ii) of selecting a precoding matrix according to the system frame number or the subframe number.

In Case 2-1 where it is determined in step 1317 that the UE has received (NACK, ACK) from a PHICH and an initial rank is less than 4, the UE determines to use a precoding matrix in a B-type default rank-1 codebook in step 1319. In Case 2-2 where it is determined in step 1317 that the UE has received (NACK, ACK) from a PHICH and an initial rank is 4, the UE determines to use a precoding matrix in a B-type default rank-2 codebook in step 1321. A B-type default codebook is used for retransmission of a first TB, and a method of selecting a precoding matrix in a default codebook follows any one of the rules (i) and (ii).

While the A-type default codebook and the B-type default codebook are separately defined in the foregoing description, the A-type default codebook and the B-type default codebook may be designed to be identical to each other, if the default codebooks are defined regardless of which TB is retransmitted by the default codebooks. Instead, a rule of specifically determining which precoding matrix in a default codebook is to be used in retransmission may be different for every TB.

In summary, using a function of an RV or a time resource number, a precoding matrix is selected in a default codebook that is defined according to which rank transmission is performed and which TB is transmitted in retransmission regardless of the precoding matrix used in initial transmission. Therefore, this method may be called a default codebook method.

Figure 14:
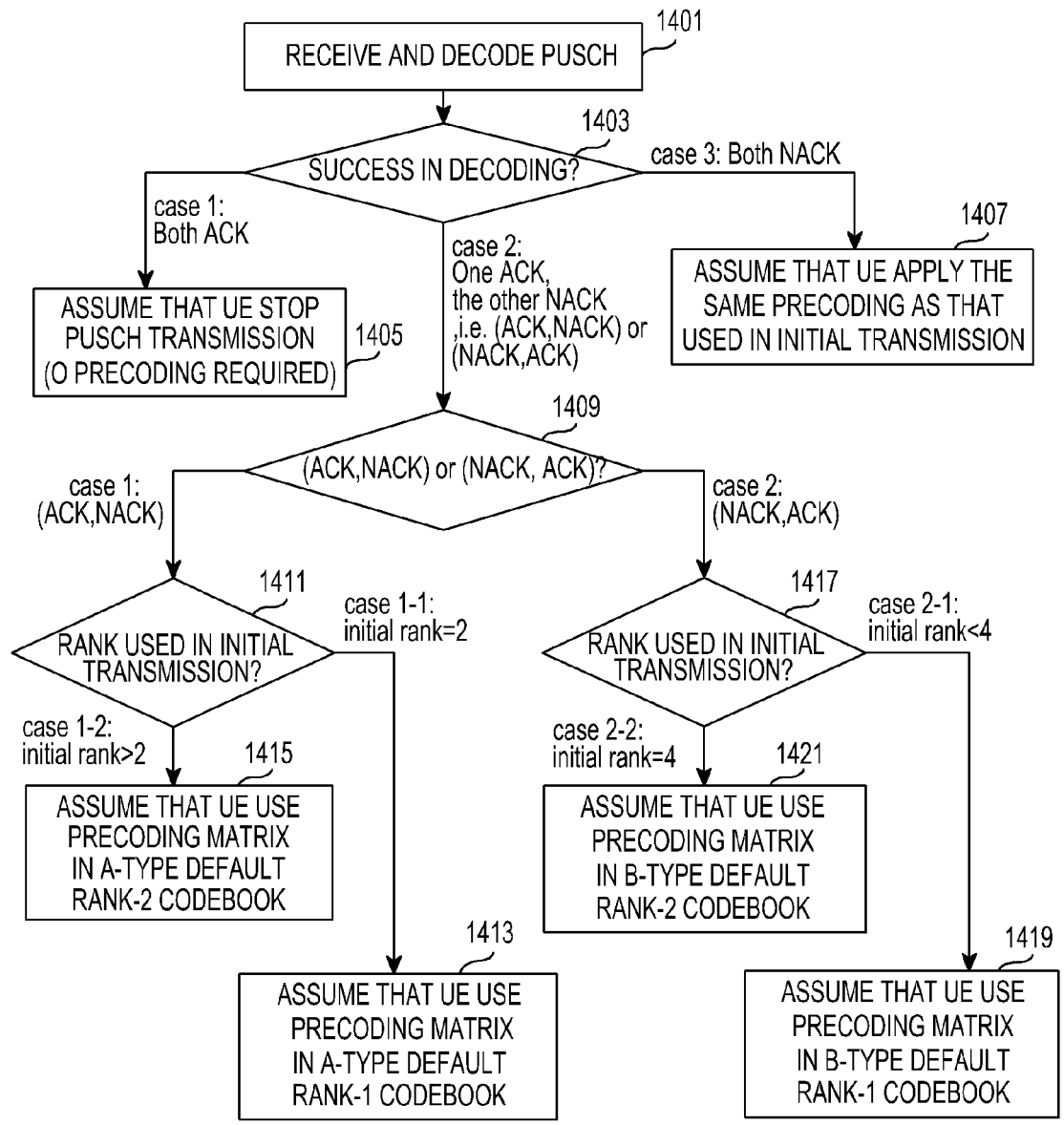
FIG. 14 is a flowchart illustrating a precoding determining method performed in a Node B during retransmission, according to the second embodiment of the present invention.

FIG. 14 illustrates a precoding determining method performed in a Node B during retransmission, according to the second embodiment of the present invention.

The procedure of FIG. 14 is assumed to be performed in step 921 of FIG. 9. It is to be noted that a method of determining (assuming) a precoding scheme used by a UE during retransmission by a Node B in steps 1405 to 1421 in FIG. 14 is identical to the method of determining (defining) a precoding scheme by a UE in steps 1305 to 1321 in FIG. 13. Since steps 1401 to 1417 in FIG. 14 are identical in operation to steps 1201 to 1217 in FIG. 12, a detailed description thereof will be omitted.

Referring to FIG. 14, in Case 1-1, where it is determined in step 1411 that decoding results on two TBs are (ACK, NACK) and an initial rank was 2, the Node B determines (assumes) in step 1413 that a UE uses a precoding matrix in an A-type default rank-1 codebook. In Case 1-2, where it is determined in step 1411 that decoding results on two TBs are (ACK, NACK) and an initial rank exceeds 2, the Node B determines (assumes) in step 1415 that a UE uses a precoding matrix in an A-type default rank-2 codebook.

On the other hand, in Case 2-1, where it is determined in step 1417 that decoding results on two TBs are (NACK, ACK) and an initial rank is less than 4, the Node B determines (assumes) in step 1419 that a UE uses a precoding matrix in a B-type default rank-1 codebook. In Case 2-2, where it is determined in step 1417 that decoding results on two TBs are (NACK, ACK) and an initial rank is 4, the Node B determines (assumes) in step 1421 that a UE uses a precoding matrix in a B-type default rank-2 codebook.

An A-type default codebook is used for retransmission of a second TB, while a B-type default codebook is used for retransmission of a first TB. A method of selecting a precoding matrix in the A-type default codebook and the B-type default codebook by a Node B follows any one of the rule (i) of selecting a precoding matrix according to the RV value and the rule (ii) of selecting a precoding matrix according to the system frame number or the subframe number.

The basic concept of a third embodiment is that a precoding matrix to be used in retransmission is selected in a codebook having a functional relationship with a precoding matrix indicated in an initial grant of a PUSCH. For the functional relationship, various known functional formulae applicable to matrixes may be used. To this end, in this embodiment of the present invention, the 'mother-child pair' concept is newly defined in precoding matrixes. A precoding matrix indicated in an initial grant of a PUSCH serves as a mother precoding matrix, and one of the precoding matrixes in a child codebook defined by a functional relationship determined from a function of the mother precoding matrix is selected and used for retransmission. One or more precoding matrixes may be defined in the default codebook. If only one precoding matrix is defined in the child codebook, only the precoding matrix can be used in retransmission. Otherwise, if multiple precoding matrixes are defined in the child codebook, a precoding matrix is selected and used from among the child codebook according to a predetermined rule in retransmission. As to a rule of selecting a precoding matrix in retransmission, the following rules mentioned in the second embodiment may be used.

i. Selecting a precoding matrix according to an RV value; and ii. Selecting a precoding matrix according to a system frame number or a subframe number The technical basis of using the child codebook is as follows. If a change in the spatial signature of a channel was not significant between initial transmission and retransmission, using a child precoding matrix similar to a mother precoding matrix will help increase a MIMO gain. Therefore, a functional relationship for enabling decision on a child precoding matrix is given according to what mother precoding matrix was used. If a MIMO gain was not high despite a definition of one child precoding matrix, multiple child precoding matrixes may be defined as a child codebook and one of the child precoding matrixes may be selected and used in retransmission according to the above rules.

Figure 15:
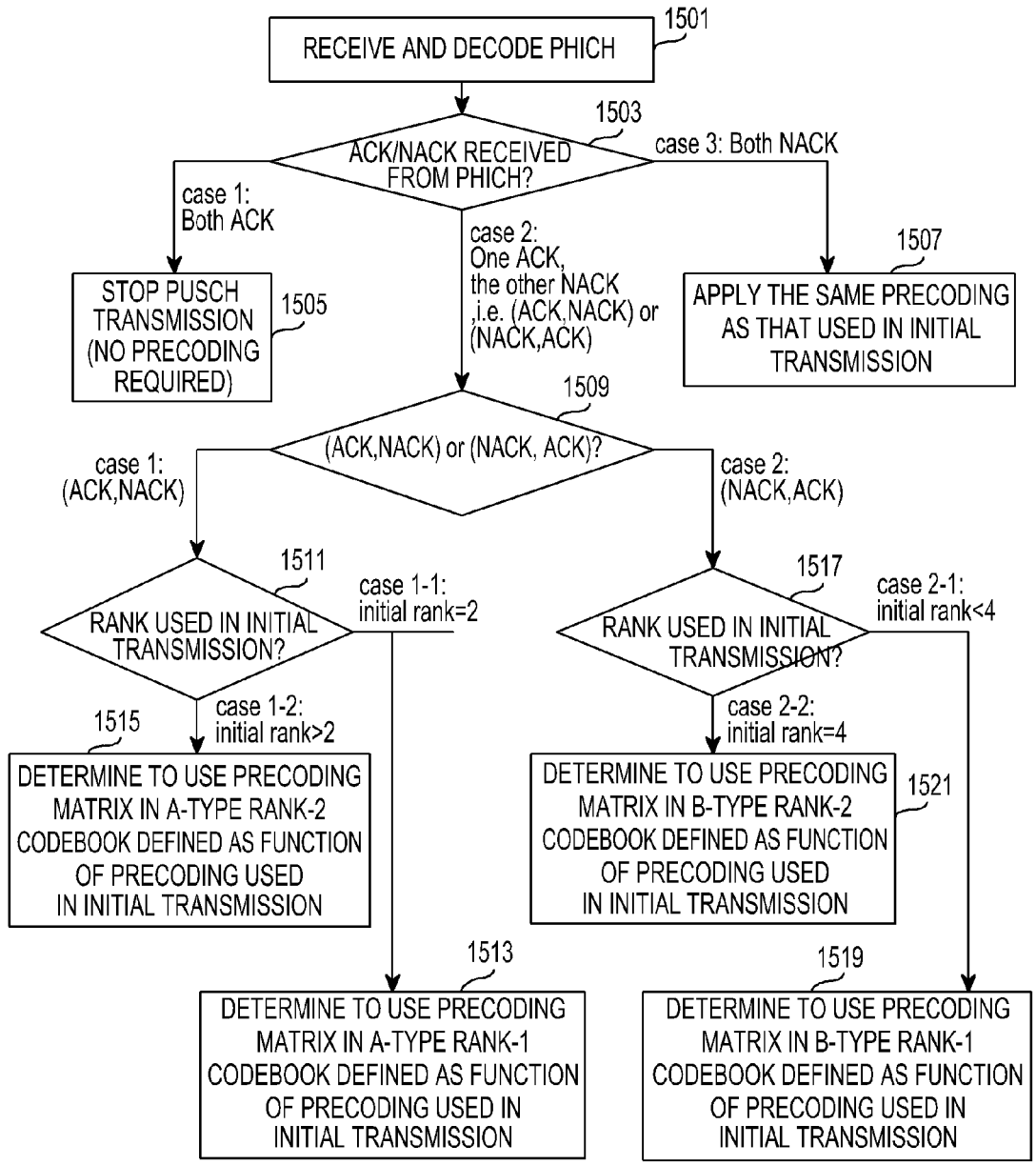
FIG. 15 is a flowchart illustrating a precoding determining method performed in a UE during retransmission, according to a third embodiment of the present invention.

FIG. 15 illustrates a precoding determining method performed in a UE during retransmission, according to the third embodiment of the present invention. Steps 1501 to 1517 in FIG. 15 are identical in operation to steps 1101 to 1117 in FIG. 11, so a detailed description thereof will be omitted.

Referring to FIG. 15, in Case 1-1, where it is determined in step 1511 that a UE has received (ACK, NACK) from a PHICH and an initial rank was 2, the UE determines to use a precoding matrix in an A-type rank-1 child codebook in step 1513. As described above, a child codebook is defined from a precoding matrix used in initial transmission using a predetermined functional relationship. In Case 1-2, where it is determined in step 1511 that the UE has received (ACK, NACK) from a PHICH and an initial rank exceeds 2, the UE determines to use a precoding matrix in an A-type rank-2 child codebook in step 1515. An A-type child codebook is to be used for retransmission of a second TB. A method of selecting a precoding matrix in a child codebook follows any one of the rules (i) and (ii).

In Case 2-1, where it is determined in step 1517 that the UE has received (NACK, ACK) from a PHICH and an initial rank is less than 4, the UE determines to use a precoding matrix in a B-type rank-1 child codebook in step 1519. In Case 2-2, where it is determined in step 1517 that the UE has received (NACK, ACK) from a PHICH and an initial rank is 4, the UE determines to use a precoding matrix in a B-type rank-2 child codebook in step 1521. A B-type child codebook is used for retransmission of a first TB. A method of selecting a precoding matrix in a child codebook follows any one of the rules (i) and (ii).

While the A-type child codebook and the B-type child codebook are separately defined in the foregoing description, the A-type child codebook and the B-type child codebook may be designed to be identical to each other, if the child codebooks are defined regardless of which TB is retransmitted by the child codebooks. Instead, a rule of specifically determining which precoding matrix in a child codebook is to be used in retransmission may be different for every TB.

In summary, using a function of an RV or a time resource number (e.g., a system frame number and a subframe number), a precoding matrix is selected in a child codebook that is determined according to a precoding matrix used in initial transmission, and which rank transmission is performed and which TB is transmitted in retransmission. Therefore, this method may be called a mother-child pair method.

Figure 16:
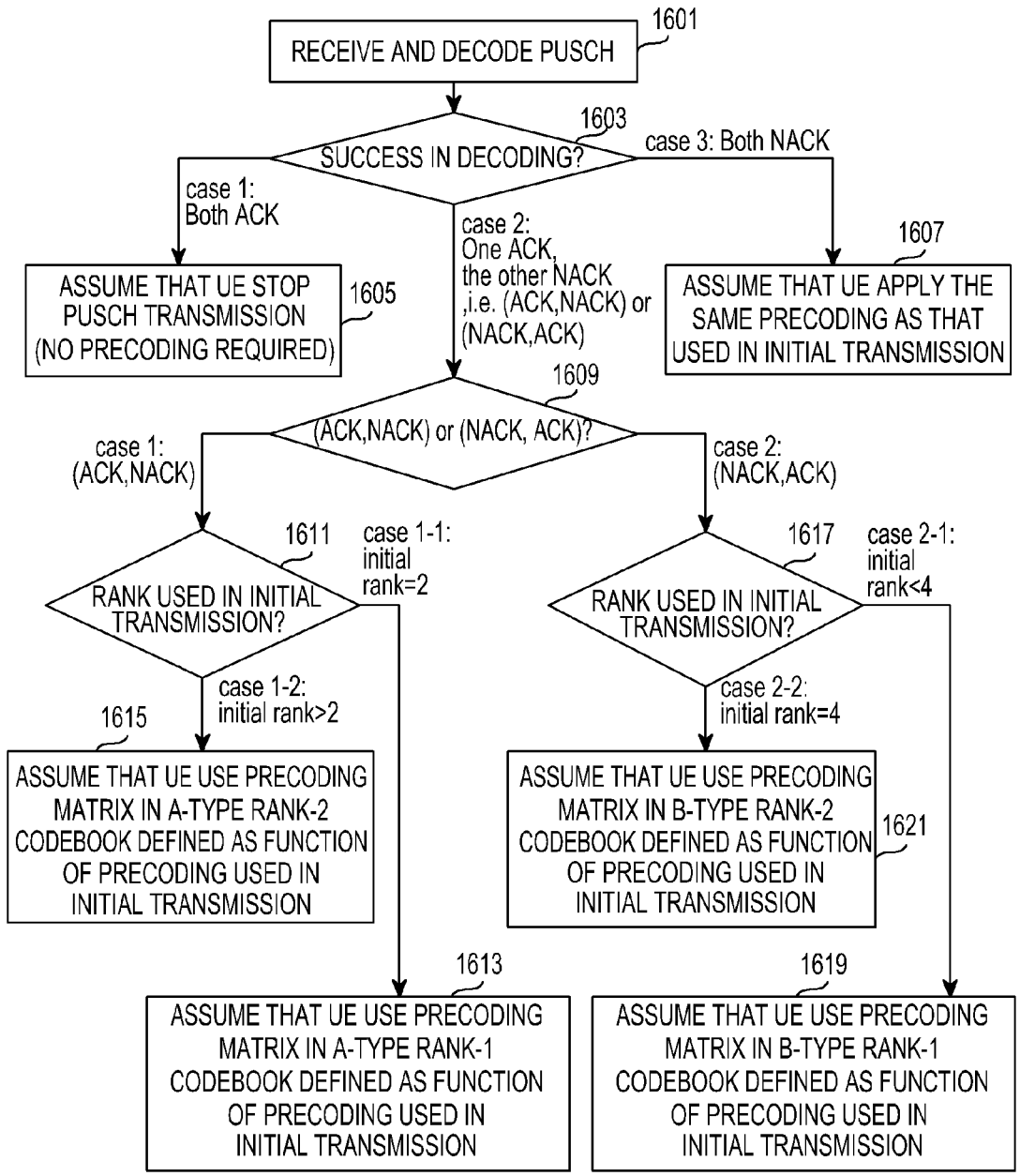
FIG. 16 is a flowchart illustrating a precoding determining method performed in a Node B during retransmission, according to the third embodiment of the present invention.

FIG. 16 illustrates a precoding determining method performed in a Node B during retransmission, according to the third embodiment of the present invention.

The procedure of FIG. 16 is assumed to be performed in step 921 of FIG. 9. It is to be noted that a method of determining (assuming) a precoding scheme used by a UE during retransmission by a Node B in steps 1605 to 1621 in FIG. 16 is identical to the method of determining (defining) a precoding scheme by a UE in steps 1505 to 1521 in FIG. 15. Since steps 1601 to 1617 in FIG. 16 are identical in operation to steps 1201 to 1217 in FIG. 12, a detailed description thereof will be omitted.

Referring to FIG. 16, in Case 1-1, where it is determined in step 1611 that decoding results on two TBs are (ACK, NACK) and an initial rank was 2, a Node B determines (assumes) in step 1613 that a UE uses a precoding matrix in an A-type rank-1 child codebook. As described above, a child codebook is defined from a precoding matrix used in initial transmission using a predetermined functional relationship. In Case 1-2, where it is determined in step 1611 that decoding results on two TBs are (ACK, NACK) and an initial rank exceeds 2, the Node B determines (assumes) in step 1615 that a UE uses a precoding matrix in an A-type rank-2 child codebook.

In Case 2-1, where it is determined in step 1617 that decoding results on two TBs are (NACK, ACK) and an initial rank is less than 4, the Node B determines (assumes) in step 1619 that a UE uses a precoding matrix in a B-type rank-1 child codebook. In Case 2-2, where it is determined in step 1617 that decoding results on two TBs are (NACK, ACK) and an initial rank is 4, the Node B determines (assumes) in step 1621 that a UE uses a precoding matrix in a B-type rank-2 child codebook.

An A-type child codebook is used for retransmission of a second TB, while a B-type child codebook is used for retransmission of a first TB. A method of selecting a precoding matrix in the A-type child codebook and the B-type child codebook by a Node B follows any one of the rule (i) of selecting a precoding matrix according to the RV value and the rule (ii) of selecting a precoding matrix according to the system frame number or the subframe number.

The basic concept of a fourth embodiment of the present invention is that a precoding matrix to be used in retransmission is informed (indicated) together in an initial grant of a PUSCH. In the conventional method, a precoding matrix to be used in initial transmission is indicated by a PMI in an initial grant. However, in the fourth embodiment of the present invention, in addition to the precoding matrix to be used in initial transmission, a precoding matrix to be used when retransmission should be performed responding only to a PHICH, or its candidate group, may be additionally indicated by a PMI in an initial grant. A candidate precoding matrix group for retransmission, indicated by a PMI in an initial grant, will be referred to as a codebook for retransmission (or a retransmission codebook). One or more precoding matrixes may be defined in a retransmission codebook. If only one precoding matrix is defined in a retransmission codebook, only the precoding matrix can be used in retransmission. Otherwise, if multiple precoding matrixes are defined in a retransmission codebook, a precoding matrix is selected and used according to a specific rule in retransmission. As to a rule of selecting a precoding matrix in retransmission, the following rules mentioned in the second embodiment may be used.

i. Selecting a precoding matrix according to an RV value; and ii. Selecting a precoding matrix according to a system frame number or a subframe number The technical basis of using the retransmission codebook is similar to that of the third embodiment of the present invention. Specifically, if a change in the spatial signature of a channel was not significant between initial transmission and retransmission, using a precoding matrix similar to the precoding matrix used in initial transmission, for retransmission, will help increase a MIMO gain. However, a Node B may best know which precoding matrix it should use to help increase a MIMO gain. Therefore, a retransmission codebook is indicated together in an initial grant.

Figure 17:
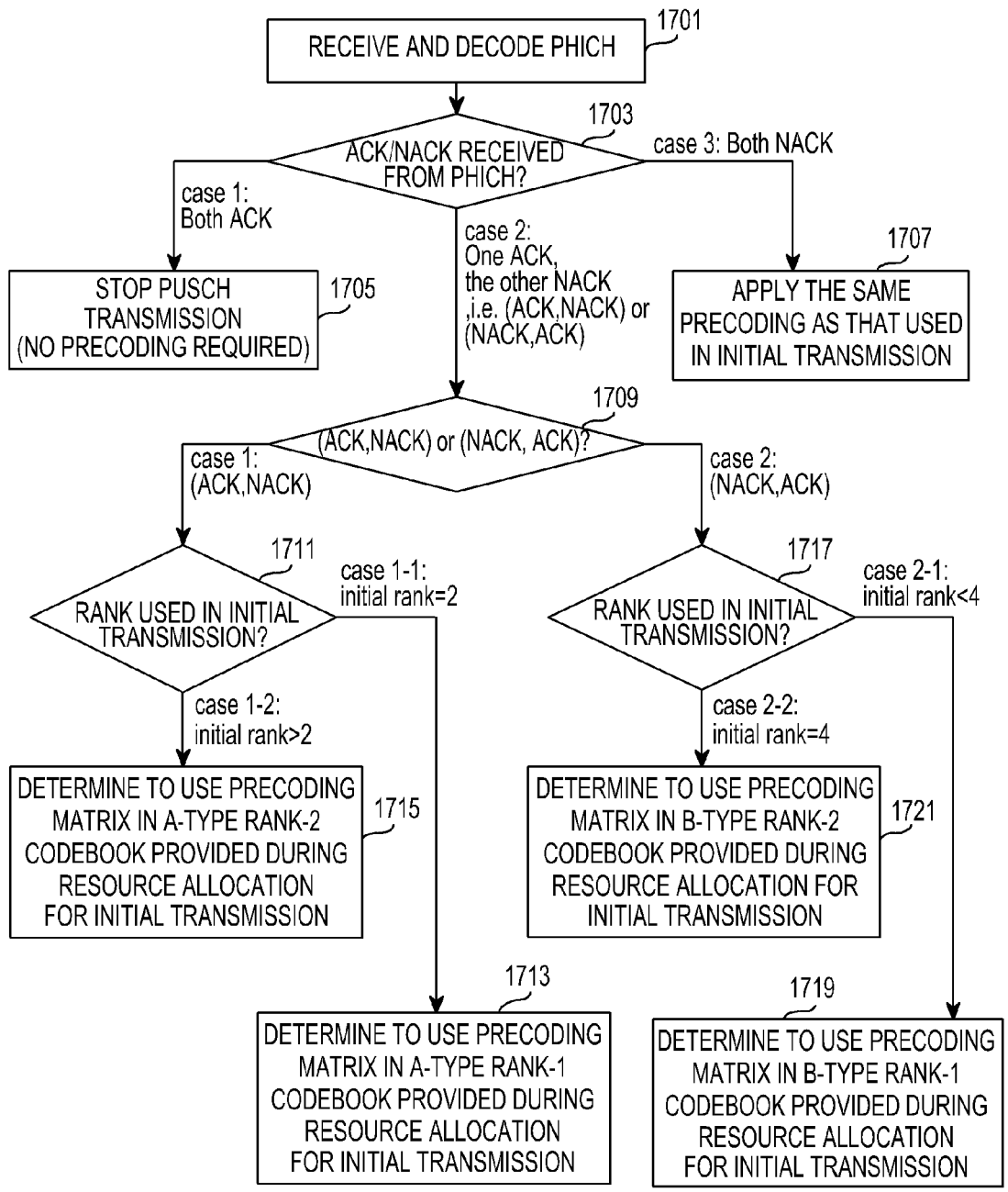
FIG. 17 is a flowchart illustrating a precoding determining method performed in a UE during retransmission, according to a fourth embodiment of the present invention.

FIG. 17 illustrates a precoding determining method performed in a UE during retransmission, according to the fourth embodiment of the present invention.

Steps 1701 to 1717 in FIG. 17 are identical in operation to steps 1101 to 1117 in FIG. 11, so a detailed description thereof will be omitted.

Referring to FIG. 17, in Case 1-1, where it is determined in step 1711 that a UE has received (ACK, NACK) from a PHICH and an initial rank was 2, the UE determines to use a precoding matrix in an A-type rank-1 retransmission codebook in step 1713. As described above, the A-type rank-1 retransmission codebook is assumed to be indicated in an initial grant. In Case 1-2, where it is determined in step 1711 that the UE has received (ACK, NACK) from a PHICH and an initial rank exceeds 2, the UE determines to use a precoding matrix in an A-type rank-2 retransmission codebook in step 1715. Likewise, as described above, the A-type rank-2 retransmission codebook is assumed to be indicated in an initial grant. An A-type retransmission codebook is used for retransmission of a second TB. In a method of selecting a precoding matrix in a retransmission codebook, any one of the rules described in the second embodiment of the present invention may be used.

In Case 2-1, where it is determined in step 1717 that the UE has received (NACK, ACK) from a PHICH and an initial rank is less than 4, the UE determines to use a precoding matrix in a B-type rank-1 retransmission codebook in step 1719. As described above, the B-type rank-1 retransmission codebook is assumed to be indicated in an initial grant. In Case 2-2, where it is determined in step 1717 that the UE has received (NACK, ACK) from a PHICH and an initial rank is 4, the UE determines to use a precoding matrix in a B-type rank-2 retransmission codebook in step 1721. Likewise, as described above, the B-type rank-2 retransmission codebook is assumed to be indicated in an initial grant. A B-type retransmission codebook is used for retransmission of a first TB. In a method of selecting a precoding matrix in a retransmission codebook, any one of the rules described in the second embodiment of the present invention may be used.

While the A-type retransmission codebook and the B-type retransmission codebook are separately defined in the foregoing description, the A-type retransmission codebook and the B-type retransmission codebook may be designed to be identical to each other, if the retransmission codebooks are defined regardless of which TB is retransmitted by the retransmission codebooks. Instead, a rule of specifically determining which precoding matrix in a retransmission codebook is to be used in retransmission may be different for every TB.

In summary, a candidate precoding matrix group for retransmission is determined by a PMI value indicated in an initial grant, and using a function of an RV or a time resource number (e.g., a system frame number and a subframe number), a precoding matrix is selected in a retransmission codebook that is determined according to which rank transmission is performed and which TB is transmitted in retransmission. Therefore, this method may be called a PDCCH-indicating method.

TABLE 4

Examples of Retransmission Codebook

| PMI index | Precoding matrix to be used in transmission by PDCCH | Precoding matrix to be used in retransmission without PDCCH |
|---|---|---|
| 0 | $\frac{1}{\sqrt{2}}\begin{bmatrix}1\\1\end{bmatrix}$ | — |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $A = \frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |
| 6 | $\frac{1}{\sqrt{2}}\begin{bmatrix}1&0\\0&1\end{bmatrix}$ | $\frac{1}{\sqrt{2}}\begin{bmatrix}1\\1\end{bmatrix}$ |
| 7 | $\frac{1}{\sqrt{2}}\begin{bmatrix}1&0\\0&1\end{bmatrix}$ | $\frac{1}{\sqrt{2}}\begin{bmatrix}1\\-1\end{bmatrix}$ |
| 8 | $B = \frac{1}{\sqrt{2}}\begin{bmatrix}1&0\\0&1\end{bmatrix}$ | $C = \frac{1}{\sqrt{2}}\begin{bmatrix}1\\j\end{bmatrix}$ |
| 9 | $\frac{1}{\sqrt{2}}\begin{bmatrix}1&0\\0&1\end{bmatrix}$ | $\frac{1}{\sqrt{2}}\begin{bmatrix}1\\-j\end{bmatrix}$ |
| 10 | $\frac{1}{\sqrt{2}}\begin{bmatrix}1&0\\0&1\end{bmatrix}$ | $\frac{1}{\sqrt{2}}\begin{bmatrix}1\\0\end{bmatrix}$ |
| 11 | $\frac{1}{\sqrt{2}}\begin{bmatrix}1&0\\0&1\end{bmatrix}$ | $\frac{1}{\sqrt{2}}\begin{bmatrix}0\\1\end{bmatrix}$ |

Table 4 shows specific examples of determining retransmission codebooks according to the fourth embodiment of the present invention. Examples in Table 4 are given to determine which precoding a PMI value specified in a PDCCH indicates when a UE has two transmission antennas. The wording 'precoding matrix to be used in transmission by a PDCCH' includes (refers to) a precoding matrix used in initial transmission of a PUSCH, or in retransmission of a PUSCH by a PDCCH. Because a PMI is specified in a PDCCH, in transmission of a PUSCH by a PDCCH, a UE may determine from the PMI value which precoding matrix it should use, no matter whether the PUSCH is in initial transmission or retransmission. The wording 'precoding matrix to be used in retransmission without transmission of a PDCCH' refers to a precoding matrix used when retransmission for one TB is requested only with a PHICH indicating (ACK, NACK) or (NACK, ACK), without transmission of a PDCCH specifying a PMI. In the examples of Table 4, a retransmission codebook is defined as one precoding matrix in a precoding matrix to be used in retransmission without PDCCH.

For example, assume that initial transmission of a PUSCH using a PMI #3 was indicated by a PDCCH. A UE transmits a PUSCH by using a matrix A as a precoding matrix. Because this PUSCH transmission was rank-1 transmission, the UE transmits only one TB. Therefore, if an ACK occurs, retransmission is not required, and if a NACK occurs, the UE can use the conventional matrix A as a retransmission precoding matrix. The reason why no precoding matrix to be used in retransmission without PDCCH is defined for PMI #0~#5 in Table 4 is because no PHICH response such as (ACK, NACK) and (NACK, ACK) is defined since initial transmission was one-TB transmission, for these PMIs.

As another example, assume in Table 4 that a PDCCH has indicated initial transmission of a PUSCH using a PMI #8. A UE transmits a PUSCH using a matrix B as a precoding matrix. Since this PUSCH transmission was rank-2 transmission, the UE transmits two TBs. If (ACK, ACK) occur, retransmission is not required, and if (NACK, NACK) occur, the UE can use the matrix B as a retransmission precoding matrix. Upon receiving a PHICH such as (ACK, NACK) and (NACK, ACK), the UE needs to retransmit one TB, and uses a matrix C as a rank-1 precoding matrix.

Figure 18:
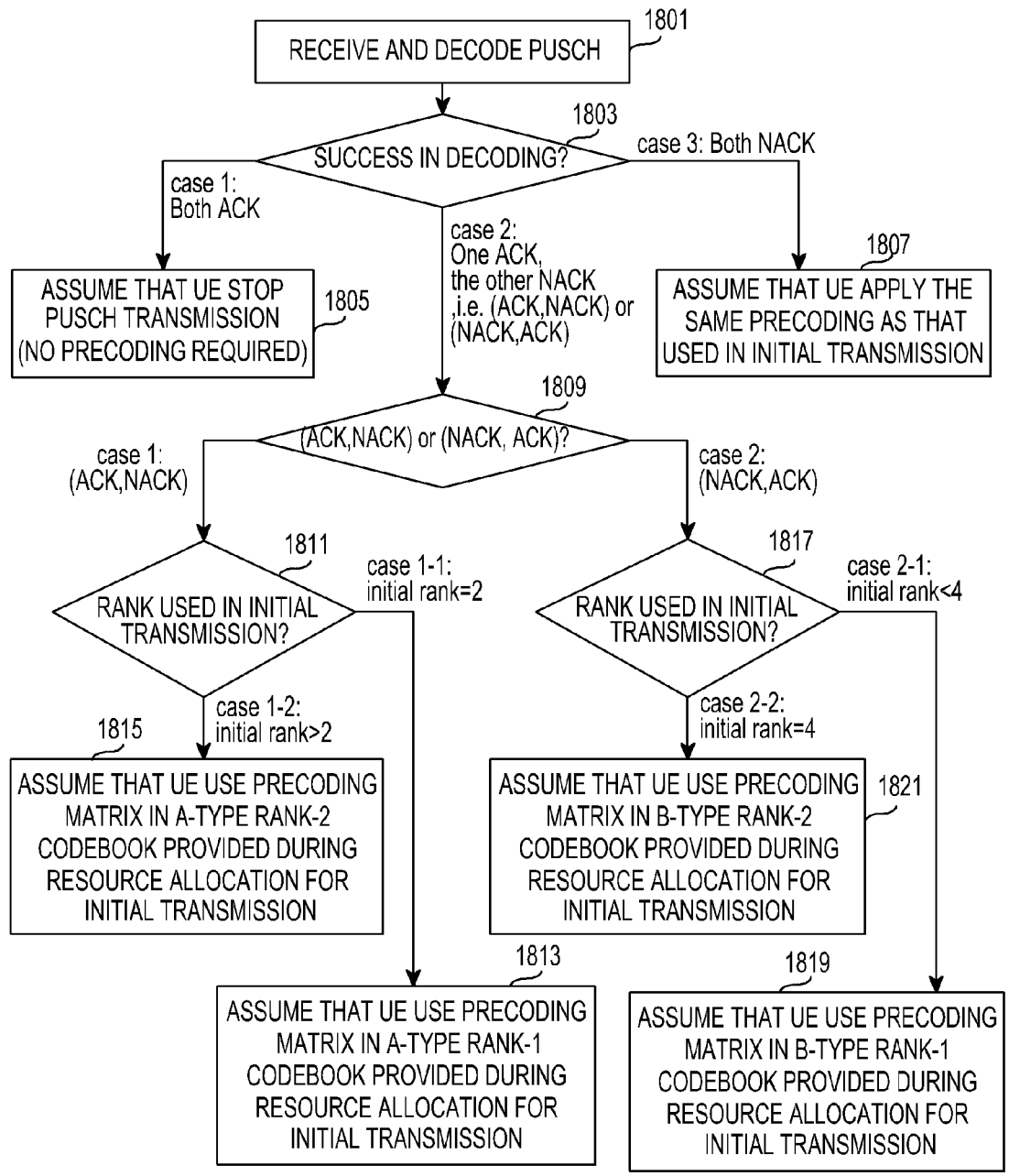
FIG. 18 is a flowchart illustrating a precoding determining method performed in a Node B during retransmission, according to the fourth embodiment of the present invention.

FIG. 18 illustrates a precoding determining method performed in a Node B during retransmission, according to the fourth embodiment of the present invention.

The procedure of FIG. 18 is assumed to be performed in step 921 of FIG. 9. It is to be noted that a method of determining (assuming) a precoding scheme used by a UE during retransmission by a Node B in steps 1805 to 1821 in FIG. 18 is identical to the method of determining (defining) a precoding scheme by a UE in steps 1705 to 1721 in FIG. 17. Since steps 1801 to 1817 in FIG. 18 are identical in operation to steps 1201 to 1217 in FIG. 12, a detailed description thereof will be omitted.

Referring to FIG. 18, in Case 1-1, where it is determined in step 1811 that decoding results on two TBs are (ACK, NACK) and an initial rank was 2, a Node B determines (assumes) in step 1813 that a UE uses a precoding matrix in an A-type rank-1 retransmission codebook. As described above, the A-type rank-1 retransmission codebook is indicated in an initial grant. In Case 1-2, where it is determined in step 1811 that decoding results on two TBs are (ACK, NACK) and an initial rank exceeds 2, the Node B determines (assumes) in step 1815 that a UE uses a precoding matrix in an A-type rank-2 retransmission codebook. Likewise, as described above, the A-type rank-2 retransmission codebook is indicated in an initial grant.

In Case 2-1, where it is determined in step 1817 that decoding results on two TBs are (NACK, ACK) and an initial rank is less than 4, the Node B determines (assumes) in step 1819 that a UE uses a precoding matrix in a B-type rank-1 retransmission codebook. As described above, the B-type rank-1 retransmission codebook is indicated in an initial grant. In Case 2-2, where it is determined in step 1817 that decoding results on two TBs are (NACK, ACK) and an initial rank is 4, the Node B determines (assumes) in step 1821 that a UE uses a precoding matrix in a B-type rank-2 retransmission codebook. Likewise, as described above, the B-type rank-2 retransmission codebook is indicated in an initial grant.

The A-type retransmission codebook is used for retransmission of a second TB, while the B-type retransmission codebook is used for retransmission of a first TB. The method of selecting a precoding matrix in the A-type retransmission codebook and the B-type retransmission codebook by a Node B follows any one of the rule (i) of selecting a precoding matrix according to the RV value and the rule (ii) of selecting a precoding matrix according to the system frame number or the subframe number.

The basic concept of a fifth embodiment of the present invention is that a precoding matrix to be used in retransmission is indicated by a PHICH. In the conventional method, a PHICH indicates ACK/NACK information. Before introduction of UL MIMO, a PHICH is a physical layer channel indicating 1-bit ACK/NACK information. The best way to code 1-bit information is repetition coding. However, due to the introduction of UL MIMO, 2-bit information should be transmitted by a PHICH because ACK/NACK information for two TBs should be provided. Because of the increase in the PHICH information from 1 bit to 2 bits, in the fifth embodiment of the present invention, the PHICH is used not only to indicate ACK/NACK information, but also to indicate a codebook to be used in retransmission by (ACK, NACK)/(NACK, ACK) information, increasing the amount of information. For example, if a PHICH for supporting UL MIMO is designed to include 3-bit information, retransmission precoding matrix indication using a PHICH may be supported as shown in Table 5 below.

TABLE 5

Examples of Precoding Matrix Indication Using 3-bit PHICH

| State | Information |
|---|---|
| 000 | (ACK, ACK) |
| 001 | (ACK, NACK), matrix in retransmission $\frac{1}{\sqrt{2}}\begin{bmatrix}1\\1\end{bmatrix}$ |
| 010 | (ACK, NACK), matrix in retransmission $\frac{1}{\sqrt{2}}\begin{bmatrix}1\\-1\end{bmatrix}$ |
| 011 | (ACK, NACK), matrix in retransmission $\frac{1}{\sqrt{2}}\begin{bmatrix}1\\j\end{bmatrix}$ |
| 100 | (NACK, ACK), matrix in retransmission $\frac{1}{\sqrt{2}}\begin{bmatrix}1\\1\end{bmatrix}$ |
| 101 | (NACK, ACK), matrix in retransmission $\frac{1}{\sqrt{2}}\begin{bmatrix}1\\-1\end{bmatrix}$ |
| 110 | (NACK, ACK), matrix in retransmission $\frac{1}{\sqrt{2}}\begin{bmatrix}1\\j\end{bmatrix}$ |
| 111 | (NACK, NACK) |

Examples in Table 5 are given to specifically determine which precoding matrix is to be used in retransmission, by a PHICH. Specifically, Table 5 shows examples in which a retransmission codebook indicated by a PHICH includes one precoding matrix. The number of precoding matrixes defined in a retransmission codebook indicated by a PHICH may be singular as in the examples of Table 5, or may be plural. If only one precoding matrix is defined in a retransmission codebook, only the precoding matrix can be used in retransmission. Otherwise, if plural precoding matrixes are defined in a retransmission codebook, a precoding matrix is selected and used according to a specific rule in retransmission. As to a rule of selecting a precoding matrix in retransmission, the following rules mentioned in the second embodiment may be used.

i. Selecting a precoding matrix according to an RV value; and ii. Selecting a precoding matrix according to a system frame number or a subframe number The advantages of the fifth embodiment of the present invention are that a Node B may directly indicate a precoding matrix using a PHICH without transmitting a PDCCH. The Node B may best know the optional precoding matrix during retransmission, but indicating the optimal precoding matrix during retransmission using a PDCCH increases the required amount of resources.

Figure 19:
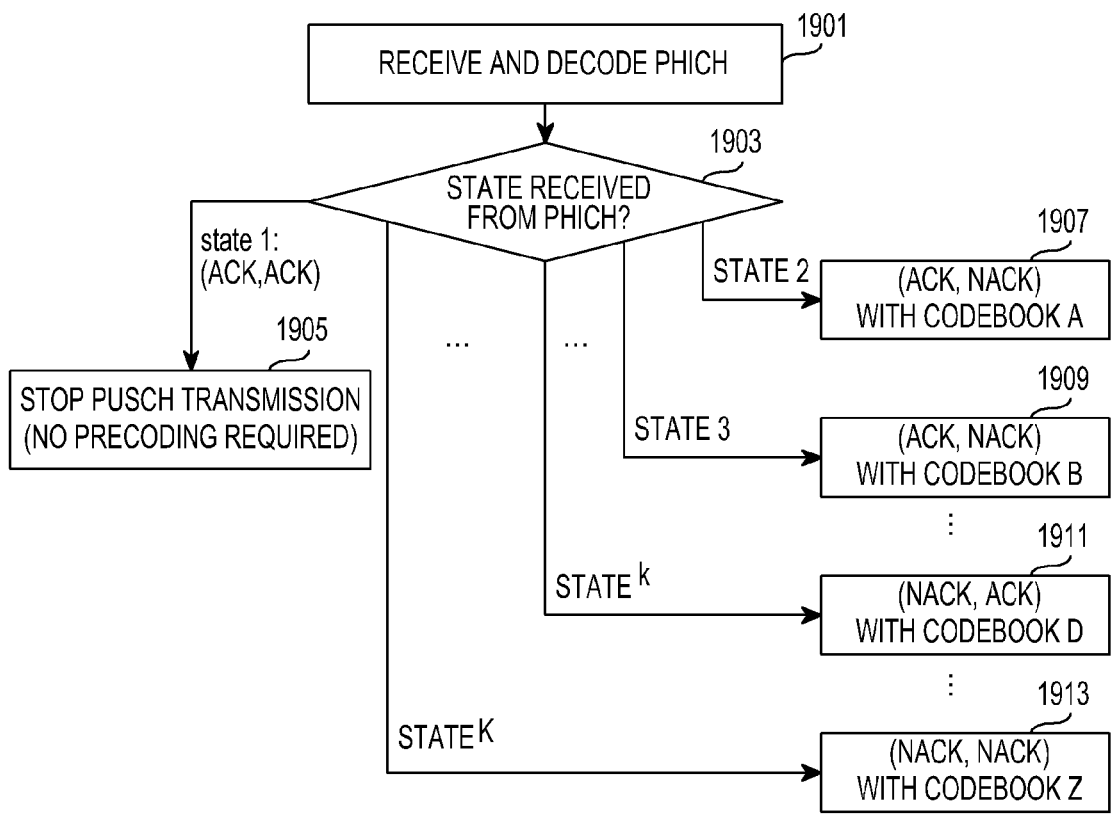
FIG. 19 is a flowchart illustrating a precoding determining method performed in a UE during retransmission, according to a fifth embodiment of the present invention.

FIG. 19 illustrates a precoding determining method performed in a UE during retransmission, according to the fifth embodiment of the present invention.

Referring to FIG. 19, a UE receives and decodes a PHICH in step 1901. Herein, a PHICH is designed as a physical layer channel including n-bit information for indicating a precoding scheme in retransmission, and may indicate a total of K states, where $\log 2(K) \leq n$. In step 1903, the PHICH including the n-bit information may indicate the following multiple states according to the PHICH states defined in this embodiment of the present invention.

If the PHICH indicates State 1 in step 1903, the UE stops PUSCH retransmission in step 1905, determining that ACK/NACK information for two TBs is (ACK, ACK). In State 1, precoding information is not required. If the PHICH indicates Case 2 in step 1903, the UE uses a codebook A to determine a retransmission precoding matrix for two TBs in step 1907, determining that ACK/NACK information for two TBs is (ACK, NACK). If the PHICH indicates Case 3 in step 1903, the UE uses a codebook B to determine a retransmission precoding matrix for two TBs in step 1909, determining that ACK/NACK information for two TBs is (ACK, NACK). If the PHICH indicates Case k in step 1903, the UE uses a codebook D to determine a retransmission precoding matrix for two TBs in step 1911, determining that ACK/NACK information for two TBs is (NACK, ACK). Finally, if the PHICH indicates Case K in step 1903, the UE uses a codebook Z to determine a retransmission precoding matrix for both of a first TB and a second TB in step 1913, determining that ACK/NACK information for two TBs is (NACK, NACK).

In summary, using a function of an RV or a time resource number (e.g., a system frame number and a subframe number), a precoding matrix is selected in a retransmission codebook that is determined according to the state information provided by a Node B using a PHICH, and which rank transmission is performed and which TB is transmitted in retransmission. Therefore, using this method, a precoding matrix used during retransmission may be indicated by a PHICH.

Figure 20:
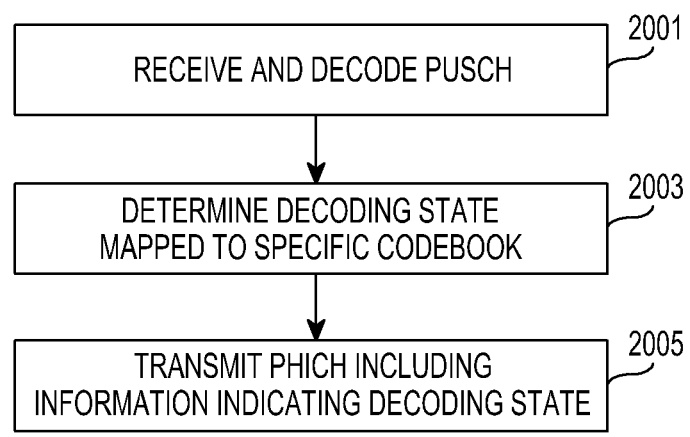
FIG. 20 is a flowchart illustrating a precoding determining method performed in a Node B during retransmission, according to the fifth embodiment of the present invention.

FIG. 20 illustrates a precoding determining method performed in a Node B during retransmission, according to the fifth embodiment of the present invention.

Referring to FIG. 20, a Node B receives and decodes a PUSCH in step 2001. In step 2003, the Node B determines the decoding states indicating associated ACK/NACK information for two TBs, which were described in steps 1905 to 1913 in FIG. 19. The decoding states are mapped to specific codebooks that a UE uses during retransmission of a PUSCH. In step 2005, the Node B generates a PHICH including information indicating the decoding state and transmits the PHICH to the UE. The information indicating the decoding state may indicate a total of K states with n-bit information in a PHICH, where log 2(K)≤n. A PHICH including the n-bit information may indicate the multiple states described in FIG. 19, according to the PHICH state defined in this embodiment of the present invention. Therefore, a Node B may inform a UE of a precoding matrix to be used in retransmission, using a PHICH including information indicating the decoding state, without transmitting a PDCCH.

A sixth embodiment of the present invention provides a method of determining a precoding matrix to be used in retransmission when a PHICH responding to UL MIMO transmission indicates ACK/NACK information for two TBs with a single ACK/NACK rather, than indicating the ACK/NACK information independently. In this embodiment of the present invention, a Node B transmits an ACK only when it has successfully decoded both of two TBs, and transmits a NACK when it has failed in decoding any one of the TBs. Specifically, even though two TBs have been transmitted by a PUSCH, a PHICH indicates only one ACK/NACK. If a UE has received a NACK through such a PHICH even though a Node B has successfully decoded any one TB, the UE should retransmit both of the two TBs because it may not determine which TB was failed to be successfully decoded. In this embodiment of the present invention, if a NACK is received from a PHICH, the UE cannot but consider the NACK as (NACK, NACK).

According to conventional teachings, in the (NACK, NACK) state, the previous precoding matrix should be used as a retransmission precoding matrix because retransmission should be performed using the transmission property used in previous transmission.

In this embodiment of the present invention, however, a UE performs precoding by selecting a retransmission precoding matrix in a predetermined default codebook, instead of using the previous precoding matrix as a retransmission precoding matrix. The default codebook is predefined for every rank individually. If a NACK received through a PHICH indicates a request for UL MIMO retransmission, a UE precodes a PUSCH by selecting one of one or more precoding matrixes in the default codebook.

Figure 21:
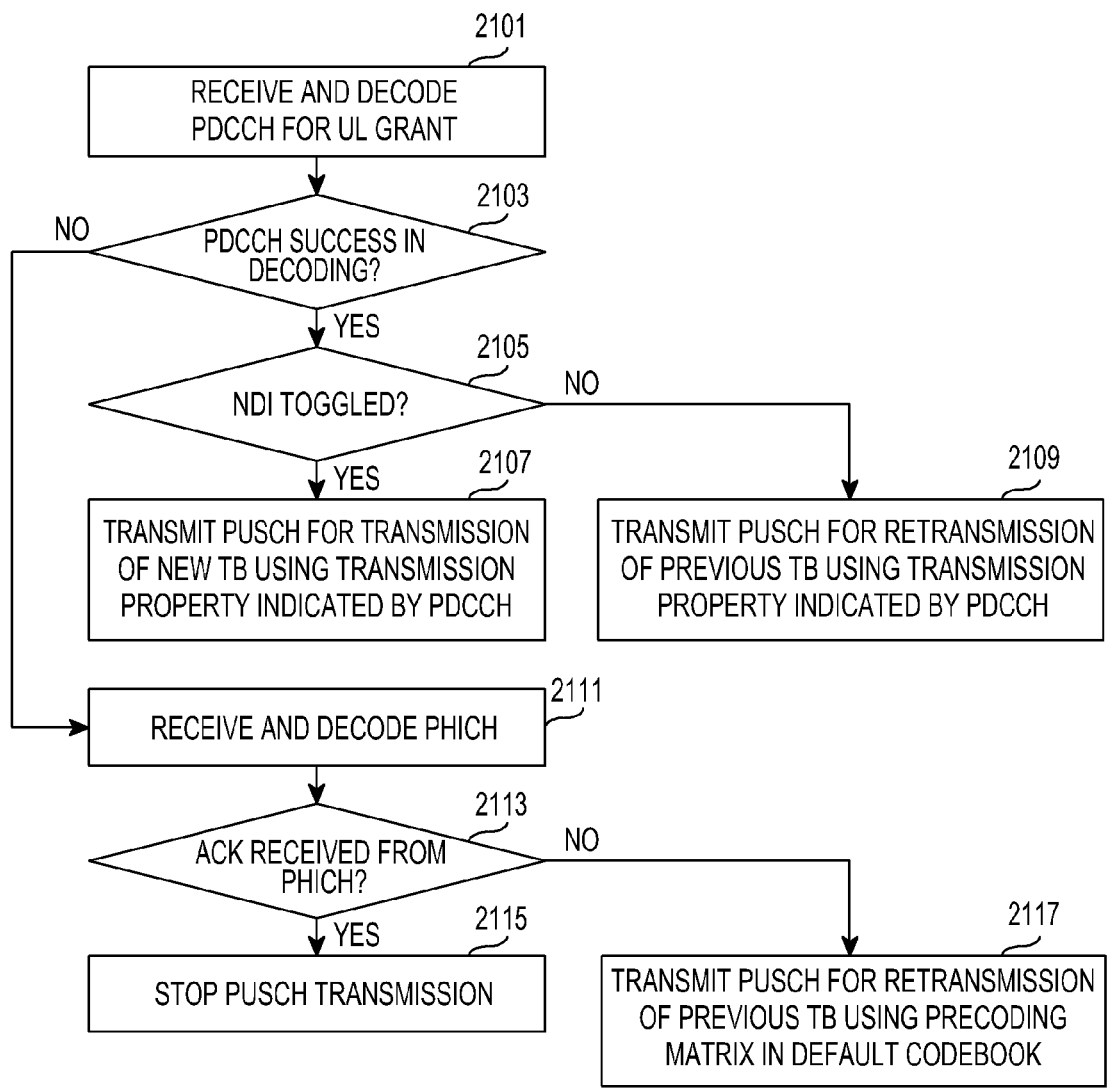
FIG. 21 is a flowchart illustrating a precoding determining method performed in a UE during retransmission, according to a sixth embodiment of the present invention.

FIG. 21 illustrates a precoding determining method performed in a UE during retransmission, according to the sixth embodiment of the present invention.

Figure 4:
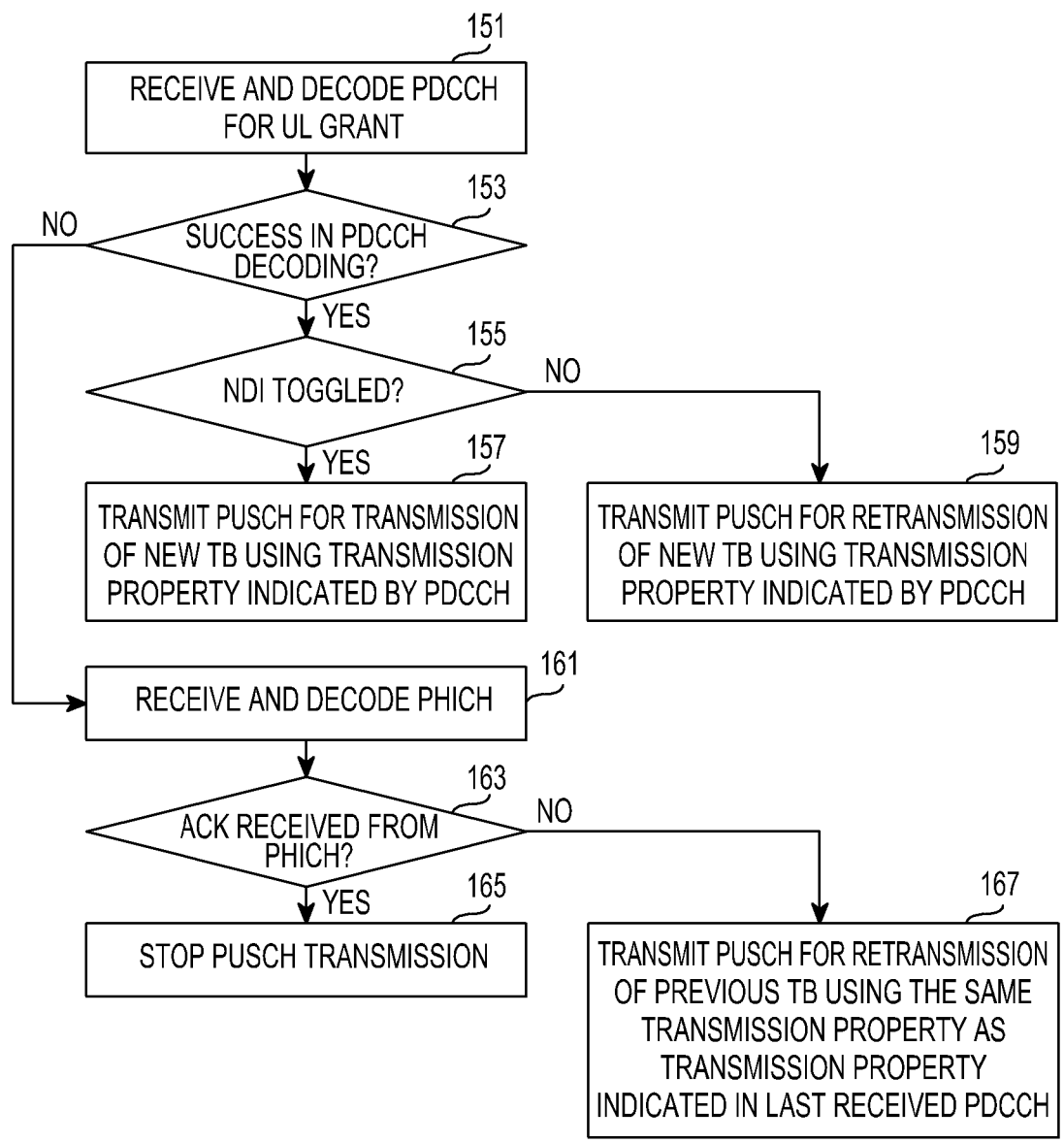
FIG. 4 is a flowchart illustrating an adaptive synchronous HARQ operation of a UE in a UL.

Since the procedure performed in FIG. 21 is identical to the conventional UE's operation described in FIG. 4 except for an operation in step 2117 when a NACK is received from a PHICH, a detailed description of steps 2101 to 2115 will be omitted.

Figure 22:
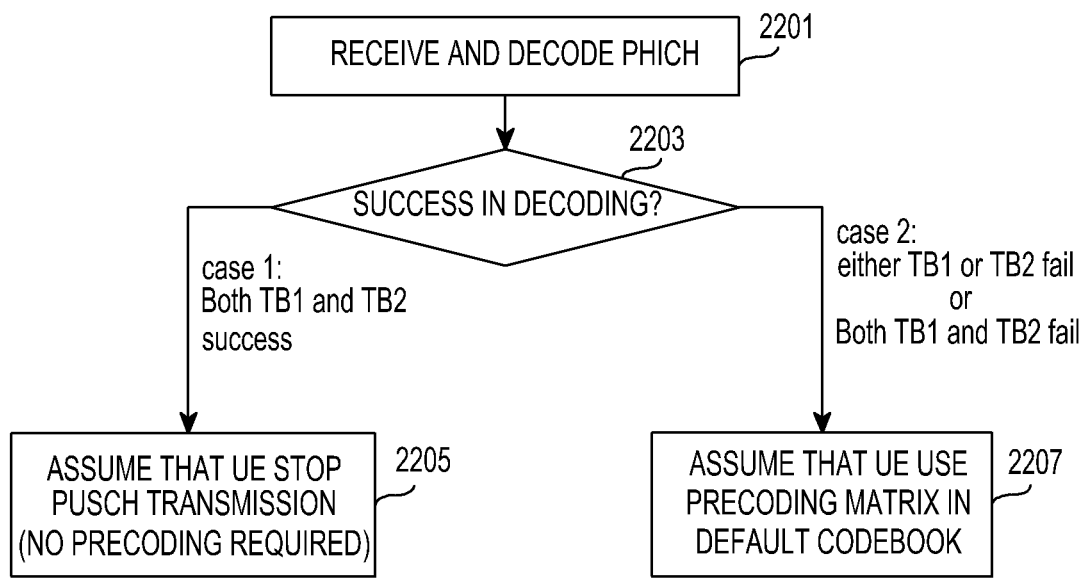
FIG. 22 is a flowchart illustrating a precoding determining method performed in a Node B during retransmission, according to the sixth embodiment of the present invention.

If a UE has received a NACK from a PHICH without receiving a PDCCH, the UE selects a precoding matrix in a default codebook and uses it for PUSCH retransmission in step 2117. One or more precoding matrixes may be defined in a default codebook. If only one precoding matrix is defined in a default codebook, only the precoding matrix can be used in retransmission. Otherwise, if multiple precoding matrixes are defined in a default codebook, a precoding matrix is selected and used according to a specific rule in retransmission. As to a rule of selecting a precoding matrix in retransmission, the following rules mentioned in the second embodiment of the present invention may be used.

i. Selecting a precoding matrix according to an RV value; and ii. Selecting a precoding matrix according to a system frame number or a subframe number FIG. 22 illustrates a precoding determining method performed in a Node B during retransmission, according to the sixth embodiment of the present invention. The procedure of FIG. 22 is assumed to be performed in step 921 of FIG. 9.

Referring to FIG. 22, a Node B receives and decodes a PUSCH transmitted by a UE in step 2201, and determines in step 2203 whether it has succeeded in decoding the PUSCH and also determines whether the decoding result or ACK/NACK information transmitted to the UE through a PHICH is an ACK or a NACK. The determination results may be classified into two cases. In Case 1, where an ACK is transmitted as the decoding is successful for both of two TBs, the Node B does not require precoding information in step 2205, assuming that the UE will stop retransmission of the PUSCH. In Case 2, where a NACK occurs for at least one of the two TBs, the Node B determines (assumes) in step 2207 that the UE selects a precoding matrix in a predetermined default codebook and uses it for PUSCH retransmission. Because the Node B and the UE select a precoding matrix in the default codebook according to the same rule, the Node B is not required to transmit a PDCCH indicating a precoding matrix that the UE will use during retransmission. Although not illustrated in FIG. 22, the Node B transmits one NACK through a PHICH when a NACK occurs for at least one of the two TBs.

Like in the sixth embodiment of the present invention, in a seventh embodiment of the present invention, a PHICH provides only one ACK/NACK. While a default codebook defined in the sixth embodiment of the present invention regardless of the precoding matrix used by a UE in initial transmission, a retransmission codebook is defined in the seventh embodiment of the present invention according to which precoding matrix was used in initial transmission.

One or more precoding matrixes may be defined in the retransmission codebook of the seventh embodiment of the present invention. If only one precoding matrix is defined in the retransmission codebook, only the precoding matrix can be used in retransmission. Otherwise, if multiple precoding matrixes are defined in the retransmission codebook, a precoding matrix is selected and used according to a predetermined rule in retransmission. As to a rule of selecting a precoding matrix in retransmission, the following rules mentioned in the second embodiment of the present invention may be used.

i. Selecting a precoding matrix according to an RV value; and ii. Selecting a precoding matrix according to a system frame number or a subframe number Even the case where the retransmission codebook is fully coincident with each rank-specific codebook may be an example of the seventh embodiment of the present invention. For example, if a PMI #p of a rank-r is assumed to be designated as a precoding matrix by a PDCCH using an initial grant, the PMI #p of a rank-r is used as a precoding matrix in retransmission. It may be assumed that q=f(p), q=f(p, RV), q=f(p, k), q=f(p, n) or q=f(p, $n_{SFN}$), where n represents a subframe number, $n_{SFN}$ represents a system frame number, and k represents the value defined in Equation (4) above.

Equation (5) below shows a simple example of q=f(p).

$$q=f(p)=\mod(p+1,P_r) \quad (5)$$

$P_r$ represents a size of a rank-r codebook. $P_1$=6 and $P_2$=1 in Table 2 with two transmission antennas, and $P_1$=24, $P_2$=16, $P_3$=12, and $P_4$=1 in Table 3 with four transmission antennas.

Figure 23:
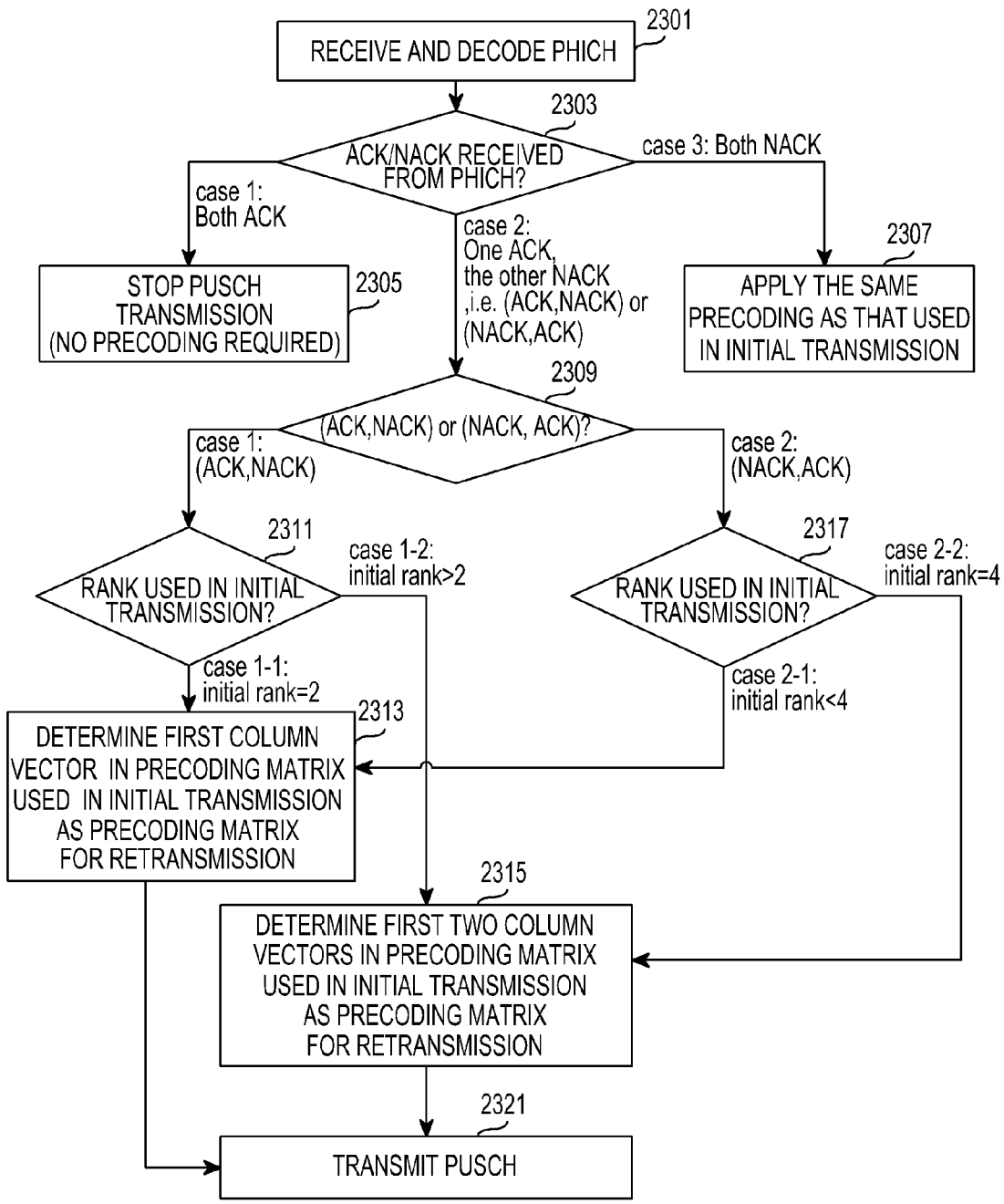
FIG. 23 is a flowchart illustrating a precoding determining method performed in a UE during retransmission, according to an eighth embodiment of the present invention.

FIG. 23 illustrates a precoding determining method performed in a UE during retransmission, according to an eighth embodiment of the present invention.

Referring to FIG. 23, a UE receives and decodes a PHICH in step 2301, and determines in step 2303 whether ACK/NACK information carried by the PHICH is an ACK. The determination results may be classified into three cases. In Case 1, where an ACK is received for both of two TBs, the UE stops retransmission of a PUSCH and does not require precoding information in step 2305. In Case 2, where an ACK is received for one TB but a NACK is received for the other TB, the UE specifically determines for which TB it has received an ACK in step 2309. In Case 3, where a NACK is received for both of two TBs, the UE determines to reuse the precoding indicated in an initial grant intact in retransmission in step 2307.

In step 2309, the UE determines for which TB it has received an ACK, when it has received an ACK for one TB but a NACK for the other TB. In Case 1, where (ACK, NACK) are identified for TBs, it is assumed that an ACK is identified for TB1 and a NACK is identified for TB2. In this case, the UE performs step 2311 and its succeeding steps. In Case 2, where (NACK, ACK) are identified for TBs, it is assumed that a NACK is identified for TB1 and an ACK is identified for TB2. In this case, the UE performs step 2317 and its succeeding steps.

Step 2311 corresponds to a process of determining which rank was used in an initial transmission of a PUSCH in Case 1. An initial rank is always greater than or equal to 2, because it is assumed herein that in initial transmission, two TBs are transmitted by UL MIMO. In Case 1-1, where it is determined in step 2311 that an initial rank is 2, the UE performs step 2313. In Case 1-2, where an initial rank exceeds 2, the UE performs step 2315. In step 2313, the UE implicitly determines a first column vector in a precoding matrix used in initial transmission as a retransmission precoding matrix without reception of a PDCCH. In step 2315, the UE determines the first two column vectors in a precoding matrix used in initial transmission as a retransmission precoding matrix.

In Case 2, where it is determined in step 2309 that ACK/NACK information carried by the PHICH is identified as (NACK, ACK), the UE determines which rank was used in initial transmission of a PUSCH in step 2317. An initial rank is always greater than or equal to 2, because it is assumed herein that in initial transmission, two TBs are transmitted by UL MIMO. In Case 2-1, where it is determined in step 2317 that an initial rank is less than 4, the UE performs step 2313. In Case 2-2, where an initial rank is 4, the UE performs step 2315. If a precoding matrix is determined in step 2313 or 2315, the PUSCH is retransmitted in step 2321. As to a method of determining power used for the PUSCH transmission, there are two possible methods. A first method is to increase transmission power by 3 dB because of the decrease in transmission rank, and a second method is to maintain transmission power to reduce interference to other users.

In the eighth embodiment of the present invention, the method of determining a precoding matrix in the (ACK, NACK) or (NACK, ACK) state is based on the number of layers over which the TB required to be retransmitted was transmitted in initial transmission. In Cases 1-1 and 2-1, where the retransmission TB was transmitted over one layer in initial transmission, the UE implicitly determines a first column vector in a precoding matrix used in initial transmission as a retransmission precoding matrix without reception of a PDCCH. On the other hand, in Cases 1-2 and 2-2, where the retransmission TB was transmitted over two layers in initial transmission, the UE implicitly determines the first two column vectors in a precoding matrix used in initial transmission as a retransmission precoding matrix without reception of a PDCCH.

Figure 24:
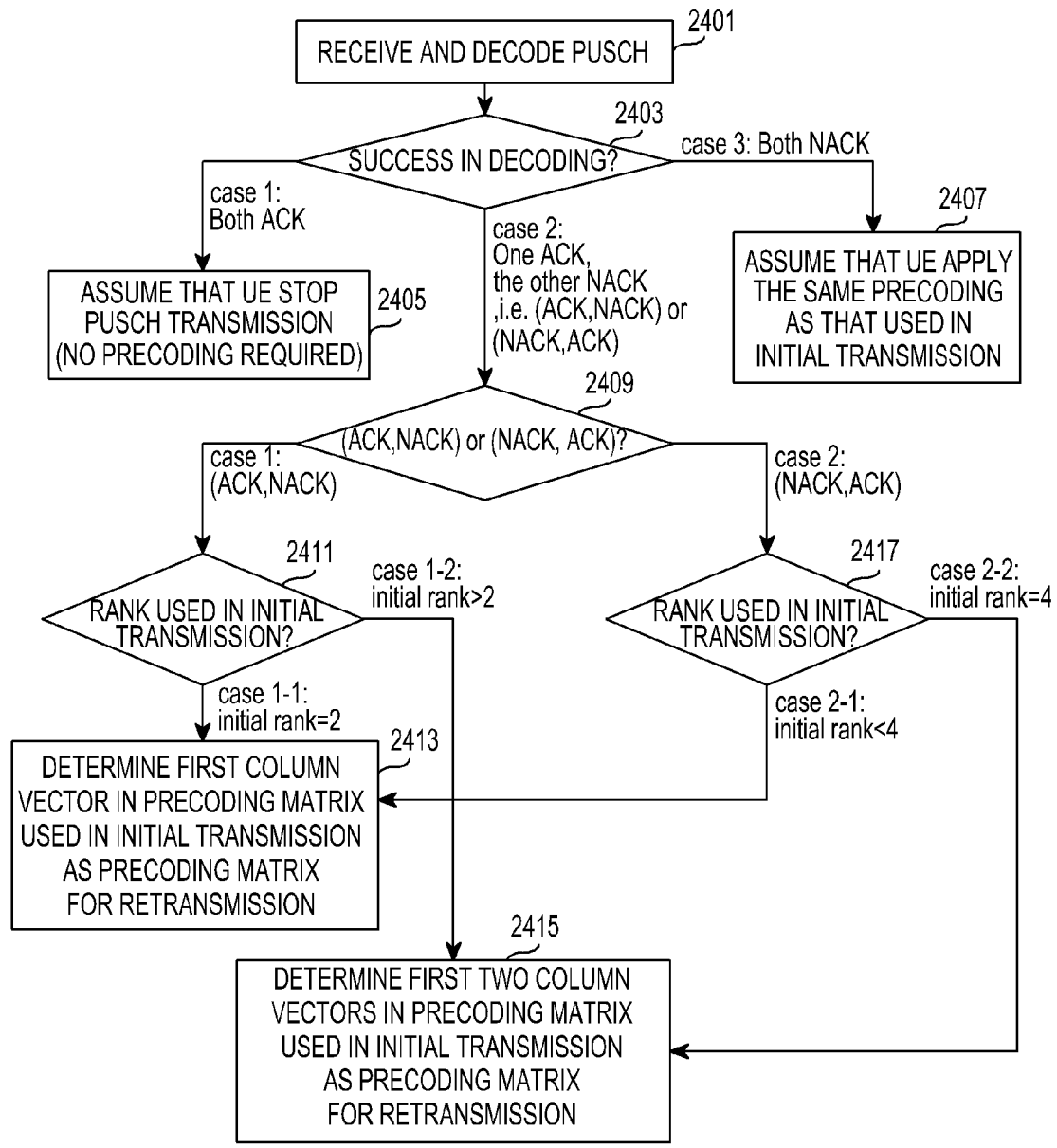
FIG. 24 is a flowchart illustrating a precoding determining method performed in a Node B during retransmission, according to the eighth embodiment of the present invention.

FIG. 24 illustrates a precoding determining method performed in a Node B during retransmission, according to the eighth embodiment of the present invention. The procedure of FIG. 24 is assumed to be performed in step 921 of FIG. 9. It is to be noted that a method of determining (assuming) a precoding scheme used by a UE during retransmission by a Node B in steps 2405 to 2415 in FIG. 24 is identical to the method of determining (defining) a precoding scheme by a UE in steps 2305 to 2315 in FIG. 23.

Referring to FIG. 24, a Node B receives and decodes a PUSCH transmitted by a UE in step 2401, and determines in step 2403 whether the decoding of the PUSCH is successful and also determines whether the decoding result or ACK/NACK information transmitted to the UE through a PHICH is an ACK or a NACK. The determination results may be classified into three cases. In Case 1, where it is determined, as in step 909 of FIG. 9, that an ACK is transmitted for both of two TBs because of the success in decoding for both of two TBs, the Node B assumes in step 2405 that the UE will stop retransmission of the PUSCH, and does not require precoding information. In Case 2, where it is determined, as in steps 911 and 913 of FIG. 9, that an ACK is transmitted for one TB but a NACK is transmitted for the other TB, the Node B specifically determines for which TB it will transmit an ACK in step 2409, and performs its succeeding steps. In Case 3, where it is determined, as in step 915, of FIG. 9 that a NACK is transmitted for both of two TBs because of the failure in decoding for both of two TBs, the Node B assumes in step 2407 that the UE reuses the precoding indicated in an initial grant, in retransmission.

In step 2409, the Node B determines for which TB it has transmitted an ACK in Case 2 where an ACK was transmitted for one TB but a NACK was transmitted for the other TB. In Case 1, where (ACK, NACK) are identified for TBs, it is assumed that an ACK is identified for TB1 and a NACK is identified for TB2. In this case, the Node B performs step 2411 and its succeeding steps. In Case 2, where (NACK, ACK) are identified for TBs, it is assumed that a NACK is identified for TB1 and an ACK is identified for TB2. In this case, the Node B performs step 2417 and its succeeding steps.

Step 2411 corresponds to a process of determining which rank was used in initial transmission of a PUSCH in Case 1 where ACK/NACK information is identified as (ACK, NACK) in step 2409. An initial rank is always greater than or equal to 2, because it is assumed herein that in initial transmission, two TBs are transmitted by UL MIMO. In Case 1-1, where it is determined in step 2411 that an initial rank is 2, the Node B performs step 2413, and in Case 1-2, where an initial rank exceeds 2, the Node B performs step 2415. In step 2413, the Node B implicitly determines (assumes) a first column vector in a precoding matrix used in initial transmission as a retransmission precoding matrix used by the UE. In step 2415, the Node B implicitly determines (assumes) the first two column vectors in a precoding matrix used in initial transmission as a retransmission precoding matrix used by the UE.

In Case 2 where it is determined in step 2409 that ACK/NACK information is identified as (NACK, ACK), the Node B determines which rank was used in initial transmission of a PUSCH in step 2417. An initial rank is always greater than or equal to 2, because it is assumed herein that in initial transmission, two TBs are transmitted by UL MIMO. In Case 2-1, where it is determined in step 2417 that an initial rank is less than 4, the Node B performs step 2413, and in Case 2-2, where an initial rank is 4, the Node B performs step 2415.

In the eighth embodiment of the present invention, each of the Node B and the UE implicitly determines the first one or two column vectors in a precoding matrix used in initial transmission as a retransmission precoding matrix. In the alternative, however, the UE may be modified to implicitly determine the last one column vector in a precoding matrix used in initial transmission as a retransmission precoding matrix without reception of a PDCCH in Cases 1-1 and 2-1 where a transmission TB was transmitted over one layer in initial transmission, and to implicitly determine the last two column vectors in a precoding matrix used in initial transmission as a retransmission precoding matrix without reception of a PDCCH in Cases 1-2 and 2-2 where a transmission TB was transmitted over two layers in initial transmission.

Figure 25:
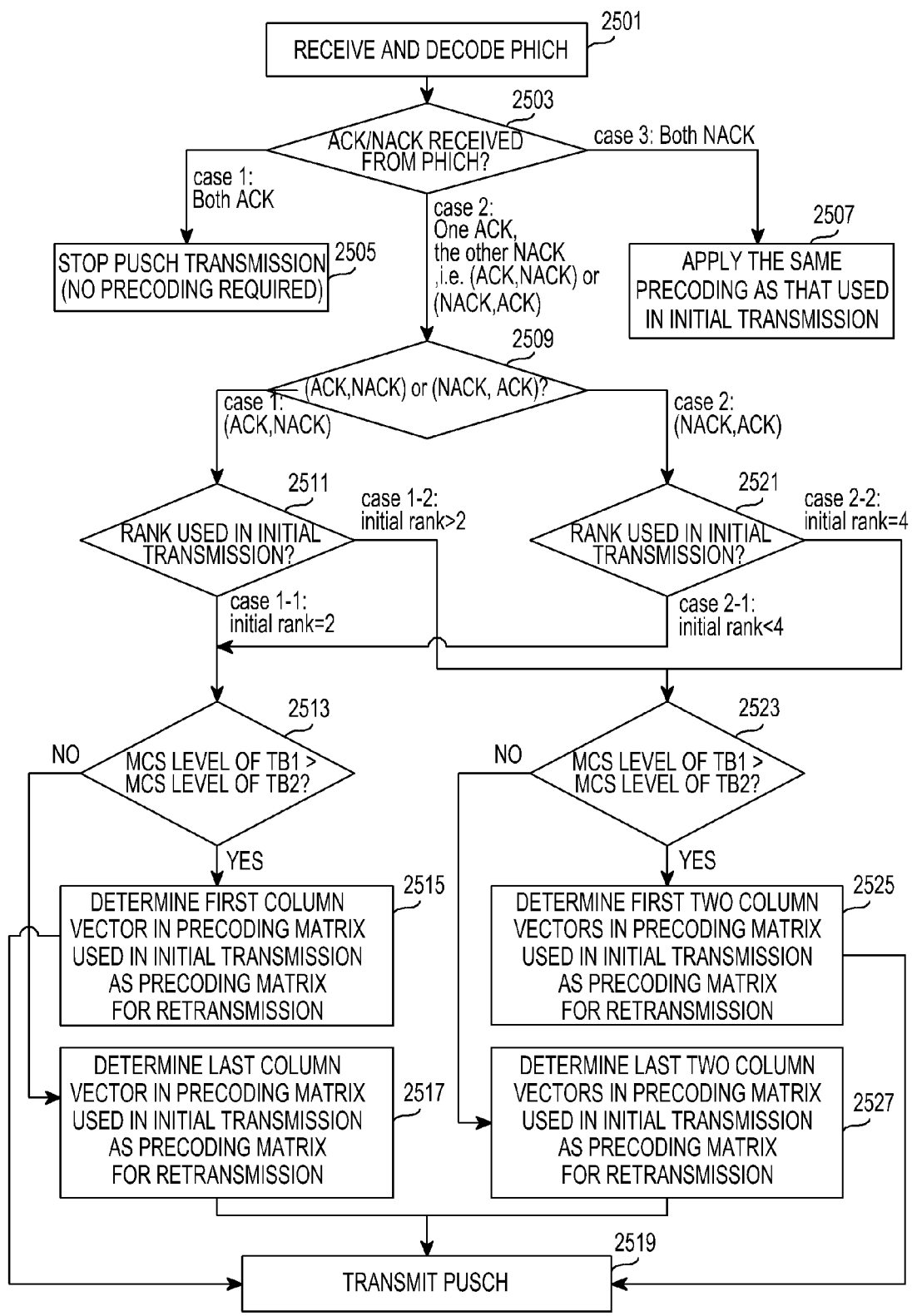
FIG. 25 is a flowchart illustrating a precoding determining method performed in a UE during retransmission, according to a ninth embodiment of the present invention.

FIG. 25 illustrates a precoding determining method performed in a UE during retransmission, according to a ninth embodiment of the present invention.

Referring to FIG. 25, a UE receives and decodes a PHICH in step 2501, and determines in step 2503 whether ACK/NACK information carried by the PHICH is an ACK. The determination results may be classified into three cases. In Case 1, where an ACK is received for both of two TBs, the UE stops retransmission of a PUSCH and does not require precoding information in step 2505. In Case 2, where an ACK is received for one TB but a NACK is received for the other TB, the UE specifically determines for which TB it has received an ACK in step 2509, and performs its succeeding steps. In Case 3, where a NACK is received for both of two TBs, the UE determines to reuse the precoding indicated in an initial grant, in retransmission in step 2507.

In step 2509, the UE determines for which TB it has received an ACK in Case 2 where an ACK was received for one TB but a NACK was received for the other TB. In Case 1, where (ACK, NACK) are identified for TBs, it is assumed that an ACK is identified for TB1 and a NACK is identified for TB2. In this case, the UE performs step 2511 and its succeeding steps. In Case 2, where (NACK, ACK) are identified for TBs, it is assumed that a NACK is identified for TB1 and an ACK is identified for TB2. In this case, the UE performs step 2521 and its succeeding steps.

Step 2511 corresponds to a process of determining which rank was used in initial transmission of a PUSCH in Case 1 where it is determined in step 2509 that ACK/NACK information carried by the PHICH is identified as (ACK, NACK). An initial rank is always greater than or equal to 2, because it is assumed herein that in initial transmission, two TBs are transmitted by UL MIMO. In Case 1-1, where it is determined in step 2511 that an initial rank is 2, the UE performs step 2513, and in Case 1-2, where an initial rank exceeds 2, the UE performs step 2523.

In step 2513, the UE determines if an MCS level of TB1 is higher than an MCS level of TB2. If the MCS level of TB1 is higher, meaning that a channel state of the layer used by TB1 is better, then the UE performs step 2515. Otherwise, the UE performs step 2517. In the alternative, it may be determined in step 2513 whether an MCS level of TB1 is not lower than an MCS level of TB2.

In step 2515, the UE implicitly determines a first column vector in a precoding matrix used in initial transmission as a retransmission precoding matrix without reception of a PDCCH. The first column vector was used by TB1. This is to use the layer of TB1 even though TB2 is retransmitted because the channel state of the layer used by TB1 is better.

In step 2517, the UE implicitly determines the last column vector in a precoding matrix used in initial transmission as a retransmission precoding matrix without reception of a PDCCH. The last column vector was originally used by TB2. This is to reuse the last column vector as a retransmission precoding matrix because the channel state of the layer used by TB2 is better.

Similarly, in step 2523, the UE determines if an MCS level of TB1 is higher than an MCS level of TB2. If the MCS level of TB1 is higher, meaning that a channel state of the layer used by TB1 is better, then the UE performs step 2525. Otherwise, the UE performs step 2527. In the alternative, it may be determined in step 2523 whether an MCS level of TB1 is not lower than an MCS level of TB2.

In step 2525, the UE implicitly determines the first two column vectors in a precoding matrix used in initial transmission as a retransmission precoding matrix without reception of a PDCCH. The first one or two column vectors were used by TB1. This is to use the layer of TB1 even though TB2 is retransmitted because the channel state of the layer used by TB1 is better.

In step 2527, the UE implicitly determines the last two column vectors in a precoding matrix used in initial transmission as a retransmission precoding matrix without reception of a PDCCH. The last one or two column vectors were originally used by TB2. This is to reuse the last two column vectors as a retransmission precoding matrix because the channel state of the layer used by TB2 is better.

Step 2521 corresponds to a process of determining which rank was used in initial transmission of a PUSCH in Case 2 where it is determined in step 2509 that ACK/NACK information carried by the PHICH is identified as (NACK, ACK). An initial rank is always greater than or equal to 2, because it is assumed herein that in initial transmission, two TBs are transmitted by UL MIMO. In Case 2-1, where it is determined in step 2521 that an initial rank is less than 4, the UE performs step 2513, and in Case 2-2, where an initial rank is 4, the UE performs step 2523.

After a precoding matrix is determined in step 2515 or 2517, the PUSCH is retransmitted in step 2519. Likewise, after a precoding matrix is determined in step 2525 or 2527, the PUSCH is retransmitted in step 2519. As to a method of determining power used for the PUSCH transmission, there are two possible methods. A first method is to increase transmission power by 3 dB because of the decrease in transmission rank, and a second method is to maintain transmission power to reduce interference to other users.

Figure 26:
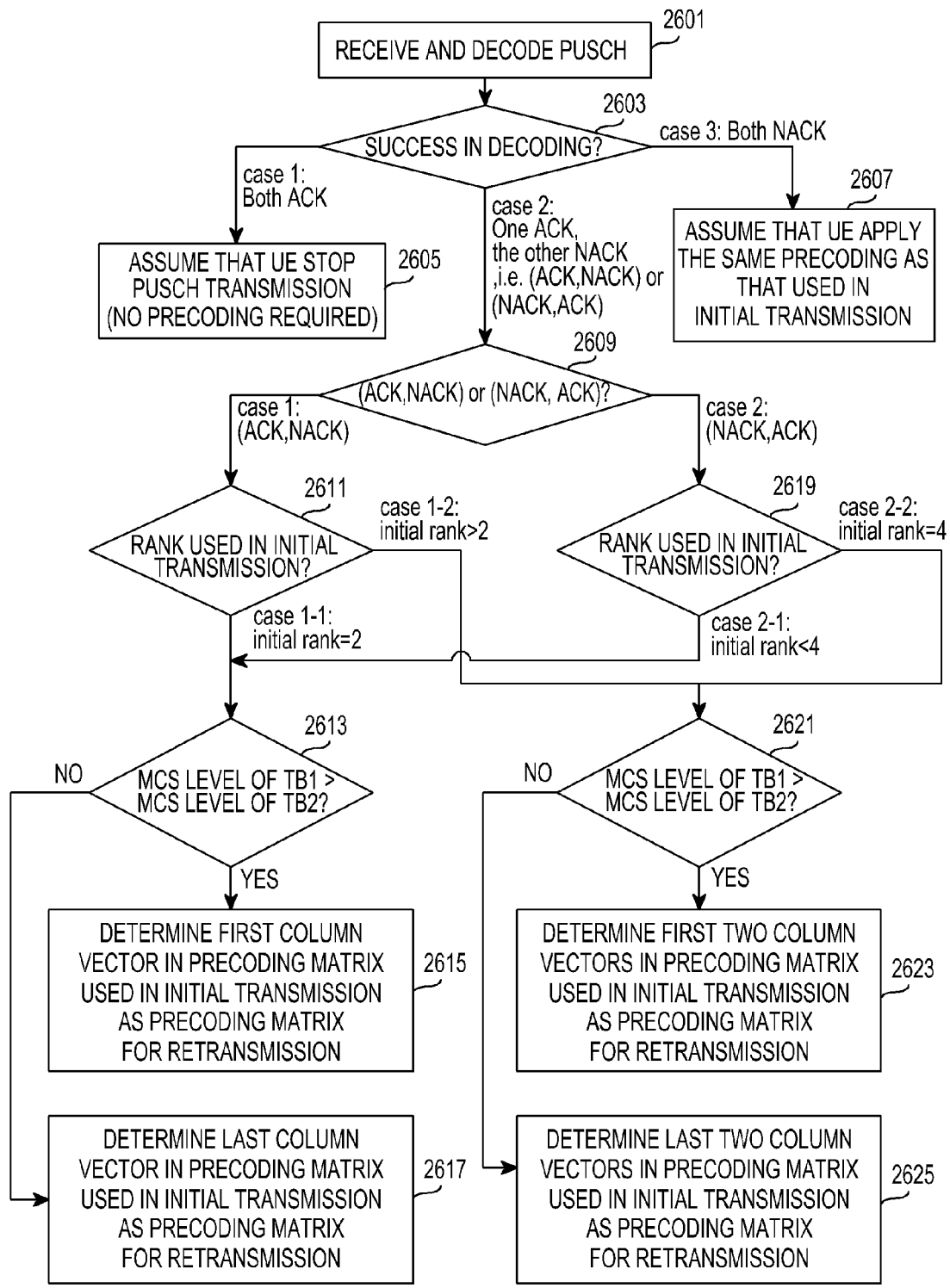
FIG. 26 is a flowchart illustrating a precoding determining method performed in a Node B during retransmission, according to the ninth embodiment of the present invention.

FIG. 26 illustrates a precoding determining method performed in a Node B during retransmission, according to the ninth embodiment of the present invention. The procedure of FIG. 26 is assumed to be performed in step 921 of FIG. 9. It is to be noted that a method of determining (assuming) a precoding scheme used by a UE during retransmission by a Node B in steps 2605 to 2625 in FIG. 26 is identical to the method of determining (defining) a precoding scheme by a UE in steps 2505 to 2527 in FIG. 25.

Referring to FIG. 26, a Node B receives and decodes a PUSCH transmitted by a UE in step 2601, and determines in step 2603 whether the decoding of the PUSCH is successful and also determines whether the decoding result or ACK/NACK information transmitted to the UE through a PHICH is an ACK or a NACK. The determination results may be classified into three cases. In Case 1, where it is determined, as in step 909 of FIG. 9, that an ACK is transmitted for both of two TBs because of the success in decoding for both of two TBs, the Node B assumes in step 2605 that the UE will stop retransmission of the PUSCH, and does not require precoding information. In Case 2, where it is determined, as in steps 911 and 913 of FIG. 9, that an ACK is transmitted for one TB but a NACK is transmitted for the other TB, the Node B specifically determines for which TB it will transmit an ACK in step 2609, and performs its succeeding steps. In Case 3, where it is determined, as in step 915 of FIG. 9, that a NACK is transmitted for both of two TBs because of the failure in decoding for both of two TBs, the Node B assumes in step 2607 that the UE reuses the precoding indicated in an initial grant, in retransmission.

In step 2609, the Node B determines for which TB it has transmitted an ACK in Case 2 where an ACK was transmitted for one TB but a NACK was transmitted for the other TB. In Case 1, where (ACK, NACK) are identified for TBs, it is assumed that an ACK is identified for TB1 and a NACK is identified for TB2. In this case, the Node B performs step 2611 and its succeeding steps. In Case 2, where (NACK, ACK) are identified for TBs, it is assumed that a NACK is identified for TB1 and an ACK is identified for TB2. In this case, the Node B performs step 2619 and its succeeding steps.

Step 2611 corresponds to a process of determining which rank was used in initial transmission of a PUSCH in Case 1 where ACK/NACK information is identified as (ACK, NACK) in step 2609. An initial rank is always greater than or equal to 2, because it is assumed herein that in initial transmission, two TBs are transmitted by UL MIMO. In Case 1-1, where it is determined in step 2611 that an initial rank is 2, the Node B performs step 2613, and in Case 1-2, where an initial rank exceeds 2, the Node B performs step 2621.

In step 2613, the Node B determines if an MCS level of TB1 is higher than an MCS level of TB2. If the MCS level of TB1 is higher, the Node B performs step 2615. Otherwise, the Node B performs step 2617. In the alternative, it may be determined in step 2613 whether an MCS level of TB1 is not lower than an MCS level of TB2.

In step 2615, the Node B implicitly determines (assumes) a first column vector in a precoding matrix used in initial transmission as a retransmission precoding matrix used by the UE. On the other hand, in step 2617, the Node B implicitly determines (assumes) the last column vector in a precoding matrix used in initial transmission as a retransmission precoding matrix used by the UE.

Similarly, in step 2621, the Node B determines if an MCS level of TB1 is higher than an MCS level of TB2. If the MCS level of TB1 is higher, the Node B performs step 2623. Otherwise, the Node B performs step 2625. In the alternative, it may be determined in step 2621 whether an MCS level of TB1 is not lower than an MCS level of TB2.

In step 2623, the Node B implicitly determines (assumes) the first two column vectors in a precoding matrix used in initial transmission as a retransmission precoding matrix used by the UE. On the other hand, in step 2625, the Node B implicitly determines (assumes) the last two column vectors in a precoding matrix used in initial transmission as a retransmission precoding matrix used by the UE.

Step 2619 corresponds to a process of determining which rank was used in initial transmission of a PUSCH in Case 2 where it is determined in step 2609 that ACK/NACK information carried by the PHICH is identified as (NACK, ACK). An initial rank is always greater than or equal to 2, because it is assumed herein that in initial transmission, two TBs are transmitted by UL MIMO. In Case 2-1, where it is determined in step 2619 that an initial rank is less than 4, the UE performs step 2613, and in Case 2-2, where an initial rank is 4, the UE performs step 2621.

A tenth embodiment of the present invention is a combination of the third and fourth embodiments of the present invention. In the third embodiment of the present invention, with the introduction of the mother-child pair concept, a precoding matrix to be used in retransmission is determined by the precoding matrix used in initial transmission. In the fourth embodiment of the present invention, an initial grant is designated not only the precoding matrix to be used in initial transmission, but also the precoding matrix to be used in retransmission without transmission of a PDCCH. In the tenth embodiment of the present invention, a child codebook is defined by the precoding matrix used in initial transmission as in the third embodiment of the present invention, and a precoding matrix to be used in retransmission without transmission of a PDCCH is designated in the child codebook as in the fourth embodiment of the present invention. In this case, multiple precoding matrixes are provided in the child codebook.

In all of the above-described embodiments of the present invention, it is assumed that retransmission is indicated by a PHICH. The following example is about a method of applying the above embodiments when indicated by a PDCCH for fallback. PDCCH-resource consumption may be significantly reduced by using a DCI format designed considering single-antenna transmission by a Node B without using UL MIMO. This is because a DCI format (e.g., DCI format 0) designed considering single-antenna transmission is less than a UL MIMO DCI format in terms of the amount of information due to the non-necessity of expressing multiple TBs and PMIs. The term 'fallback' refers to sending a DCI to a UE whose channel state becomes poor all of a sudden. As for a DCI whose information is reduced significantly, even a UE with a poor channel state may likely receive the DCI, because the DCI uses less resource.

Even though retransmission is indicated by a PDCCH, if it is based on a DCI format 0, PMI information may not be delivered. In this case, a method of determining a precoding matrix in retransmission may be defined by utilizing the above embodiments of the present invention. To be specific, when retransmission is requested by the DCI format 0, precoding is performed using a predetermined precoding matrix or a precoding matrix that is selected in a retransmission codebook or a candidate precoding matrix group according to a specific rule. A method of defining a retransmission precoding matrix or a retransmission codebook follows the embodiments of the present invention.

In the embodiments of the present invention, one of a method of using a codebook in which rank-1 precoding matrixes are defined and a method of using a codebook in which rank-2 precoding matrixes are defined, has been considered according to which TB is retransmitted. However, the change in rank depending on the channel state may be insignificant. In this case, given that a rank-2 precoding matrix may be applied even in retransmission if rank-r (where r≥2) could be supported in initial transmission, it may be preferable to apply a rank-2 precoding matrix rather than a rank-1 precoding matrix in retransmission of the TB that has occupied one layer in initial transmission. Therefore, the above embodiments may be modified to apply a precoding matrix selected in a rank-2 codebook even to a retransmission TB regardless of which TB is retransmitted.

For example, in the second embodiment of the present invention, a default rank-1 codebook is replaceable with a default rank-2 codebook. In the third embodiment of the present invention, a rank-1 child codebook is replaceable with a rank-2 child codebook. In the fourth embodiment of the present invention, a rank-1 codebook may be replaced with a rank-2 codebook.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for controlling retransmission by a user equipment (UE) in a communication system, the method comprising:
   receiving a negative acknowledgement (NACK) for at least one transport block among a plurality of transport blocks transmitted by the UE, from a Node B;
   determining a precoding matrix and a number of layers for retransmission; and
   retransmitting the at least one transport block using the determined precoding matrix and the determined number of layers,
   wherein the precoding matrix is predefined and the number of layers is equal to a number of layers corresponding to the at least one transport block, if the UE does not receive a physical downlink control channel (PDCCH) intended for the UE and a number of the at least one transport block is not equal to a number of the plurality of transport blocks.

2. The method of claim 1, wherein the NACK is transmitted through a physical hybrid automatic repeat request (HARQ) indicator channel (PHICH).

3. The method of claim 1, further comprising:
   adjusting retransmission of a corresponding physical uplink shared channel (PUSCH) according to the PDCCH and a PHICH, if the UE receives the PDCCH and the PHICH intended for the UE.

4. The method of claim 3, further comprising:
   adjusting a sequence of a redundancy version (RV) to 0, 2, 3, 1 for transmission of the corresponding PUSCH.

5. The method of claim 1, wherein the plurality of transport blocks transmitted by the UE are indicated in a last grant using the PDCCH.

6. A user equipment (UE) for controlling retransmission in a communication system, the UE comprising:
   a transceiver for transmitting and receiving data with a Node B; and
   a controller for controlling operations of receiving a negative acknowledgement (NACK) for at least one transport block among a plurality of transport blocks transmitted by the UE, from the Node B, determining a precoding matrix and a number of layers for retransmission, and retransmitting the at least one transport block using the determined precoding matrix and the determined number of layers,
   wherein the precoding matrix is predefined and the number of layers is equal to a number of layers corresponding to the at least one transport block, if the UE does not receive a physical downlink control channel (PDCCH) intended for the UE and a number of the at least one transport block is not equal to a number of the plurality of transport blocks.

7. The UE of claim 6, wherein the NACK is transmitted through a physical hybrid automatic repeat request (HARQ) indicator channel (PHICH).

8. The UE of claim 6, wherein the controller is further configured to adjust retransmission of a corresponding Physical Uplink Shared CHannel (PUSCH) according to the PDCCH and a PHICH, if the UE receives the PDCCH and the PHICH intended for the UE.

9. The UE of claim 8, wherein the controller is further configured to adjust a sequence of a redundancy version (RV) to 0, 2, 3, 1 for transmission of the corresponding PUSCH.

10. The UE of claim 6, wherein the plurality of transport blocks transmitted by the UE are indicated in a last grant using the PDCCH.

11. A method for controlling retransmission by a Node B in a communication system, the method comprising:
   receiving a plurality of transport blocks transmitted by a user equipment (UE);
   transmitting a negative acknowledgement (NACK) for at least one transport block to the UE;
   determining a precoding matrix and a number of layers that the UE uses during retransmission of the at least one transport block in response to the NACK; and
   receiving the at least one transport block using the determined precoding matrix and the determined number of layers,
   wherein the precoding matrix is predefined and the number of layers is equal to a number of layers corresponding to the at least one transport block, if the UE does not receive a physical downlink control channel (PDCCH) intended for the UE and a number of the at least one transport block is not equal to a number of the plurality of transport blocks.

12. The method of claim 11, wherein the NACK is transmitted through a physical hybrid automatic repeat request (HARQ) indicator channel (PHICH).

13. The method of claim 11, further comprising:
   adjusting reception of a corresponding physical uplink shared channel (PUSCH) for the retransmission according to the PDCCH and a PHICH, if the Node B transmits the PDCCH and the PHICH intended for the UE.

14. The method of claim 13, further comprising:
   receiving the corresponding PUSCH transmission using a sequence of the redundancy version (RV) adjusted to 0, 2, 3, 1.

15. The method of claim 11, wherein the plurality of transport blocks transmitted by the UE are indicated in a last grant using the PDCCH.

16. A Node B for controlling retransmission in a communication system, the Node B comprising:
- a transceiver for transmitting and receiving data with a user equipment (UE); and
- a controller for controlling operations of receiving a plurality of transport blocks transmitted by the UE, transmitting a negative acknowledgement (NACK) for at least one transport block to the UE, determining a precoding matrix and a number of layers that the UE uses during retransmission of the at least one transport block in response to the NACK, and receiving the at least one transport block using the determined precoding matrix and the determined number of layers,
- wherein the precoding matrix is predefined and the number of layers is equal to a number of layers corresponding to the at least one transport block, if the UE does not receive a physical downlink control channel (PDCCH) intended for the UE and a number of the at least one transport block is not equal to a number of the plurality of transport blocks.

17. The Node B of claim 16, wherein the NACK is transmitted through a physical hybrid automatic repeat request (HARQ) indicator channel (PHICH).

18. The Node B of claim 16, wherein the controller is further configured to adjust reception of a corresponding physical uplink shared channel (PUSCH) for the retransmission according to the PDCCH and a PHICH, if the Node B transmits the PDCCH and the PHICH intended for the UE.

19. The Node B of claim 18, wherein the controller is further configured to receive the corresponding PUSCH transmission using a sequence of the redundancy version (RV) adjusted to 0, 2, 3, 1.

20. The Node B of claim 16, wherein the plurality of transport blocks transmitted by the UE are indicated in a last grant using the PDCCH.

* * * * *